US008576317B2

(12) United States Patent
Sakakibara et al.

(10) Patent No.: US 8,576,317 B2
(45) Date of Patent: Nov. 5, 2013

(54) SOLID-STATE IMAGE PICKUP APPARATUS SIGNAL PROCESSING METHOD FOR A SOLID-STATE IMAGE PICKUP APPARATUS, AND ELECTRONIC APPARATUS

(75) Inventors: Masaki Sakakibara, Kanagawa (JP); Tadayuki Taura, Kanagawa (JP); Yusuke Oike, Kanagawa (JP); Takafumi Takatsuka, Kanagawa (JP); Akihiko Kato, Tokyo (JP)

(73) Assignee: Sony Corporation, Tokyo (JP)

( * ) Notice: Subject to any disclaimer, the term of this patent is extended or adjusted under 35 U.S.C. 154(b) by 135 days.

(21) Appl. No.: 13/064,338

(22) Filed: Mar. 21, 2011

(65) Prior Publication Data
US 2011/0242381 A1 Oct. 6, 2011

(30) Foreign Application Priority Data

Mar. 30, 2010 (JP) ................................. 2010-079017
Jan. 28, 2011 (JP) ................................. 2011-015994

(51) Int. Cl.
H04N 3/14 (2006.01)
H04N 5/335 (2011.01)

(52) U.S. Cl.
USPC ......................................... 348/308; 348/301

(58) Field of Classification Search
USPC ................................................. 348/301, 308
See application file for complete search history.

(56) References Cited

U.S. PATENT DOCUMENTS

| | | | |
|---|---|---|---|
| 2003/0080340 A1* | 5/2003 | Henderson et al. | 257/72 |
| 2006/0035624 A1 | 2/2006 | Yokoshi et al. | |
| 2006/0284999 A1* | 12/2006 | Muramatsu et al. | 348/308 |
| 2008/0186388 A1* | 8/2008 | Yamagata et al. | 348/222.1 |
| 2008/0211954 A1 | 9/2008 | Ota | |
| 2009/0212827 A1* | 8/2009 | Keel et al. | 327/73 |
| 2012/0194716 A1* | 8/2012 | Hagihara | 348/300 |
| 2012/0261552 A1* | 10/2012 | Ikeda | 250/208.1 |

FOREIGN PATENT DOCUMENTS

| | | |
|---|---|---|
| JP | 2001-238132 | 8/2001 |
| JP | 2006-020176 | 1/2006 |
| JP | 2006-340044 | 12/2006 |
| JP | 2008-228265 | 9/2008 |
| JP | 2009-020176 | 1/2009 |

* cited by examiner

Primary Examiner — Sinh Tran
Assistant Examiner — Christopher K Peterson
(74) Attorney, Agent, or Firm — Rader, Fishman & Grauer PLLC

(57) ABSTRACT

Disclosed herein is a solid-state image pickup apparatus, including a pixel array section in which a unit pixel including a photoelectric conversion section and a charge detection section for detecting charge generated by photoelectric conversion by the photoelectric conversion section is disposed; a driving section adapted to carry out driving of reading out a signal of the unit pixel divisionally by twice as a first signal and a second signal; and a signal processing section adapted to set the first signal read out first from the unit pixel as a reference voltage for a processable input voltage range of the signal processing section, adjust the reference voltage so that the first and second signals may be included in the input voltage range and carry out signal processing for the first and second signals using the adjusted reference voltage.

16 Claims, 48 Drawing Sheets

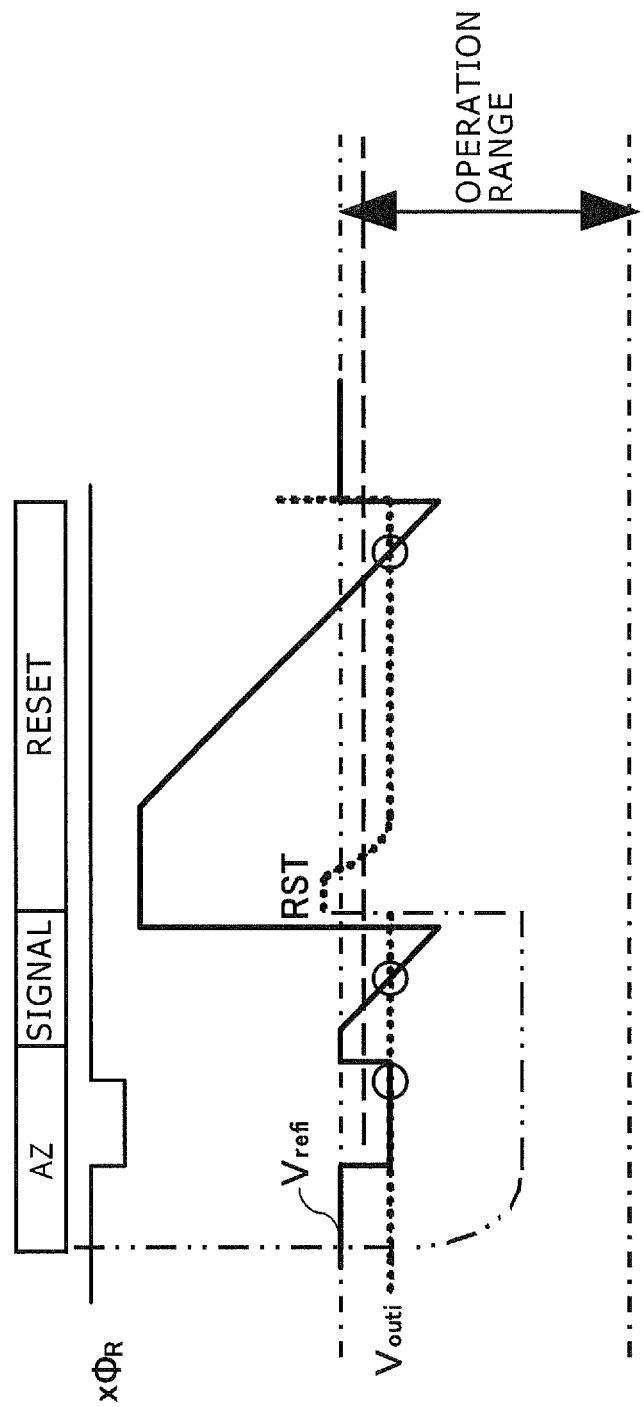

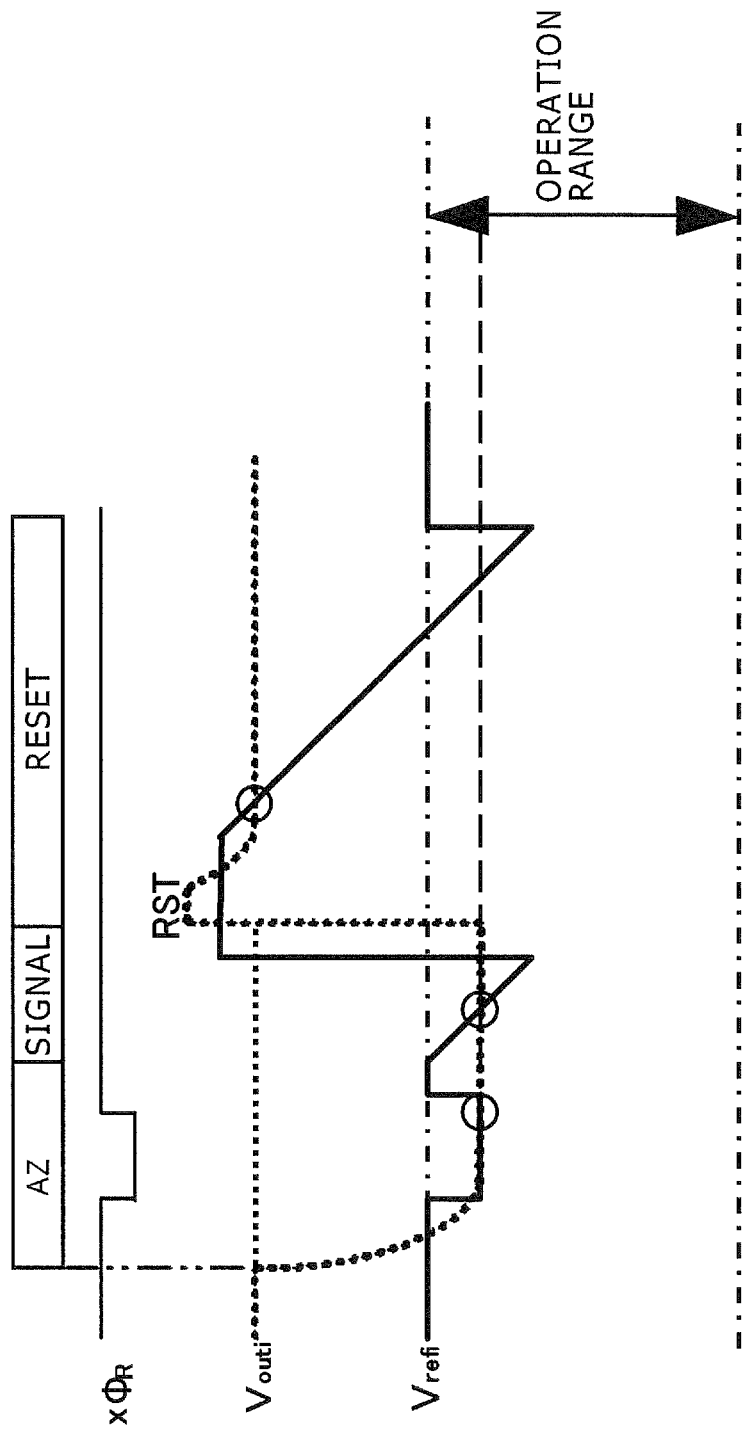

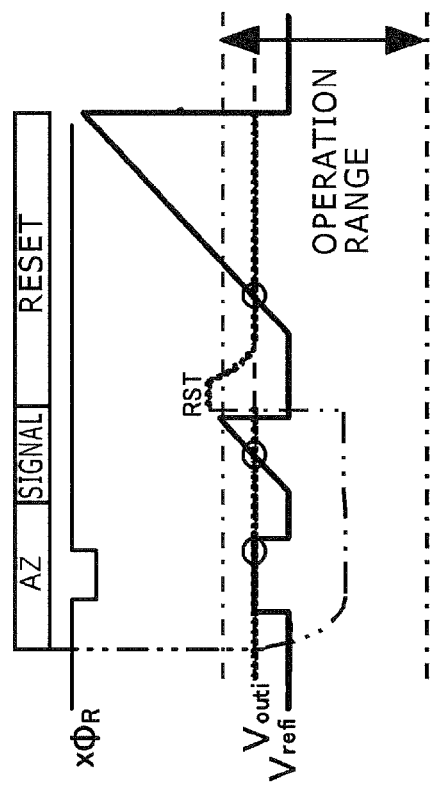

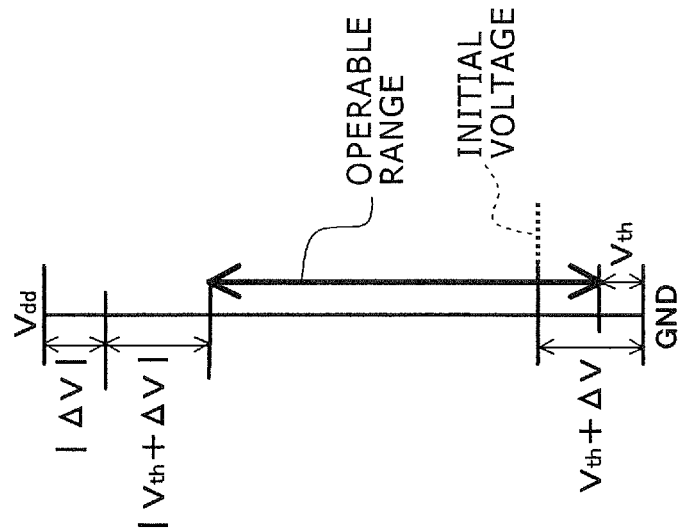
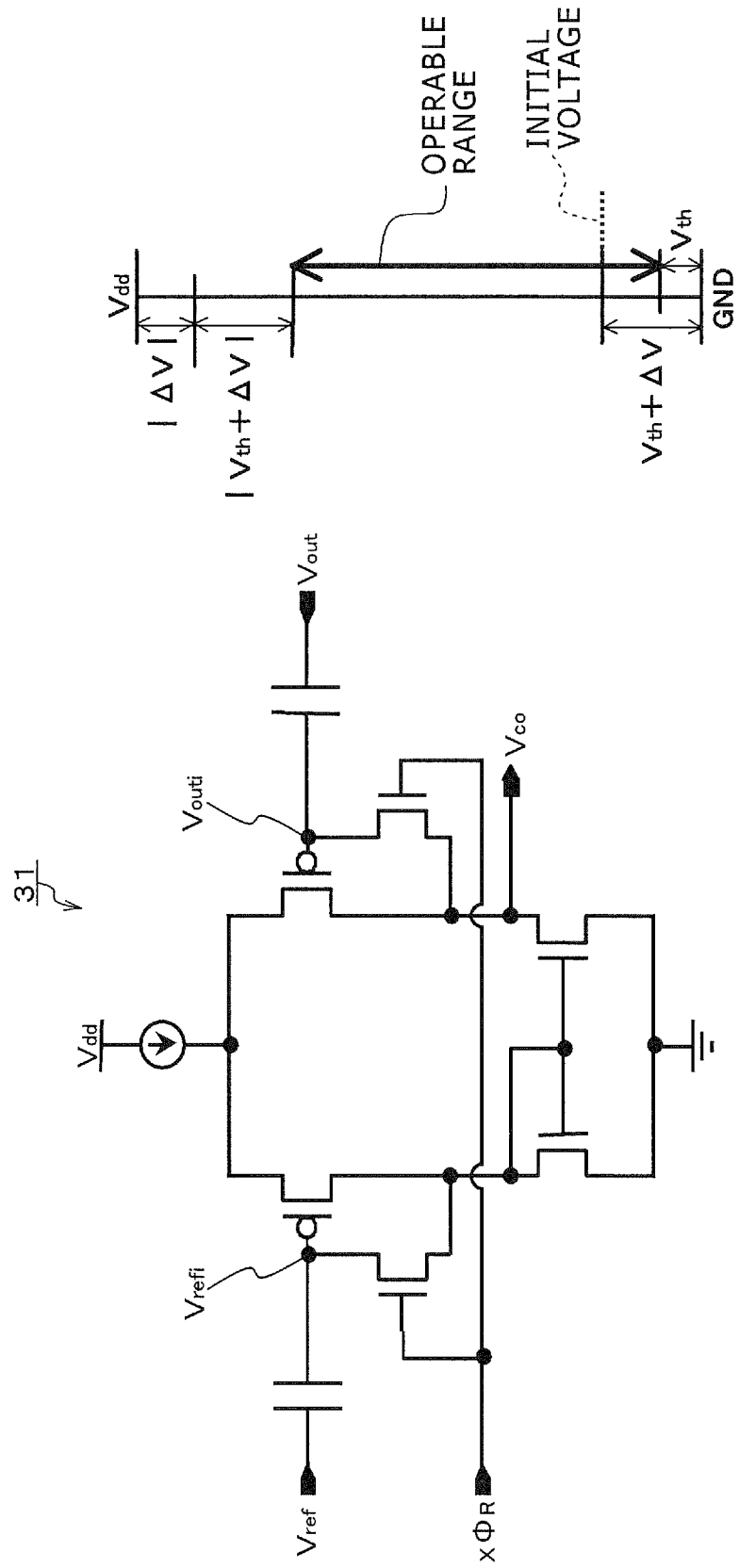
FIG. 10B
FIG. 10A

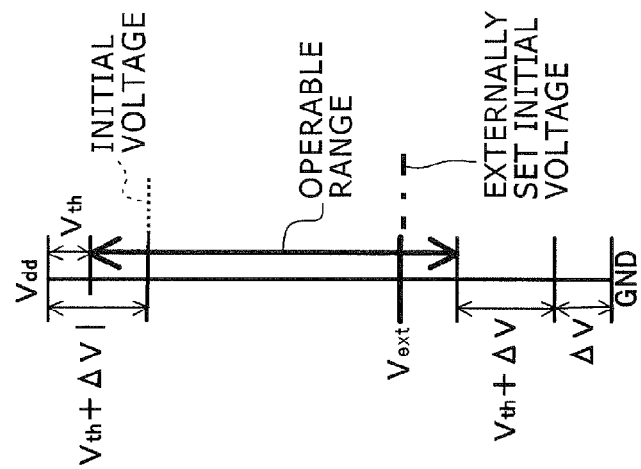
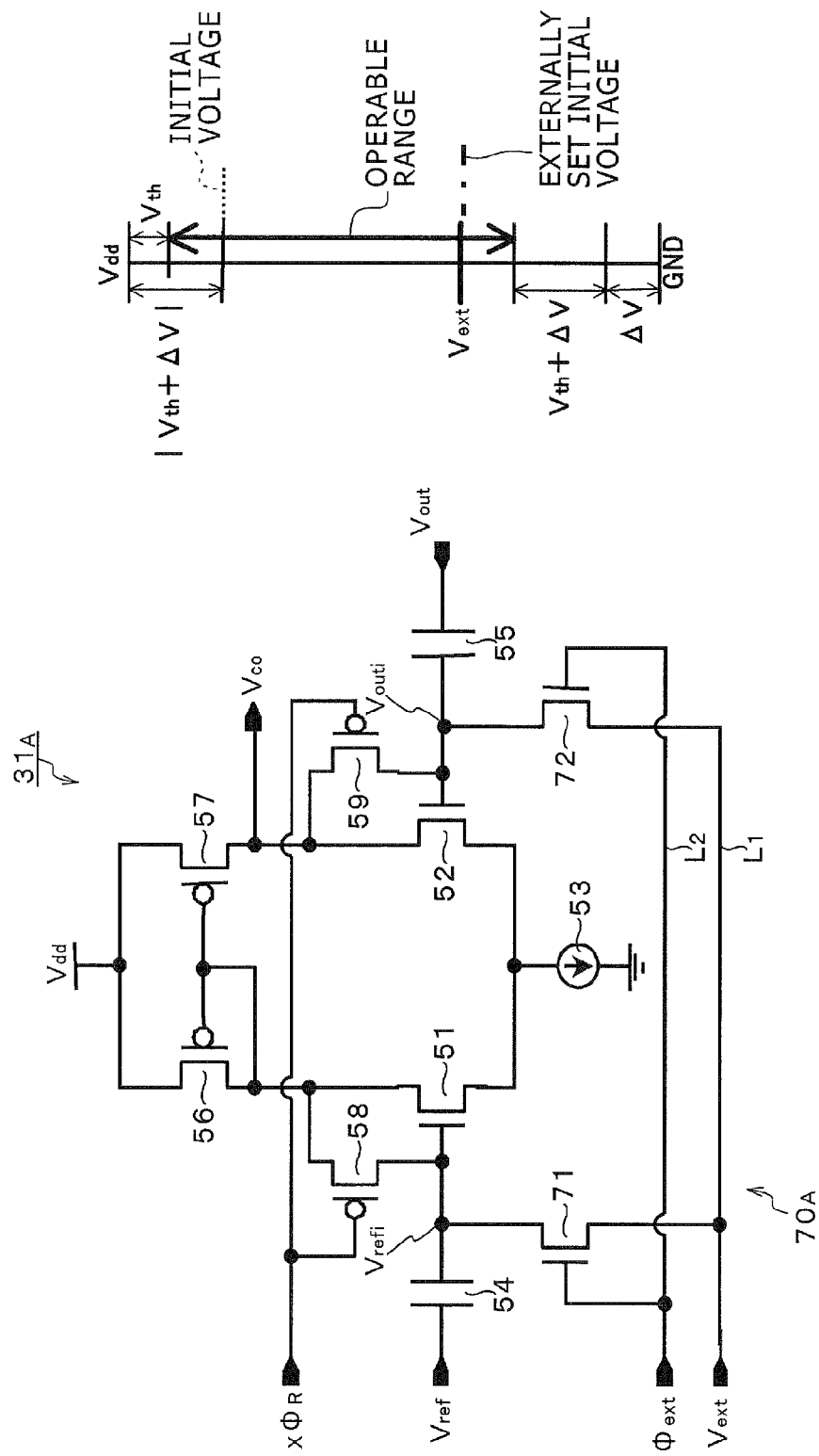

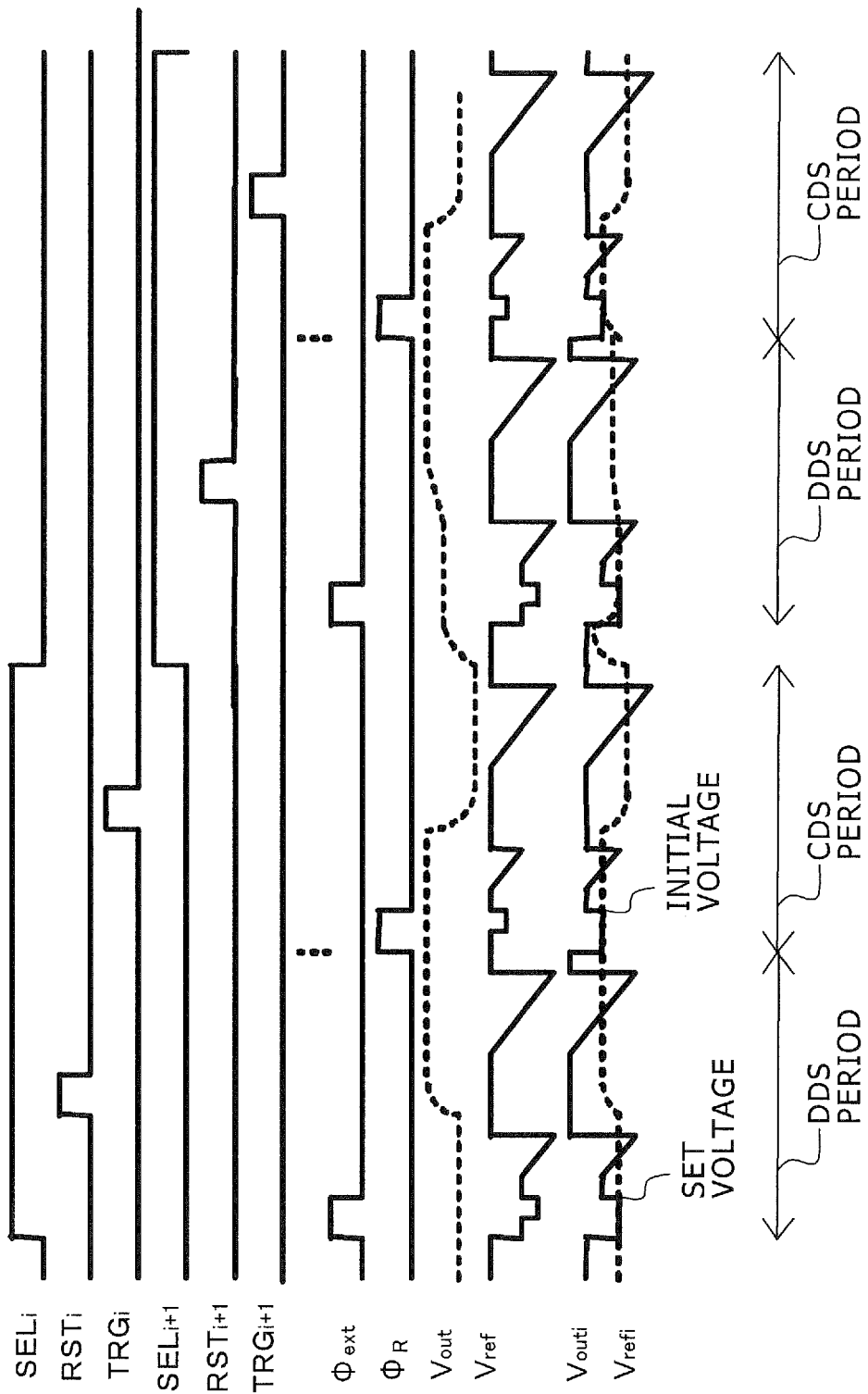

SOLID-STATE IMAGE PICKUP APPARATUS SIGNAL PROCESSING METHOD FOR A SOLID-STATE IMAGE PICKUP APPARATUS, AND ELECTRONIC APPARATUS

BACKGROUND OF THE INVENTION

1. Field of the Invention

This invention relates to a solid-state image pickup apparatus, a signal processing method for a solid-state image pickup apparatus, and an electronic apparatus.

2. Description of the Related Art

A solid-state image pickup apparatus is known which includes a unit pixel which in turn includes a photoelectric conversion section, a charge detection section and a transfer gate section for transferring charge accumulated in the photoelectric conversion section to the charge detection section. A solid-state image pickup apparatus of the type described usually carries out a noise removing process by correlation double sampling in order to remove noise upon a resetting operation. In the following description, the charge detection section is referred to as FD (Floating Diffusion) section. As a method of the noise removing process, a method which uses digital signal processing and another method which uses analog signal processing are available.

A solid-state image pickup apparatus which uses digital signal processing as a noise removing process is known and disclosed, for example, in Japanese Patent Laid-Open No. 2006-340044 (hereinafter referred to as Patent Document 1). The solid-state image pickup apparatus disclosed in Patent Document 1 incorporates column-parallel ADCs (Analog-Digital Converters; analog-digital conversion circuits) and is configured such that a plurality of unit pixels are arrayed in rows and columns and an ADC is disposed for each column.

In the solid-state image pickup apparatus incorporating column-parallel ADCs, a reset level $V_{rst}$ read out first is set as a reference voltage $V_{zr}$ for an AD conversion circuit, and the reference voltage $V_{zr}$ is used to AD convert the reset level $V_{rst}$ and a signal level $V_{sig}$. In particular, the reference voltage $V_{zr}$ is made equal to the reset level $V_{rst}$ so that, even if the reset level $V_{rst}$ is fluctuated by noise, the output amplitude $|V_{sig}-V_{rst}|$ of the pixel by signal charge can be included stably in an input voltage range of the AD conversion circuit.

Generally, the reference voltage $V_{zr}$ of the AD conversion circuit can be adjusted only within a sufficiently small range with respect to the input voltage range of the AD conversion circuit. Accordingly, the reference voltage $V_{zr}$ for the AD conversion circuit preferably is a signal whose fluctuation width is stable and limited like the reset level $V_{rst}$. On the contrary, a signal whose voltage exhibits a great amplitude in response to an incident light amount like the signal level $V_{sig}$ is not suitable as the reference voltage $V_{zr}$ for the AD conversion circuit.

A noise removing process of an existing solid-state image pickup apparatus is premised on an assumption that the reset level $V_{rst}$ is read out first and the signal level $V_{sig}$ is read out immediately succeeding the reset level $V_{rst}$ as in the solid-state image pickup apparatus which incorporates column-parallel ADCs described above. On the other hand, a solid-state image pickup apparatus which cannot read out the reset level $V_{rst}$ immediately preceding to the signal level $V_{sig}$ cannot acquire, before the signal level $V_{sig}$ of a certain unit pixel is AD converted, the reference voltage $V_{zr}$ from the same pixel.

As a solid-state image pickup apparatus which cannot read out the reset level $V_{rst}$ immediately preceding to the signal level $V_{sig}$, a complementary metal oxide semiconductor (CMOS) image sensor having a global exposure function is known and disclosed, for example, in Japanese Patent Laid-Open No. 2001-238132 (hereinafter referred hereinafter referred to as Patent Document 2). In the CMOS image sensor, in order to implement simultaneous exposure of all pixels, charge generated in the photoelectric conversion section is transferred to the FD section simultaneously with regard to all pixels. Then, in the state in which the signal charge is retained in the FD section, a reading out operation of the signal charge is carried out successively for all pixels.

As another solid-state image pickup apparatus which cannot read out the reset level $V_{rst}$ immediately preceding to the signal level $V_{sig}$, another CMOS image sensor is known and disclosed in Japanese Patent Laid-Open No. 2009-020176 (hereinafter referred to as Patent Document 3). The solid-state image pickup apparatus disclosed in Patent Document 3 includes a memory section for retaining photocharge transferred thereto from the photoelectric conversion section separately from the charge detection section. Also a CMOS image sensor wherein photocharge generated by a PN junction is read out directly by an amplification transistor is known and disclosed, for example, in "128×128 CMOS PHOTODIODE-TYPE ACTIVE PIXEL, SENSOR WITH ON-CHIP TIMING CONTROL AND SIGNAL CHAINELECTRONICS," SPIE, vol. 2415, Charge-Coupled Devices and Solid State Optical Sensors V, paper no. 34 (1995) (hereinafter referred to as Non-Patent Document 1). Further, an image sensor which uses an organic photoelectric conversion film is known and disclosed, for example, in Japanese Patent Laid-Open No. 2008-228265 (hereinafter referred to as Patent Document 4).

In a solid-state image pickup apparatus, the FD section is reset once upon simultaneous transfer from all pixels or upon starting of exposure, and therefore, at a timing at which a signal is to be read out, signal charge is accumulated or retained already in the FD section. Therefore, in order to remove fixed pattern noise such as a threshold value dispersion of an amplification transistor and so forth, it is necessary to set, after the signal level $V_{sig}$ is read out, the FD section to a predetermined potential and read out the predetermined potential as the reset level $V_{rst}$ as seen in FIG. 44.

However, in a solid-state image pickup apparatus wherein signal reading out is executed in a state in which signal charge is retained in the FD section for simultaneous exposure of all pixels or in a solid-state image pickup apparatus wherein signal charge is accumulated directly in the FD section and signal reading out is carried out, the FD section cannot be set to a predetermined potential immediate before the signal level $V_{sig}$ is read out. In this instance, a reference voltage to be used for AD conversion of the signal level cannot be acquired. Therefore, a predetermined voltage is generated by external application or by means of a resistor array or the like and supplied as a reference voltage to the AD conversion circuit as disclosed, for example, in Japanese Patent Laid-Open No. 2006-020176 (hereinafter referred to as Patent Document 5).

SUMMARY OF THE INVENTION

However, the reset level suffers not only from a dispersion among different unit pixels arising from a threshold dispersion of an amplification transistor and so forth but also from a difference by a great spatial fluctuation of a characteristic in a plane in a two-dimensional array of the unit pixels, that is, by an in-plane distribution or from a time-dependent variation by the temperature variation upon operation. Accordingly, it is necessary to assure a sufficient margin to the reset level. Therefore, it is necessary to expand the convertible input voltage range of the AD conversion circuit to a voltage range determined by adding such variation factors to a pixel output amplitude of signal charge to be acquired actually.

FIG. 45 illustrates an example of an in-plane distribution of the reset level in a longitudinal direction, that is, in a column direction which is an array direction of pixels in a pixel column. In addition to a difference of the reset level between adjacent pixels, a great fluctuation in characteristic in a plane, that is, an in-plane distribution, is observed. In the case where a fixed voltage is applied as a reference voltage as seen in FIG. 46, since a great error appears depending upon a pixel, it is necessary to expand the input voltage range of the AD conversion circuit.

For example, FIG. 47 illustrates a reset level with respect to a reference voltage and a signal level at a maximum amplitude in the case where the signal amplitude is −1 V in the maximum. In this instance, while the Peak-to-Peak signal amplitude from the reset level to the signal level is 1 V, an AD-convertible input voltage range of approximately 2 V is required. Further, in the case where the reset level is fluctuated upwardly or downwardly by a temperature variation, since the reference voltage is fixed, it is necessary to further expand the input voltage range as seen in FIG. 48.

In the related art disclosed in Patent Document 5 wherein a predetermined voltage is generated by external application or by means of a resistor array or the like and supplied as a reference voltage to an AD conversion circuit, the correlation between the reference voltage and the reset level is low. Therefore, the related art has a problem that the AD convertible input voltage range is small. The related art further has a problem that the AD convertible input voltage range is decreased also by the in-plane distribution of the pixel dispersion and the temperature dependency of the reset level.

It is to be noted here that, while setting of a reference voltage for an AD conversion circuit in a solid-state image pickup apparatus wherein a noise removing process is executed by digital signal processing is described above, the problems described above are not limited to the case of digital signal processing. In other words, the problems described similarly apply also to a solid-state image pickup apparatus wherein a reference voltage is used to carry out signal processing for an analog signal from a unit pixel (details are hereinafter described).

Therefore, it is desirable to provide a solid-state image pickup apparatus, a signal processing method for a solid-state image pickup apparatus and an electronic apparatus having a solid-state image pickup apparatus which can effectively eliminate a great difference in in-plane fluctuation of a characteristic and an offset component which depends upon the magnitude of parasitic capacitance.

According to an embodiment of the present invention, there is a solid-state image pickup apparatus, including:

a pixel array section in which a unit pixel including a photoelectric conversion section and a charge detection section for detecting charge generated by photoelectric conversion by the photoelectric conversion section is disposed;

a driving section adapted to carry out driving of reading out a signal of the unit pixel divisionally by twice as a first signal and a second signal; and a signal processing section adapted to set the first signal read out first from the unit pixel as a reference voltage for a processable input voltage range of the signal processing section, adjust the reference voltage so that the first and second signals may be included in the input voltage range and carry out signal processing for the first and second signals using the adjusted reference voltage.

According to another embodiment of the present invention, there is a signal processing method for a solid-state image pickup apparatus in which a unit pixel including a photoelectric conversion section and a charge detection section for detecting charge generated by photoelectric conversion by the photoelectric conversion section is disposed, the signal processing method including the steps, carried out by a signal processing section, of:

reading out a signal of the unit pixel divisionally by twice as a first signal and a second signal;

setting the first signal read out first from the unit pixel as a reference voltage for a processable input voltage range of the signal processing section;

adjusting the reference voltage so that the first and second signals may be included in the input voltage range; and carrying out signal processing for the first and second signals using the adjusted reference voltage.

According to further embodiment of the present invention, there is an electronic apparatus, including:

a solid-state image pickup apparatus including a pixel array section in which a unit pixel including a photoelectric conversion section and a charge detection section for detecting charge generated by photoelectric conversion by the photoelectric conversion section is disposed;

a driving section adapted to carry out driving of reading out a signal of the unit pixel divisionally by twice as a first signal and a second signal; and a signal processing section adapted to set the first signal read out first from the unit pixel as a reference voltage for a processable input voltage range of the signal processing section, adjust the reference voltage so that the first and second signals may be included in the input voltage range and carry out signal processing for the first and second signals using the adjusted reference voltage.

In the solid-state image pickup apparatus, the first signal read out first from the unit pixel is used as the reference voltage for the input voltage range within which the input voltage can be processed by the signal processing section. At this time, if the first signal is a signal based on signal charge accumulated or retained in the charge detection section, that is, a signal level, then the signal level is used as the reference voltage. On the other hand, if the first signal is a signal based on the reset voltage when the charge detection section is reset, that is, a reset level, then the reset level is used as the reference voltage.

After the first signal read out first is set as the reference voltage, the reference voltage is adjusted so that the first and second signals may be included in the input voltage range within which the input voltage can be processed by the signal processing section. As a result of the adjustment of the reference voltage, signal processing can be executed for the first and second signals in the state in which the first and second signals are included in the input voltage range. Accordingly, irrespective of whether the first signal read out first is the signal level or the reset level, the signal processing can be carried out with certainty for the first and second signals after the reference voltage is set using the signal of the pixel of the processing object.

With the solid-state image pickup apparatus, since the voltage is set using a signal of a pixel of a processing object, such a great difference in in-plane fluctuation of a characteristic or an in-plane distribution and an offset component which depends upon the magnitude of parasitic capacitance as in the case in which a predetermined voltage generated separately is used to set a reference voltage can be eliminated effectively. Consequently, a margin to an output amplitude of the pixel necessary for the input voltage range within which the input voltage can be processed by the signal processing section can be reduced.

BRIEF DESCRIPTION OF THE DRAWINGS

FIG. 7 is a similar view but illustrating a voltage of the internal node and an operation range of the comparator of FIG. 5A in a high illuminance state upon DDS driving;

FIG. 8 is a similar view but illustrating a voltage of the internal node and an operation range of the comparator of FIG. 5A in a low illuminance state upon DDS driving;

FIGS. 9A and 9B are diagrammatic views illustrating an operation range of the comparator of FIG. 5A in a low illuminance state and a high illuminance state, respectively, in the case where the inclination of a reference signal is inverted;

FIG. 10A is a circuit diagram showing an example of a configuration of a comparator of a PMOS input configuration and FIG. 10B is a diagrammatic view illustrating an operation range of the comparator;

FIG. 11A is a circuit diagram showing an example of a configuration of a comparator according to a working example 1 which includes a function of adjusting a reference voltage for an AD conversion circuit and FIG. 11B is a diagrammatic view illustrating an operation range of the comparator;

FIG. 15 is a timing waveform diagram illustrating circuit operation of the comparator according to the working example 1 of the first embodiment of the present disclosure;

DETAILED DESCRIPTION OF THE PREFERRED EMBODIMENTS

In the following, preferred embodiments of the present invention are described in detail with reference to the accompanying drawings. It is to be noted that the description is given in the following order.

1. First Embodiment (example of a column AD conversion circuit)
   1-1. System Configuration
   1-2. Pixel Configuration
   1-3. Noise Removing Process by Correlation Double Sampling
   1-4. Related Art
   1-5. Configuration on which the First Embodiment is Based
   1-6. Characteristics of the First Embodiment
2. Second Embodiment (example of a column amplification circuit)
   2-1. System Configuration
   2-2. Characteristics of the Second Embodiment
3. Other Pixel Configurations
4. Modifications
5. Electronic Apparatus (example of an image pickup apparatus)

1. First Embodiment

1-1. System Configuration

Figure 1:
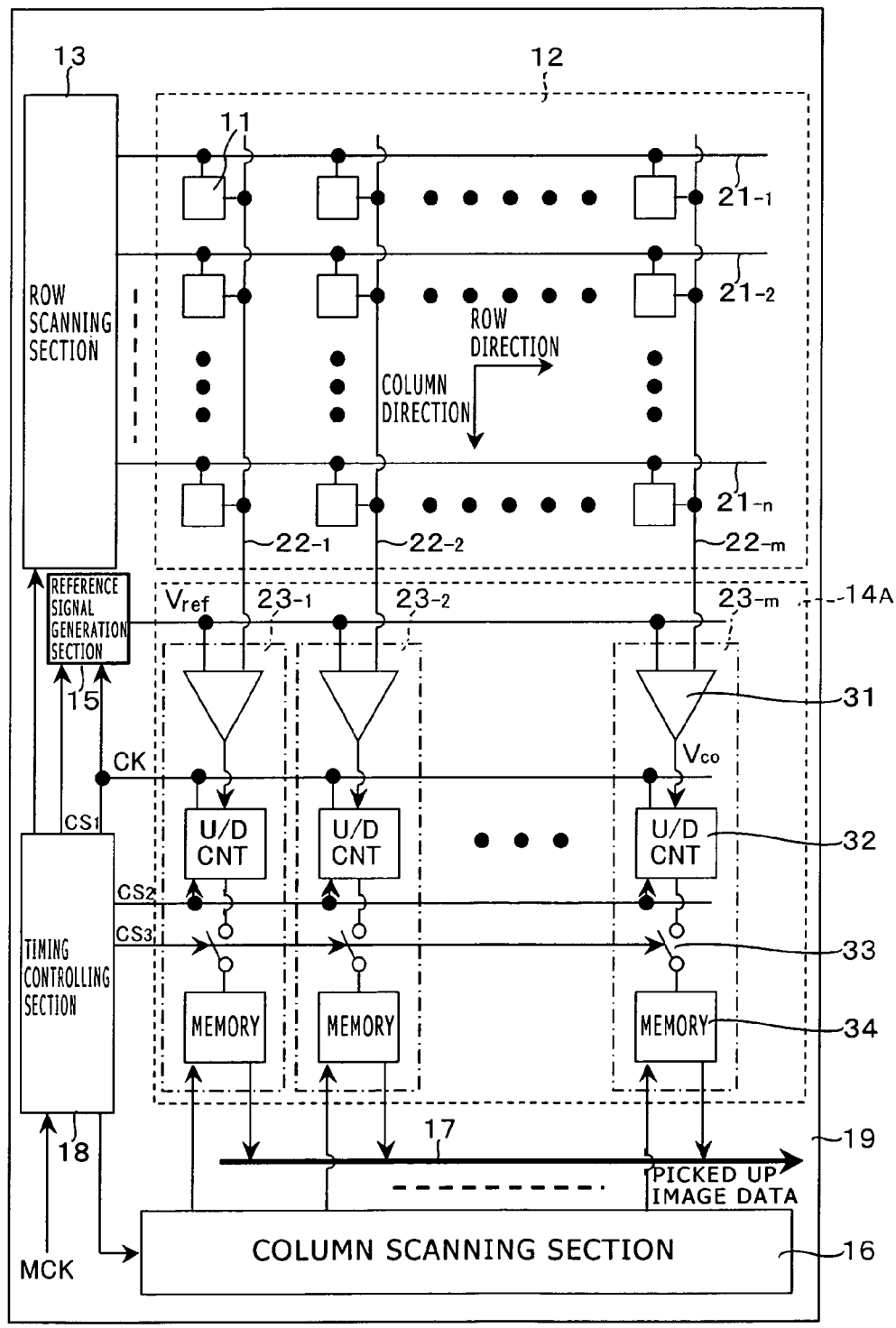
FIG. 1 is a system block diagram showing a general configuration of a CMOS image sensor according to a first embodiment of the present disclosure.

FIG. 1 shows a general configuration of a solid-state image pickup apparatus according to a first embodiment of the present invention, for example, a complementary metal oxide semiconductor (CMOS) image sensor which is a kind of X-Y address type solid-state image pickup apparatus. The CMOS image sensor is an image sensor produced applying a CMOS process or partially using a CMOS process.

Referring to FIG. 1, the CMOS image sensor $10_A$ according to the present embodiment includes a pixel array section 12 having a plurality of unit pixels 11 disposed two-dimensionally in rows and columns, and peripheral driving and signal processing systems for driving the unit pixels 11 of the pixel array section 12. In the CMOS image sensor $10_A$ shown in FIG. 1, as the peripheral driving and signal processing systems, for example, a row scanning section 13, a column processing section $14_A$, a reference signal generation section 15, a column scanning section 16, a horizontal outputting line 17 and a timing controlling section 18 are provided. The driving and signal processing systems are integrated on a semiconductor substrate or chip 19 on which the pixel array section 12 is provided.

In the system configuration described, the timing controlling section 18 generates clock signals used as a reference for operation of the row scanning section 13, column processing section $14_A$, reference signal generation section 15, column scanning section 16 and so forth and control signals based on a master clock MCK. The clock signals and control signals generated by the timing controlling section 18 are supplied as driving signals to the row scanning section 13, column processing section $14_A$, reference signal generation section 15, column scanning section 16 and so forth.

The pixel array section 12 is configured such that a plurality of unit pixels 11, which may be hereinafter referred to sometimes merely as "pixels," having a photoelectric conversion section for generating and accumulating photocharge in response to an amount of light received thereby are disposed in a row direction and a column direction, that is, two-dimensionally in a matrix. The row direction is a direction in which pixels in a pixel row are arrayed, that is, a horizontal direction, and the column direction is a direction in which pixels of a pixel column are arrayed, that is, a vertical direction.

In the pixel array section 12, a plurality of row controlling lines 21, that is, $21_{-1}$ to $21_{-n}$, are wired in the row direction for the individual pixel rows and a plurality of column signal lines 22, that is, $22_{-1}$ to $22_{-m}$, are wired in the column direction on the array of the pixels in the matrix. The row controlling lines 21 transmit a control signal for controlling the unit pixels 11 upon reading out from the unit pixels 11. While, in FIG. 1, one wire is shown for each of the row controlling lines 21, the number of wires of each row controlling lines 21 is not limited to one. The row controlling lines $21_{-1}$ to $21_{-n}$ are connected at one end thereof to output terminals of the row scanning section 13 which individually correspond to the rows.

The row scanning section 13 is configured from a shift register, an address decoder or the like and drives the unit pixels 11 of the pixel array section 12 simultaneously at a time or in a unit of a row or the like. In other words, the row scanning section 13 configures a driving section for driving the unit pixels 11 of the pixel array section 12 together with the timing controlling section 18 which controls the row scanning section 13. Although a particular configuration of the row scanning section 13 is not shown, the row scanning section 13 generally has two scanning systems including a reading out scanning system and a sweeping out scanning system.

The reading out scanning system selectively and successively scans the unit pixels 11 of the pixel array section 12 in a unit of a row in order to read out signals from the unit pixels 11. The signals read out from the unit pixels 11 are analog signals. The sweeping out scanning system carries out sweeping scanning preceding by a period of time of a shutter speed to reading out scanning for a reading out row for which the reading out scanning is to be carried out by the reading out scanning system.

By the sweeping out scanning by the sweeping out scanning system, unnecessary charge is swept out from the photoelectric conversion portion of the unit pixels 11 of the reading out row thereby to reset the photoelectric conversion portions. Then, by sweeping out unnecessary charge by means of the sweeping out scanning system, that is, by resetting the photoelectric conversion sections, electronic shutter operation is carried out. The electronic shutter operation is an operation of discharging photocharge of the photoelectric conversion sections to newly start exposure to light, that is, an operation of starting accumulation of photocharge.

Signals read out by the reading out operation by the reading out scanning system correspond to amounts of light received after the immediately preceding reading out operation or electronic shutter operation. Then, a period after the reading out timing by the immediately preceding reading out operation or the sweeping out timing by the electronic shutter operation till the reading out timing by the reading out operation in the current cycle becomes an exposure period of photocharge to the unit pixels 11.

The column processing section 14$_A$ includes AD (analog-digital) conversion circuits 23, that is, 23$_{-1}$ to 23$_{-m}$ provided, for example, in a one-by-one corresponding relationship to the pixel columns of the pixel array section 12, that is, to the column signal lines 22, that is, 22$_{-1}$ to 22$_{-m}$. The AD conversion circuits 23, that is, 23$_{-1}$ to 23$_{-m}$, convert an analog signal or pixel signal outputted from the unit pixels 11 of the pixel array section 12 for each pixel column into a digital signal.

The reference signal generation section 15 generates a reference signal $V_{ref}$ of a ramp waveform or inclined waveform whose voltage value varies stepwise as time passes. The reference signal generation section 15 can be configured using, for example, a DAC (digital-analog conversion) circuit. It is to be noted that the reference signal generation section 15 is not limited to a circuit configured using a DAC circuit.

The reference signal generation section 15 a reference signal $V_{ref}$ of a ramp waveform based on a clock CK supplied thereto from the timing controlling section 18 under the control of a controlling signal $CS_1$ supplied thereto from the timing controlling section 18. The reference signal generation section 15 supplies the generated reference signal $V_{ref}$ to the AD conversion circuits 23$_{-1}$ to 23$_{-m}$ of the reference signal generation section 15.

All of the AD conversion circuits 23$_{-1}$ to 23$_{-m}$ have the same configuration. It is to be noted here that the following description is given taking the AD conversion circuit 23$_{-m}$ for the mth column as an example. The AD conversion circuit 23$_{-m}$ includes a comparator 31, an up/down counter (denoted by "U/D CNT" in FIG. 1) 32 serving as a counting section, a transfer switch 33, and a memory device 34.

The comparator 31 receives a signal voltage $V_{out}$ of the column signal line 22$_{-m}$ corresponding to a pixel signal outputted from each unit pixel 11 in the nth column of the pixel array section 12 as a comparison input thereto. The comparator 31 further receives a reference signal $V_{ref}$ of a ramp wave supplied thereto from the reference signal generation section 15 as a reference input thereto. The comparator 31 compares the signal voltage $V_{out}$ and the reference signal $V_{ref}$ inputted thereto with each other. Then, the comparator 31 outputs, for example, an output $V_{co}$ of a first state such as, for example, a high level when the reference signal $V_{ref}$ is higher than the signal voltage $V_{out}$ but outputs the output $V_{co}$ of a second state such as, for example, a low level when the reference signal $V_{ref}$ is equal to or lower than the signal voltage $V_{out}$.

The up/down counter 32 is an asynchronous counter and is supplied with the clock CK from the timing controlling section 18 at a timing same as that at the reference signal generation section 15 under the control of a controlling signal $CS_2$ supplied thereto from the timing controlling section 18. The up/down counter 32 carries out down counting or up counting in synchronism with the clock CK to measure a comparison period from a start to an end of a comparison operation by the comparator 31.

The transfer switch 33 is placed into an on or closed state at a point of time at which a counting operation of the up/down counter 32 regarding the unit pixels 11 in a certain pixel row is completed under the control of a controlling signal $CS_3$ supplied thereto from the timing controlling section 18. Then, the transfer switch 33 transfers a result of the counting of the up/down counter 32 to the memory device 34.

In this manner, a comparison operation for analog signals supplied for each pixel column from each of the unit pixels 11 of the pixel array section 12 through the column signal lines 22$_{-1}$ to 22$_{-m}$ is carried out by the comparators 31 at first in the AD conversion circuits 23$_{-1}$ to 23$_{-m}$. Then, the up/down counter 32 carries out a counting operation for a period from a start to an end of the comparison operation by the comparator 31 to convert the analog signals into digital signals, which are stored into the memory devices 34.

The column scanning section 16 is configured from a shift register, an address decoder or the like and carries out control of the column address or column scanning of the AD conversion circuits 23$_{-1}$ to 23$_{-m}$ of the column processing section 14$_A$. The digital signals converted by the AD conversion circuits 23$_{-1}$ to 23$_{-m}$ are successively read out to the horizontal outputting line 17 under the control of the column scanning section 16 and outputted as picked up image data through the horizontal outputting line 17.

It is to be noted that, although not particularly shown because there is no direct relation to the present disclosure, also it is possible to provide circuits and so forth for carrying out various signal processes for picked up image data outputted through the horizontal outputting line 17 in addition to the components described above. In this instance, it does not matter whether or not such circuits are provided on the semiconductor substrate 19 on which the pixel array section 12 is provided.

The CMOS image sensor 10$_A$ which incorporates the column-parallel ADC of the configuration described above can carry out global exposure of executing starting and ending of exposure at the same timings to all pixels 11 of the pixel array section 12. This global exposure is executed by driving by the driving section configured from the row scanning section 13 and the timing controlling section 18. The global shutter function which implements the global exposure is a shutter operation suitable for use with image pickup of an image pickup object which moves at a high speed or with a sensing application which requires simultaneity of a picked up image.

It is to be noted that, while, in the present example, the configuration of the column processing section 14$_A$ wherein the AD conversion circuits 23 are provided in a one-by-one corresponding relationship to the column signal lines 22 is taken as an example, the column processing section 14$_A$ is not limited to the configuration wherein the AD conversion circuits 23 and the column signal lines 22 are provided in a one-by-one corresponding relationship to each other. For example, it is possible to adopt a configuration wherein one AD conversion circuit 23 is used commonly by a plurality of pixel columns and is used time-divisionally by the plural pixel columns.

1-2. Pixel Configuration

Figure 2:
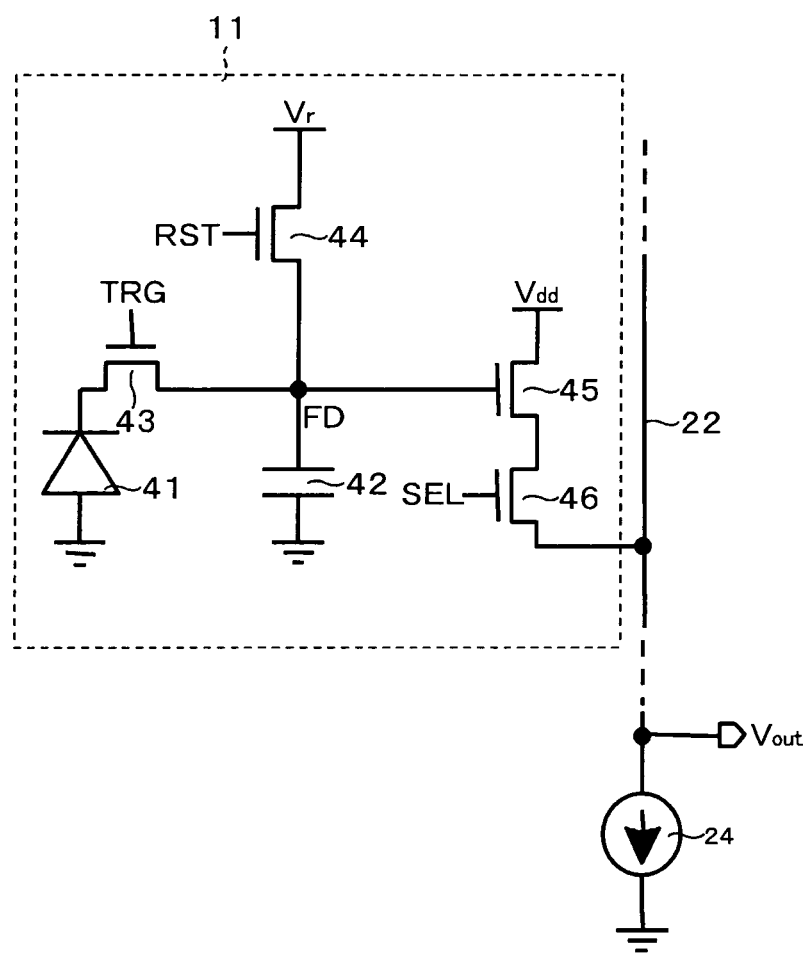
FIG. 2 is a circuit diagram showing an example of a configuration of a unit pixel.

FIG. 2 is a circuit diagram showing an example of a configuration of a unit pixel 11. Referring to FIG. 2, the unit pixel 11 of the present configuration example includes, for example, a photodiode 41 as a photoelectric conversion section thereof. The unit pixel 11 includes, in addition to the photodiode 41, for example, a charge detection section 42, a transfer transistor or transfer gate section 43, a reset transistor 44, an amplification transistor 45, and a selection transistor 46.

It is to be noted here that, for example, an N-channel type MOS transistor is used for the transfer transistor 43, reset transistor 44, amplification transistor 45 and selection transistor 46. However, the combination of conduction types of the transfer transistor 43, reset transistor 44, amplification transistor 45 and selection transistor 46 is a mere example, and the combination is not limited to this.

To the unit pixels 11 of the same pixel row, a plurality of control lines are wired commonly as the row controlling lines 21, that is, $21_{-1}$ to $21_{-n}$ described hereinabove. In FIG. 2, the plural control lines are not shown for the simplified illustration. The plural control lines are connected to output terminals of the row scanning section 13 corresponding to the pixel rows in a unit of a pixel row. The row scanning section 13 suitably outputs a transfer signal TRG, a reset signal RST and a selection signal SEL to the plural control lines.

The photodiode 41 is connected at the anode electrode thereof to a negative side power supply such as, for example, the ground, and photoelectrically converts light received thereby into photocharge, here, photoelectrons, of a charge amount corresponding to the received light amount and accumulates the photocharge. The photodiode 41 is electrically connected at the cathode electrode thereof to the gate electrode of the amplification transistor 45 through the transfer transistor 43.

A region electrically connected to the gate electrode of the amplification transistor 45 is a charge detection section 42 for converting charge into a voltage. The charge detection section 42 is hereinafter referred to as FD (floating diffusion/floating diffusion region/impurity diffusion region) section 42.

The transfer transistor 43 is connected between the cathode electrode of the photodiode 41 and the FD section 42. To the gate electrode of the transfer transistor 43, a transfer signal TRG whose high level such as for example, a $V_{dd}$ level, is an active level (hereinafter referred to as High active) is applied from the row scanning section 13. The transfer transistor 43 is placed into a conductive state in response to the transfer signal TRG to transfer photocharge photoelectrically converted by and accumulated into the photodiode 41 to the FD section 42.

The reset transistor 44 is connected at the drain electrode thereof to a reset potential $V_r$ and at the source electrode thereof to the FD section 42. To the gate electrode of the reset transistor 44, the High active reset signal RST is applied from the row scanning section 13. The reset transistor 44 is placed into a conducting state in response to the reset signal RST to abandon the charge of the FD section 42 to the reset potential $V_r$ thereby to reset the FD section 42.

The amplification transistor 45 is connected at the gate electrode thereof to the FD section 42 and at the drain electrode thereof to the pixel power supply $V_{dd}$. The amplification transistor 45 serves as an inputting portion of a source follower which is a reading out circuit for reading out a signal obtained by photoelectric conversion by the photodiode 41. In particular, the amplification transistor 45 is connected at the source electrode thereof to a column signal line 22 through the selection transistor 46 to cooperate with a current source 24 connected to one end of the column signal line 22 to configure a source follower.

The selection transistor 46 is connected, for example, at the drain electrode thereof to the source electrode of the amplification transistor 45 and at the source electrode thereof to the column signal line 22. To the gate electrode of the selection transistor 46, the High active selection signal SEL is applied from the row scanning section 13. The selection transistor 46 is placed into a conducting state in response to the selection signal SEL to place the unit pixel 11 into a selected state thereby to transmit a signal outputted from the amplification transistor 45 to the column signal line 22.

It is to be noted that also it is possible to adopt another circuit configuration wherein the selection transistor 46 is connected between the pixel power supply $V_{dd}$ and the drain electrode of the amplification transistor 45.

1-3. Noise Removing Process by Correlation Double Sampling

Figure 3:
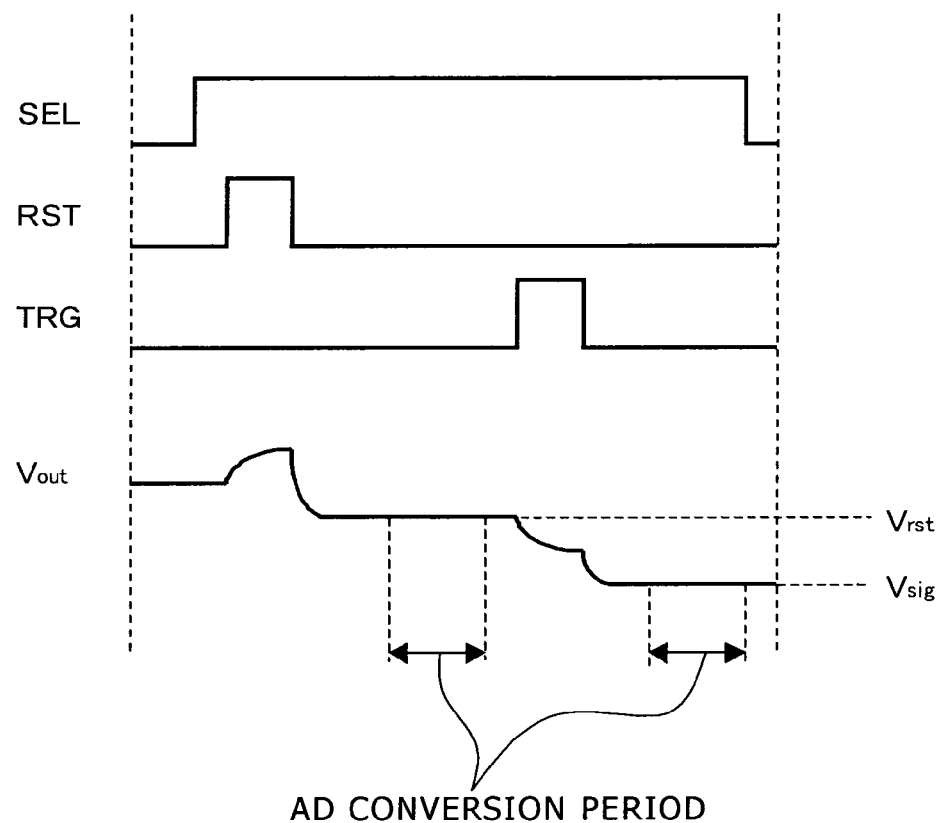
FIG. 3 is a timing waveform diagram illustrating a correlation double sampling operation in the case where a reset level and a signal level are read out in this order.

In the solid-state image pickup apparatus configured such that a plurality of such pixels 11 having the configuration described above are disposed two-dimensionally in rows and columns, usually a noise removing process by correlation double sampling is carried out in order to remove noise upon a resetting operation. Referring to FIG. 3, a unit pixel 11 in a state selected by a selection signal SEL resets the FD section 42 to a reset potential $V_r$ in response to the reset signal RST and reads out the reset potential $V_r$ as a reset level $V_{rst}$. Then, the transfer transistor 43 is driven by the transfer signal TRG to transfer charge accumulated in the photodiode 41 to the FD section 42, and the charge is read out as a signal level $V_{sig}$.

To the reset level $V_{rst}$ and the signal level $V_{sig}$, noise, that is, random noise, which is generated at random upon each resetting such as thermal noise or noise by coupling by parasitic capacitance is applied when the FD section 42 is reset to the reset potential $V_r$. A different noise component is applied every time the FD section 42 is reset.

According to the reading out method by which the reset level $V_{rst}$ is read out first, since random noise generated upon resetting is held by the FD section 42, a noise amount equal to the reset level $V_{rst}$ is held in the signal level $V_{sig}$ read out with the signal charge added thereto. Therefore, a signal from which such noise is removed can be obtained by carrying out the correlation double sampling operation of subtracting the reset level $V_{rst}$ from the signal level $V_{sig}$.

In particular, in the correlation double sampling operation, to reset the FD section 42 and read out the reset level before signal charge is transferred to the FD section 42 is a condition for making it possible to remove the reset noise. Also noise (fixed pattern noise) which is applied fixedly such as threshold value noise of the amplification transistor 45 used for reading out a signal can be removed.

The reset level $V_{rst}$ and the signal level $V_{sig}$ read out from the unit pixel 11 are converted into digital signals by the AD conversion circuit 23. Since the range of an input signal which can be converted by the AD conversion circuit 23 is usually limited, it is necessary to use such a design that an analog signal to be outputted from the unit pixel 11 is included in the range of the input voltage range of the AD conversion circuit 23.

In other words, the voltage range from the reset level $V_{rst}$ to the signal level $V_{sig}$ to be acquired has to be included in the input voltage range of the AD conversion circuit 23. For example, if the reset level $V_{rst}$ is 3 V and the amplitude of the output originating from the signal charge is −1 V, then the maximum signal level to be acquired is 2 V. In this instance, the input voltage range of the AD conversion circuit 23 for conversion may be 2 V to 3 V.

However, the reset level $V_{rst}$ is actually different among different pixels due to a threshold dispersion of the amplification transistor 45, an offset by parasitic capacitance with a column signal line 22 and so forth. For example, even if the average value of the reset level $V_{rst}$ of the unit pixels 11 disposed two-dimensionally is 3 V, there is the possibility that some unit pixel 11 may output a reset level $V_{rst}$ of 3.1 V or 2.9 V. In this instance, even if the width of the amplitude by signal charge is −1 V uniformly, the AD conversion circuit 23 has to be able to convert an input voltage of 1.9 V to 3.1 V. To expand the convertible input voltage range of the AD conversion circuit 23 is nothing but to enhance a basic performance of the AD conversion circuit 23, and this makes a factor of increase of the power supply voltage, power consumption, area and so forth.

From this, preferably the width of the convertible input voltage range of the AD conversion circuit 23 is set near to the amplitude of the output originating from the signal voltage. Therefore, a method of adjusting the reference voltage for the input voltage range of the AD conversion circuit 23 is adopted. By shifting the input voltage range of the AD conversion circuit 23 with the reference voltage, it is possible to remove an offset component of an output signal of a pixel, that is, an input signal to the AD conversion circuit 23 to prevent expansion of the necessary input voltage range by a dispersion of the reset level $V_{rst}$.

1-4. Related Art

Figure 4:
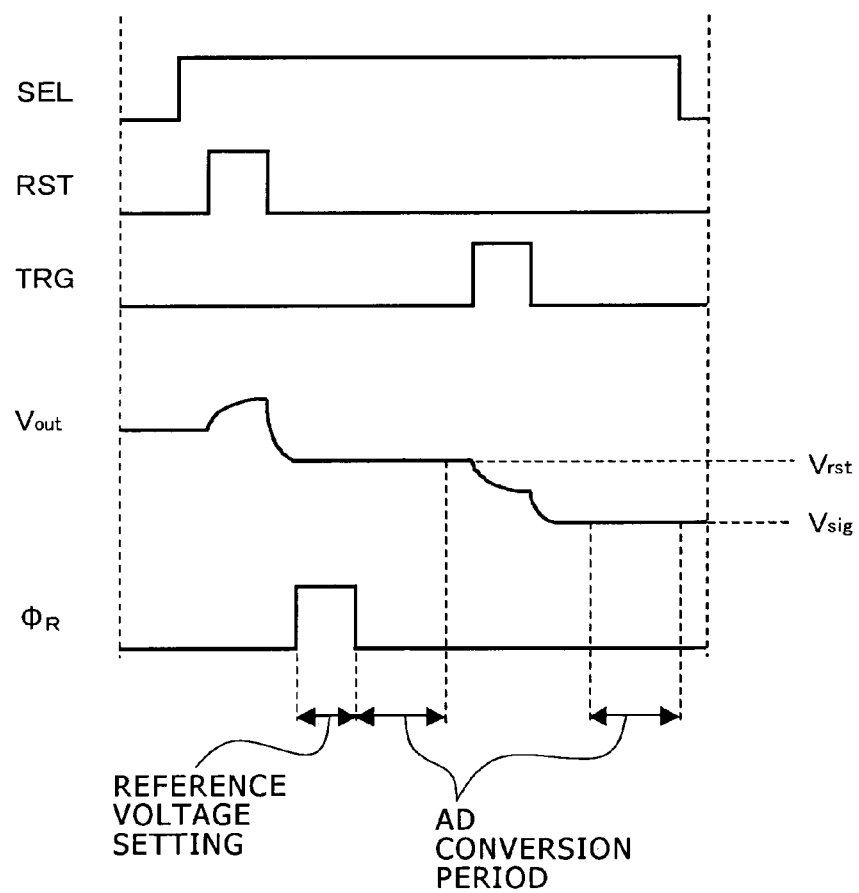
FIG. 4 is a timing waveform diagram illustrating operation in the case where a reset level read out first is set as a reference voltage for an AD conversion circuit.

In the related art disclosed in Patent Document 1, a reset level $V_{rst}$ read out first from a unit pixel 11 is set as a reference voltage $V_{zr}$ of an AD conversion circuit 23 and the reset level $V_{rst}$ and a signal level $V_{sig}$ are AD converted as seen in FIG. 4. By making the reference voltage $V_{zr}$ equal to the reset level $V_{rst}$ in this manner, even if the reset level $V_{rst}$ is fluctuated by noise, it is possible to include an output range $|V_{sig}-V_{rst}|$ of the unit pixel 11 by signal charge stably within an input voltage range of the AD conversion circuit 23.

As described hereinabove, generally the reference voltage $V_{zr}$ of the AD conversion circuit 23 can be adjusted only within a sufficiently small range with respect to the input voltage range of the AD conversion circuit 23. Accordingly, the reference voltage $V_{zr}$ of the AD conversion circuit 23 preferably is a signal with regard to which the width of a dispersion is stable and limited like the reset level $V_{rst}$. Conversely, a signal whose voltage varies by a great amount in response to an incident light amount like the signal level $V_{sig}$ is not suitable as the reference voltage $V_{zr}$ of the AD conversion circuit 23.

In this manner, in the related art disclosed in Patent Document 1, it is assumed that, upon a noise removing process, the reset level $V_{rst}$ is read out first from the unit pixel 11, and the signal level $V_{sig}$ is read out immediately after the reset level $V_{rst}$.

1-5. Configuration on which the First Embodiment is Based

In contrast, the CMOS image sensor $10_A$ according to the first embodiment adopts a configuration that signal reading out is executed in a state in which signal charge is held in the FD section 42 for all pixel simultaneous exposure. In other words, the CMOS image sensor $10_A$ according to the first embodiment is configured such that the reset level $V_{rst}$ cannot be read out immediately prior to the signal level $V_{sig}$. Accordingly, under the idea described above, the reference voltage $V_{zr}$ cannot be acquired from a unit pixel 11 before the signal level $V_{sig}$ of the same pixel is AD converted.

Meanwhile, in the CMOS image sensor $10_A$ which implements all pixel simultaneous exposure, basically an operation of reading out a signal from the unit pixels 11 is carried out twice for each one row. As a prerequisite in the case where a reading out operation is carried out twice, it is assumed that the unit pixels 11 have a pixel structure that, when the photoelectrically converted charge amount exceeds a predetermined charge amount, signal charge exceeding the predetermined saturation charge amount is accumulated into the FD section 42.

It is to be noted that, in the present specification, the illuminance when light with which the photoelectrically converted charge amount exceeds a predetermined charge amount is inputted is referred to as "high illuminance." On the other hand, the illuminance when light with which the photoelectrically converted charge amount is equal to or smaller than the predetermined charge amount is inputted is referred to as "low illuminance."

In the first time reading out operation of the two times of reading operation, driving, that is, first driving, of reading out signal charge retained or accumulated in the FD section 42 as a signal level and then resetting the FD section 42 to a predetermined potential and reading out the predetermined potential as a reset level is carried out. In the following description, the first time driving is referred to as "DDS (Double Data Sampling) driving." In this DDS driving, a signal level read out first from a unit pixel 11 is used as a reference voltage for a convertible input voltage range of the AD conversion circuit 23.

In the second time reading out operation, after the FD section 42 is reset to the predetermined potential and the predetermined potential is read out as a reset level, driving, that is, second driving, of transferring signal charge accumulated in the photodiode 41 to the FD section 42 and reading out the signal charge of the FD section 42 as a signal level is carried out. In the following description, the second time driving is referred to as "CDS (Correlated Double Sampling) driving." In this CDS driving, a reset level read out first from the unit pixel 11 is used as a reference voltage for a convertible input voltage range of the AD conversion circuit 23.

Here, a reason why both of the DDS driving and the CDS driving are used is described. As apparent from the foregoing description, by using the FD section 42 as a signal retaining or storage section, the dynamic range of a signal can be expanded in comparison with that in an alternate case in which the FD section 42 is not used. However, since the DDS driving involves a resetting operation interposed between reading out of the signal level and reading out of the reset level, the correlation between the reset level included in the signal level read out first and the reset level included in the signal level read out later is low.

In contrast, in the CDS driving, since the reset level and the signal level are read out successively after a reset operation is carried out, the correlation between the reset level included in the signal level read out first and the reset level included in the signal level read out later is high. Accordingly, since the CDS driving can carry out noise removal with a high degree of accuracy in comparison with the DDS driving, it is advantageous to achieve high picture quality. From this reason, in order to achieve high picture quality while global exposure is implemented, the driving method which uses both of the DDS driving and the CDS driving is more preferable than the driving method which uses only the DDS driving.

Incidentally, in the DDS driving, the signal level read out first from the unit pixel 11 is used as a reference voltage for the AD conversion circuit 23. However, as described hereinabove, the level of the signal whose voltage varies by a great amount depending upon the incident light amount originally is not suitable as a reference voltage for the AD conversion circuit 23. In the case where the signal level is used as a reference voltage for the AD conversion circuit 23, it is necessary to eliminate the problem of assurance of an operation range of the comparator 31 which configures the input stage of the AD conversion circuit 23. This problem is described in detail. However, prior to the description, a related configuration of the comparator 31 which configures the input stage of the AD conversion circuit 23 is described.

Related Configuration of a Comparator which Configures the Input Stage of an AD Conversion Circuit FIGS. 5A and 5B are views showing a related configuration of a comparator which configures the input stage of an AD conversion circuit, and particularly FIG. 5A shows an example of a configuration of a comparator and FIG. 5B illustrates an operation range of the comparator.

As seen in FIG. 5A, the comparator 31 having a related configuration includes differential pair transistors or comparator transistors 51 and 52 having the source electrodes connected commonly, and a current source 53 connected between the source common node of the differential pair transistors 51 and 52 and the ground. The differential pair transistors 51 and 52 are formed using an N-channel MOS transistor (hereinafter referred to as "NMOS transistor").

To the gate electrode of the NMOS transistor 51, a reference signal $V_{refi}$ of a ramp or stepped waveform generated by the reference signal generation section 15 is applied through a capacitor 54. To the gate electrode of the NMOS transistor 52, a signal voltage $V_{out}$ supplied from a unit pixel 11 through a column signal line $22_{-m}$ is applied through a capacitor 55.

A P-channel MOS transistor (hereinafter referred to as "PMOS transistor") 56 of a diode connection configuration, that is, having the gate electrode and the drain electrode thereof connected commonly, is connected between the drain electrode of the NMOS transistor 51 and a pixel power supply $V_{dd}$. A PMOS transistor 57 is connected between the drain electrode of the NMOS transistor 52 and the pixel power supply $V_{dd}$. The PMOS transistors 56 and 57 are connected commonly at the gate electrode thereof.

A PMOS transistor 58 is connected between the gate electrode and the drain electrode of the NMOS transistor 51. A PMOS transistor 59 is connected also between the gate electrode and the drain electrode of the NMOS transistor 52. Then, an inverted signal $x\Phi_R$ of a control signal $\Phi_R$ for being used for control to set a reference voltage is applied to the gate of the PMOS transistors 58 and 59.

In the comparator 31 having the configuration described above, a reference voltage for the AD conversion circuit 23 is retained into the capacitors 54 and 55 by application of the inverted signal $x\Phi_R$ of the control signal $\Phi_R$ to the gate electrode of the PMOS transistors 58 and 59. Then, the comparator 31 compares the reference signal $V_{ref}$ and the signal voltage $V_{out}$ of the column signal line $22_{-m}$ with each other. In particular, the comparator 31 retains a timing at which a comparison result or output $V_{co}$ thereof with the signal voltage $V_{out}$ in response to a change of the reference signal $V_{ref}$ as a digital signal.

The comparison output $V_{co}$ changes when the amplitudes of the reference signal $V_{ref}$ and the signal voltage $V_{out}$ become equal to that of the reference voltage acquired with the inverted signal $x\Phi_R$ of the control signal $\Phi_R$. Referring to FIG. 5B, reference character $V_{th}$ represents the threshold voltage of a MOS transistor, and $\Delta V$ represents a potential difference between the reset level and the signal level at the unit pixel 11. It is to be noted that the AD conversion circuit 23 to which the present disclosure is applied need not necessarily have the configuration just described only if it has a setting section for a reference voltage to be used for adjustment of the input voltage range.

Figure 5:
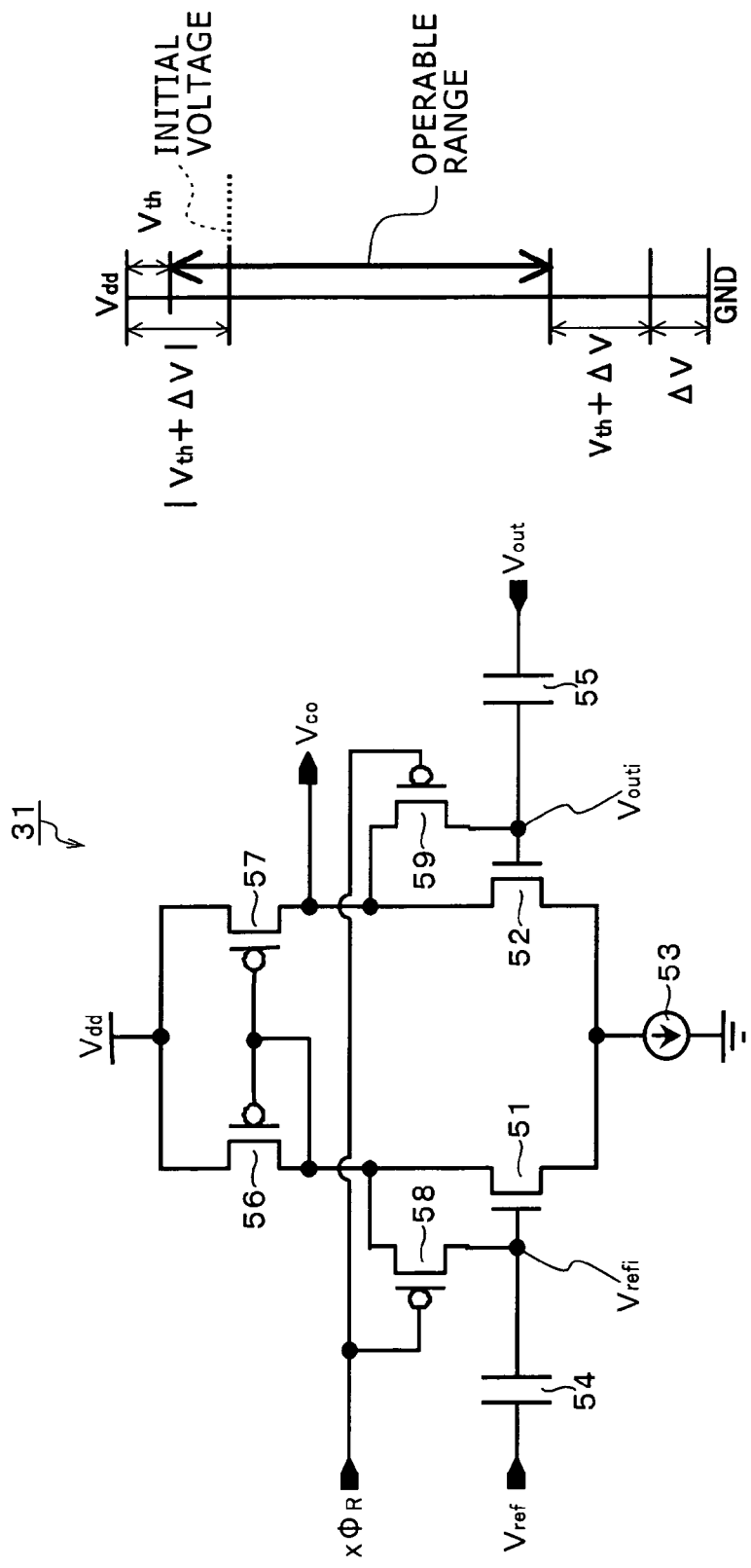
FIG. 5A is a circuit diagram showing a example of an existing configuration of a comparator which configures an input stage of an AD conversion circuit and FIG. 5B is a diagrammatic view illustrating an operation range of the comparator.
Figure 6:
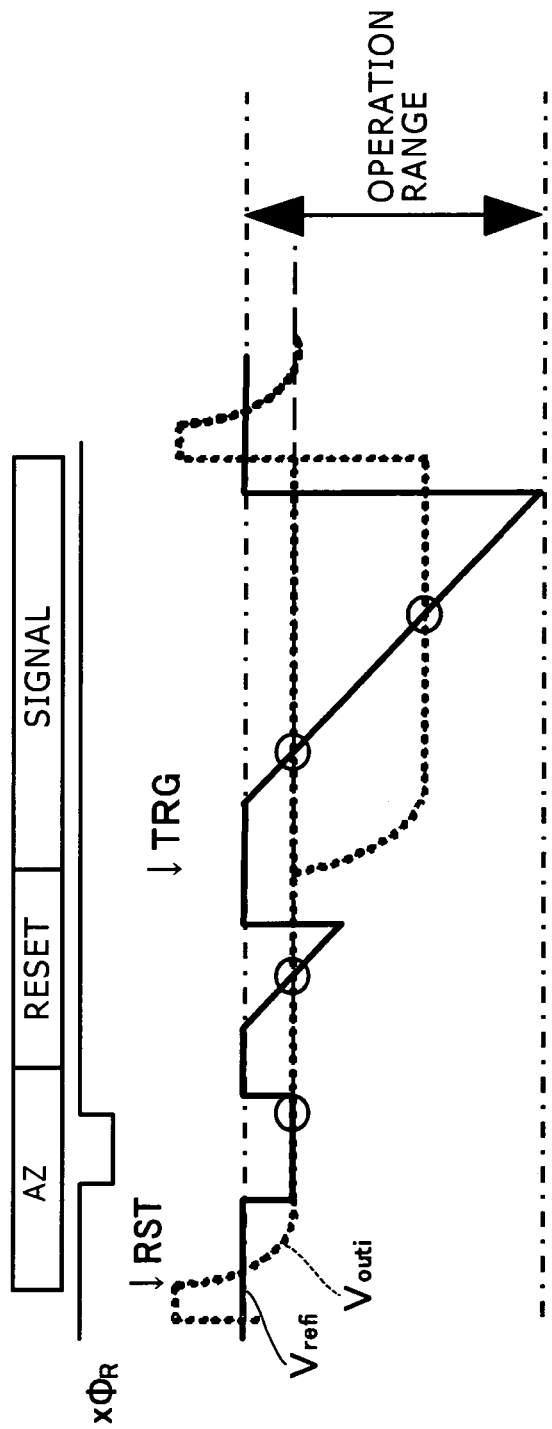
FIG. 6 is a diagrammatic view illustrating a voltage of an internal node and an operation range of the comparator of FIG. 5A upon CDS driving.

FIG. 6 illustrates a voltage at an internal node of the comparator 31 and an operation range at the time of the CDS driving. Meanwhile, FIGS. 7 and 8 illustrate a voltage at the internal node of the comparator 31 and an operation range at the time when the illuminance upon the DDS driving is low and high, respectively. As seen in FIGS. 6 to 8, the voltage within the period within which the reference voltage is set, that is, within a period denoted by AZ in FIGS. 6 to 8, is a voltage when the input and the output voltages of the comparator 31 of FIG. 5 are short-circuited by the PMOS transistors 58 and 59.

Referring to FIGS. 6 to 8, a mark ○ indicates a point at which the two inputs to the comparator 31 coincide with each other. The two inputs are the voltage $V_{outi}$ on the gate electrode side of the NMOS transistor 52 which is displaced by the signal voltage $V_{out}$ of the column signal line $22_{-m}$ in response to a pixel signal and the voltage $V_{refi}$ on the gate electrode side of the NMOS transistor 51 which is displaced by the reference signal $V_{ref}$ of a ramp waveform supplied from the reference signal generation section 15. This similarly applies also to those figures which illustrate an operation range.

In the case of the CDS driving illustrated in FIG. 6, the reference signal $V_{ref}$ is included in an operation range of the comparator 31. In contrast, in the case of the DDS driving illustrated in FIGS. 7 and 8, since the reset level is higher than the signal level, it is necessary for the reference signal $V_{ref}$ for comparison to be higher than that in the case where the signal level is read. At this time, the voltage of the reference signal $V_{ref}$ inputted to the comparator 31 exceeds the operation range of the comparator 31, the comparator 31 does not operate.

That the reference signal $V_{ref}$ exceeds the operation range of the comparator 31 similarly applies also if the ramp of the reference signal $V_{ref}$ is inverted as seen in FIGS. 9A and 9B. Accordingly, the problem of assurance of the operation range of the comparator 31 cannot be solved fundamentally. It is to be noted that FIG. 9A illustrates waveforms when the illuminance is low and FIG. 9B illustrates waveforms when the luminance is high.

Further, also it is imaginable to use a method which adopts a circuit configuration wherein the NMOS transistors and the PMOS transistors of the comparator 31 are exchanged as seen in FIG. 10A. FIG. 10A illustrates an example of a configuration of a comparator wherein PMOS transistors are used for the input while FIG. 10B illustrates an operation range of the comparator of FIG. 10A.

However, the circuit configuration of FIG. 10A cannot assure an operation range of the CDS driving and cannot carry out CDS driving. Also it is imaginable to prepare both of two kinds of circuits for the comparator 31, that is, a circuit of the circuit configuration shown in FIG. 5A and another circuit of the circuit configuration shown in FIG. 10A and selectively use them for the DDS driving and the CDS driving. Since this method doubles the circuit scale through the use for the CDS driving, it gives rise to increase of the cost and a problem of a dispersion in characteristic because two different circuits are used.

1-6. Characteristics of the First Embodiment

Therefore, in the first embodiment, the CMOS image sensor $10_A$ including the AD conversion circuit 23 having the comparator 31 for comparing an analog signal obtained from a unit pixel 11 and the reference signal $V_{ref}$ of a ramp waveform with each other is characterized in the following configuration.

In particular, when a signal of a unit pixel 11 is read out divisionally by two times as a first signal and a second signal, the first signal read out first is used as a reference voltage for an input voltage range within which the input voltage can be processed by a signal processing section which processes the first and second signals. In the case of the present embodiment, the AD conversion circuit 23 corresponds to the signal processing section which processes the first and second signals. Meanwhile, the reference voltage is a voltage to make a reference within an input voltage range within which the input voltage can be converted by the AD conversion circuit 23. In the present embodiment, the operation range of the comparator 31 is the input voltage range of the AD conversion circuit 23.

At this time, in the case where the first signal is based on signal charge accumulated or retained in the FD section 42, that is, is the signal level $V_{sig}$, the signal level $V_{sig}$ is used as the reference voltage. On the other hand, if the first signal is based on the reset potential $V_r$ when the FD section 42 is reset, that is, is the reset level $V_{rst}$, then the reset level $V_{rst}$ is used as the reference voltage. Then, while the first signal read out first is used as the reference voltage for the AD conversion circuit 23, the AD conversion process is carried out for the first and second signals in a state in which the internal reference voltage of the AD conversion circuit 23, that is, the initial value for the gate voltages $V_{outi}$ and $V_{refi}$ of the differential pair transistors 51 and 52, is adjusted.

By adjusting the first and second signals such that they may be included in the input voltage range of the AD conversion circuit 23 in this manner, the AD conversion circuit 23 can execute the AD conversion process for the first and second signals in the state in which the first and second signals are included in the input voltage range. Accordingly, in whichever the first signal read out first is the signal level $V_{sig}$ or the reset level $V_{rst}$, after a reference voltage is set using a signal of a pixel of a processing target, an AD conversion process can be carried out with certainty for the first and second signals.

Consequently, such a great difference in fluctuation of a characteristic in a plane, that is, in in-plane distribution or an offset component which relies upon the magnitude of parasitic capacitance as in the related art disclosed in Patent Document 5, that is, in the case where a reference voltage is set using a predetermined voltage generated externally and separately, can be removed efficiently. As a result, it is possible to reduce a margin necessary for a convertible input voltage range of the AD conversion circuit 23 with respect to the output amplitude of a pixel. Since the margin necessary for the input voltage range can be reduced, it is possible to lower the power supply voltage and to reduce the power consumption by the AD conversion circuit 23.

Working Example 1

In the following, several working examples of the present invention are described. As described hereinabove, in the DDS driving, driving for reading out signal charge retained or accumulated in the FD section 42 as a signal level $V_{sig}$ is carried out. Then, driving of resetting the FD section 42 to the reset potential $V_r$ and reading out the reset potential $V_r$ as a reset level $V_{rst}$ is carried out. Then, the signal level $V_{sig}$ read out first from the unit pixel 11 is used as a reference voltage for a convertible input voltage range of the AD conversion circuit 23. In other words, the internal reference voltages $V_{outi}$ and $V_{refi}$ of the AD conversion circuit 23 are set using the signal level $V_{sig}$ read out first.

FIGS. 11A and 11B are views of a comparator according to a working example 1 which includes a function of adjusting the internal reference voltages $V_{outi}$ and $V_{refi}$ of the AD conversion circuit 23. In particular, FIG. 11A shows an example of a configuration of the comparator, and FIG. 11B illustrates an operation range of the comparator.

Referring first to FIG. 11A, the comparator $31_A$ according to the working example 1 includes NMOS transistors 51, 52, 56 and 57, PMOS transistors 58 and 59, a current source 53 and capacitors 54 and 55 as well as an initial voltage setting circuit $70_A$ for setting or adjusting the internal reference voltages $V_{outi}$ and $V_{refi}$ of the AD conversion circuit 23.

The initial voltage setting circuit $70_A$ is configured from NMOS transistors 71 and 72 connected between a line $L_1$ to which an externally set initial voltage $V_{ext}$ set externally is applied and the gate electrodes of the NMOS transistors 51 and 52, respectively. To the gate electrodes of the NMOS transistors 71 and 72, a control signal $\Phi_{ext}$ is applied through a control line $L_2$. This control signal $\Phi_{ext}$ is applied, for example, from the timing controlling section 18 shown in FIG. 1. In other words, the timing controlling section 18 has a function as a control section for controlling the initial voltage setting circuit $70_A$.

In the comparator $31_A$ having the configuration described above, upon CDS driving, an initial voltage set by the PMOS transistors 58 and 59 being placed into a conducting state in response to an inverted signal $x\Phi_R$ of the control signal $\Phi_R$ is retained as the internal reference voltages $V_{outi}$ and $V_{refi}$ of the AD conversion circuit 23 by the gate side of the NMOS transistors 51 and 52. The initial voltage upon CDS driving, that is, the reference voltage for the AD conversion circuit 23, is substantially equal to $V_{dd} - |V_{th} + \Delta V|$ where $V_{th}$ is the threshold voltage of the MOS transistors and $\Delta V$ is the potential difference between the reset level $V_{rst}$ and the signal level $V_{sig}$ of the unit pixel 11.

Upon DDS driving, the NMOS transistors 71 and 72 are placed into a conducting state in response to the control signal $\Phi_{ext}$ so that the externally set initial voltage $V_{ext}$ is applied to the gate electrode of the NMOS transistors 51 and 52. With the externally set initial voltage $V_{ext}$, adjustment of the internal reference voltages $V_{outi}$ and $V_{refi}$ of the AD conversion circuit 23 is carried out such that the operation range of the comparator $31_A$ is included in the range of a slope of the reference signal $V_{ref}$ of a ramp waveform and the comparator 31 can operate within the slope.

Upon DDS driving, by adjusting the internal reference voltages $V_{outi}$ and $V_{refi}$ of the AD conversion circuit 23 so that the signal level $V_{sig}$ and the reset level $V_{rst}$ are included in the input voltage range of the AD conversion circuit 23 by an operation of the initial voltage setting circuit $70_A$, use of both of the CDS driving and the DDS driving becomes possible. Here, that the signal level $V_{sig}$ and the reset level $V_{rst}$ is included in the input voltage range of the AD conversion circuit 23 signifies that the operation range of the comparator $31_A$ is included in the input voltage range within which the input voltage of the AD conversion circuit 23 can be converted.

Further, the initial voltage setting circuit $70_A$ for setting the reference voltages $V_{outi}$ and $V_{refi}$ can be implemented with a very simple circuit configuration that two NMOS transistors 71 and 72 are additionally provided. Accordingly, the individual comparators $31_A$ require increase only of a very small layout area. In other words, the compatibility of the CDS driving and the DDS driving can be implemented only by a little increase of the layout area of the comparator $31_A$.

Figure 12:
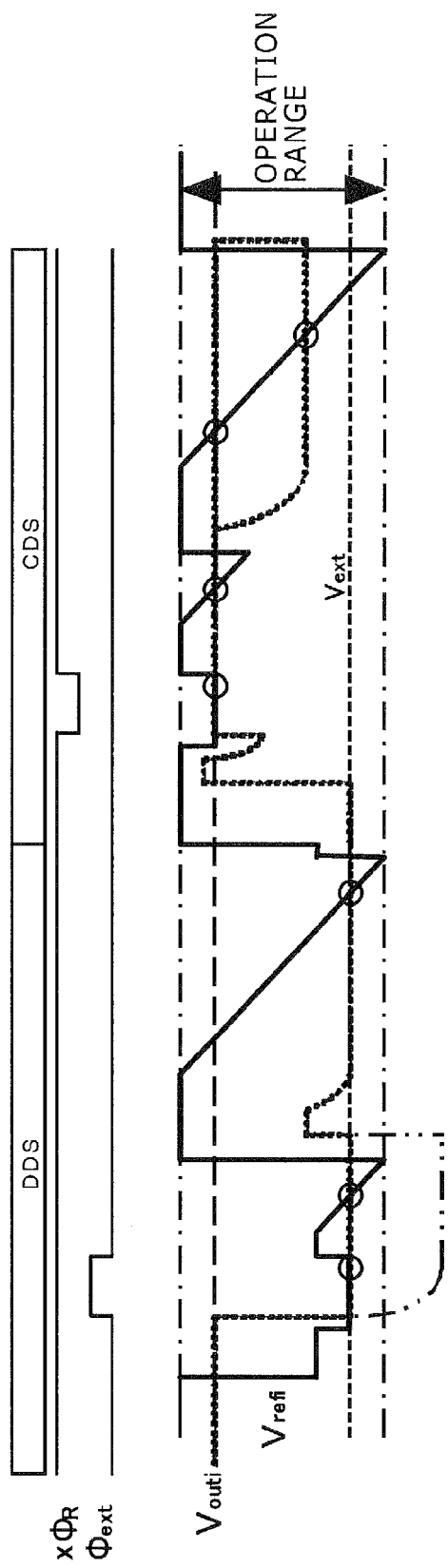
FIG. 12 is a waveform diagram illustrating a driving waveform in a low luminance state upon DDS driving in the case where DDS driving and CDS driving are carried out alternately.
Figure 13:
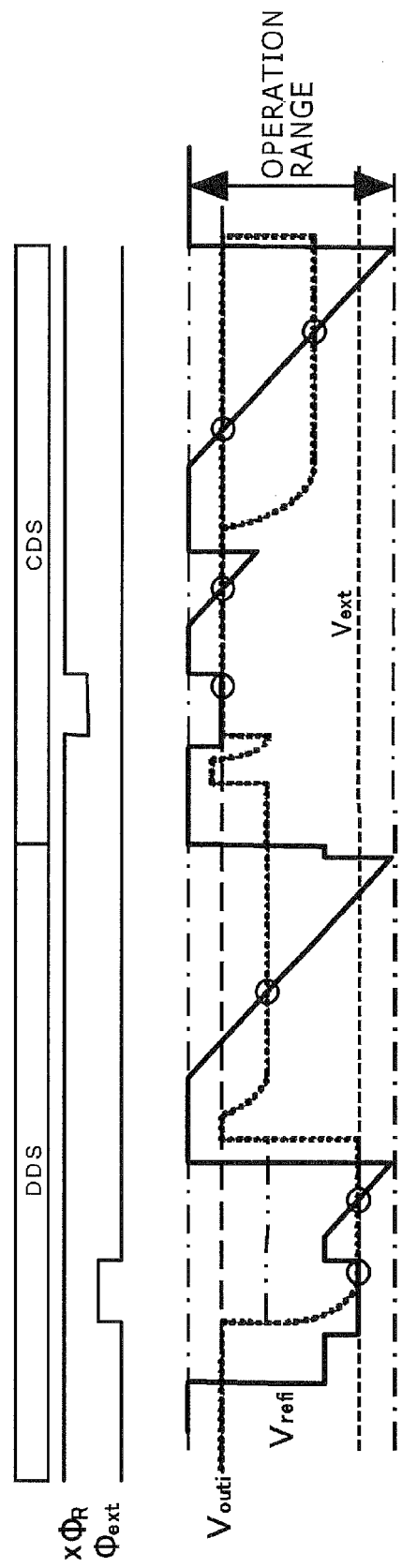
FIG. 13 is a similar view but illustrating a driving waveform in a high luminance state upon DDS driving in the case where DDS driving and CDS driving are carried out alternately.

Here, operation in the case where DDS driving and CDS driving are carried out alternately within a reading out period for one row is described. FIGS. 12 and 13 illustrate driving waveforms when the illuminance is low and high, respectively, upon DDS driving in the case where DDS driving and CDS driving are carried out alternately. FIGS. 12 and 13 illustrate waveforms of the inverted signal $x\Phi_R$ of control signal, control signal $\Phi_{ext}$, the internal reference voltages $V_{outi}$ and $V_{refi}$ of the AD conversion circuit 23.

Figure 14B:
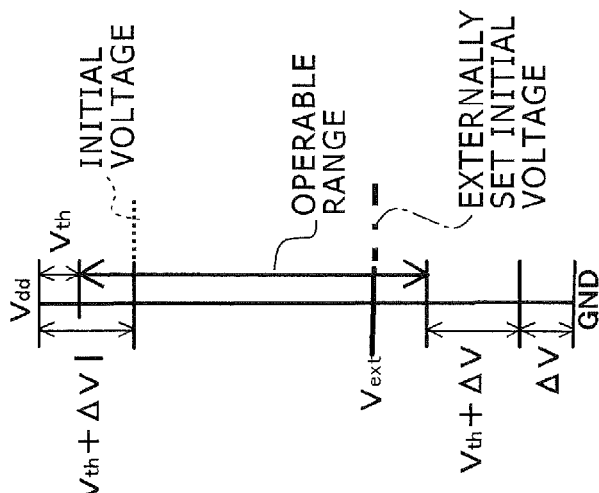
FIG. 14A is a circuit diagram showing an example of a configuration of the comparator according to the working example 1 in the case where an initial voltage setting circuit is configured using a PMOS transistor and FIG. 14B is a diagrammatic view illustrating an operation range of the comparator.
Figure 14A:
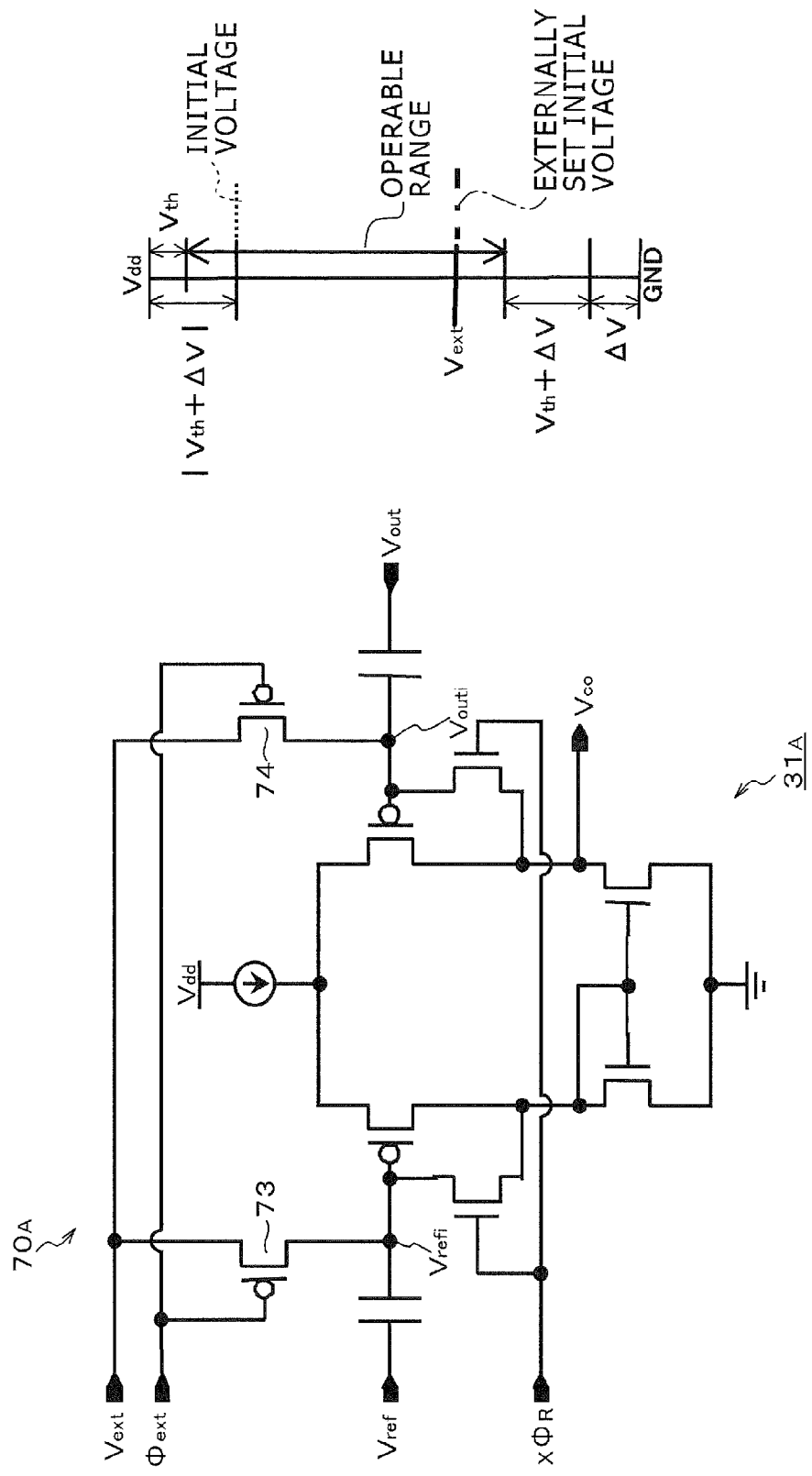

While the reference signal $V_{ref}$ is illustrated such that the voltage thereof with respect to time varies in a direction from the high side toward the low side, even if the voltage variation direction with respect to time is reversed such that the voltage varies from the low side to the high side as seen in FIG. 9A, if the voltage variation remains within the operation range of the comparator $31_A$, then the DDS driving in the present embodiment is not restricted. Further, in the case where the comparator is configured such that the PMOS transistors are provided at the input thereof as seen in FIG. 10A, the initial voltage setting circuit $70_A$ may be configured from PMOS transistors 73 and 74 as seen in FIG. 14A.

Now, circuit operation of the comparator $31_A$ according to the working example 1 shown in FIG. 11A is described with reference to a timing waveform diagram of FIG. 15 in addition to FIGS. 1, 2 and 5A and 5B.

First, the selection transistor 46 is placed into a conducting state in response to a selection signal $SEL_i$ to carry out selection of the unit pixels 11 in the ith row. It is assumed that, at this time, signal charge is retained or accumulated in the FD section 42. In order to detect the signal level $V_{sig}$ based on the signal charge of the FD section 42 within an operation range of the comparator $31_A$, the control signal $\Phi_{ext}$ is placed into an active state, that is, into a state of the high potential. Consequently, the initial voltage setting circuit $70_A$ is placed into an operative state.

Since the initial voltage setting circuit $70_A$ is placed into an operative state, that is, since the NMOS transistors 71 and 72 are placed into a conducting state, the externally set initial voltage $V_{ext}$ is applied as the gate voltages $V_{outi}$ and $V_{refi}$ to the NMOS transistors 51 and 52, respectively. Consequently, the potential on the input side of the comparator $31_A$ is set lower than a potential set by the PMOS transistors 58 and 59 so that the signal level $V_{sig}$ can be acquired within the operation range of the comparator $31_A$. This operation by the initial voltage setting circuit $70_A$ is an operation for adjusting the reference voltages $V_{outi}$ and $V_{refi}$ so that the signal level $V_{sig}$ and the reset level $V_{rst}$ may be included in the operation range of the comparator $31_A$, that is, in the input voltage range of the AD conversion circuit 23.

At this time, also the initial value of the reference signal $V_{ref}$ of a ramp waveform generated by the reference signal generation section 15 is set or shifted to a low potential corresponding to the input side potential of the comparator $31_A$ under the control of the timing controlling section 18. Then, the control signal $\Phi_{ext}$ is placed into an inactive state, that is, into a low potential state, thereby completing the operation for adjusting the potential on the input side of the comparator $31_A$, that is, the reference voltage within the convertible input voltage range of the AD conversion circuit 23.

Thereafter, the reference signal generation section 15 raises the potential of the reference signal $V_{ref}$ a little from the initial state within a range within which a dispersion margin of the circuit can be taken and starts an operation of lowering the voltage in a slope state or ramp state under the control of the timing controlling section 18. Then, the output $V_{co}$ of the comparator $31_A$ is reversed when the difference between the input voltages of the comparator $31_A$, that is, the difference between the signal level $V_{sig}$ read out from the unit pixel 11 and the reference signal $V_{ref}$, becomes equal to zero.

On the other hand, the up/down counter 32 starts, for example, up counting at the start of the slope of the reference signal $V_{ref}$ and ends the counting in response to the reversal of the output $V_{co}$ of the comparator $31_A$. In other words, the up/down counter 32 up counts the period of time after the point of time of the start of the slope to the point of time of the reversal of the output $V_{co}$. By this up counting operation, the difference of the signal level $V_{sig}$ from the reference voltage of the AD conversion circuit 23 can be acquired.

Then, the ith unit pixel 11 is reset with a reset pulse $RST_i$ to initialize the FD section 42. At this time, if the signal level $V_{sig}$ before the resetting is low, that is, if the pixel 11 emits light with a high luminance, then the potential of the FD section 42 after the resetting rises by a great amount. Further, even if also the reference signal $V_{ref}$ has a signal amount equal to that upon the highest luminance, the reference signal $V_{ref}$ is raised in such a manner as to draw a slope. At this time, the up/down counter 32 carries out down counting from the start of the slope of the reference signal $V_{ref}$. Then, the up/down counter 32 ends the down counting in response to reversal of the output $V_{co}$ of the comparator $31_A$.

In this manner, the counting operation of the up/down counter 32 is carried out such that, for example, an up counting operation is carried out for the first time and a counting operation in the reverse direction, that is, a down counting operation, is carried out for the second time. By this counting operation, the subtraction process of the (first time comparison period)–(second time comparison period) is carried out automatically in the up/down counter 32. Then, when the reference signal $V_{ref}$ and the signal voltage $V_{out}$ of the column signal lines $22_{-1}$ to $22_{-m}$ become equal to each other, the polarity of the output $V_{co}$ of the comparator 31 reverses, and in response to the reversal of the polarity, the counting operation of the up/down counter 32 stops. As a result, a count value according to a result of the subtraction process of the (first time comparison period)–(second time comparison period) is retained in the up/down counter 32.

The (first time comparison period)–(second time comparison period)=(signal level $V_{sig-i}$+reset level $V_{rst}$)–(reset level $V_{rst}$)=(net signal level $V_{sig}$). By the two times of reading out operation and the subtraction process by the up/down counter 32 described above, the reset level $V_{rst}$ which includes a dispersion for each unit pixel 11 is removed, and consequently, the signal level $V_{sig}$ in accordance with the incident light amount for each unit pixel 11 can be extracted. It is to be noted that this signal level $V_{sig}$ is adjusted with the gradient of the slope of the reset level $V_{rst}$ and the shift amount of the reset level $V_{rst}$ voltage between the signal level and the reset level so that a higher dynamic range can be taken with a limited illuminance.

Then, the CDS driving is entered. In the CDS driving, the input/output of the comparator $31_A$ are initialized with the control signal $\Phi_R$. By this initialization operation, a reference voltage of the AD conversion circuit 23 is acquired based on the reset level $V_{rst}$ read out first from the unit pixel 11 and is retained into the capacitors 54 and 55. Then, the reference signal generation section 15 raises the reference signal $V_{ref}$ within the operation range of the comparator $31_A$ to start a slope.

At this time, the period of time from the point of time of the start of the slope of the reference signal $V_{ref}$ to the point of time of the reversal of the output $V_{co}$ of the comparator $31_A$ is down counted by the up/down counter 32. By returning the voltage of the reference signal $V_{ref}$ to the start position of the slope to place the transfer transistor 43 in the unit pixel 11 into a conducting state, signal charge accumulated in the photodiode 41 is read out. At this time, the potential of the column signal line 22 changes in response to the charge amount of the signal charge read out from the photodiode 41. The potential of the column signal line 22 drops as the illuminance increases.

The reference signal generation section 15 starts generation of the reference signal $V_{ref}$ of a slope which covers a signal read out from the unit pixels 11 within the operation range of the comparator $31_A$. Then, the period of time from the point of time of the start of the slope of the reference signal $V_{ref}$ to the point of time of the reversal of the output $V_{co}$ of the comparator $31_A$ is up counted by the up/down counter 32. By this up counting operation, the difference between the reset level $V_{rst}$ of the FD section 42 and the signal level $V_{sig}$ after transfer of the signal charge from the photodiode 41 can be detected.

Here, as regards reading out of a result of counting of the up/down counter 32 to the outside, counting may be carried out separately in the DDS driving and the CDS driving and the count values may be stored into the memory device 34 and then outputted to the outside. Or, counting may be carried out continuously in the DDS driving and the CDS driving and a result of the counting may be stored into the memory device 34 and then outputted to the outside.

Further, it is possible to change the gradient of the slope of the reference signal $V_{ref}$ to change the period of time until the output $V_{co}$ of the comparator $31_A$ reverses to apply a gain. At this time, it is possible to adopt a technique of changing the gradient of the slope between the DDS driving the CDS driving such that resulting count values may have different weights applied thereto.

On the other hand, as regards a resetting operation at the start of the CDS driving which is usually considered necessary, since the FD section 42 which is a charge detection section has just been reset, there is no necessity to carry out resetting again, and therefore, the resetting operation is omitted. However, in the case where the disturbance to the FD section 42 such as dark current is high, it is preferable to carry out a resetting operation once again between the DDS driving and the CDS driving to carry out re-initialization.

Further, also as regards the direction of the slope of the reference signal $V_{ref}$ generated by the reference signal generation section 15, such a method as to make the gradient directions upon the DDS driving and the CDS driving opposite to each other may be adopted. However, it is preferable to make the gradient directions of the slope upon the DDS driving and the CDS driving same as each other so that a characteristic displacement of the circuit arising from operation in the case of the CDS driving and in the case of the DDS driving may not occur.

Incidentally, in the comparator $31_A$, current arising from leak current sometimes flows into the inputting portion (gate of the NMOS transistors 51 and 52) from the MOS transistors 58, 59, 71 and 72 which are switch elements for carrying out initialization to cause the input potential to rise or drop. At this time, if the leak amounts on both input sides of the comparator $31_A$ are equal to each other, then there is no problem in terms of the characteristic. However, in an actual device, a balance in leak amounts between the two input sides of the comparator $31_A$ is sometimes lost by a fabrication dispersion or the like.

This problem can be solved by making the channel length L of the MOS transistors 58, 59, 71 and 72 longer because the leak current of the transistors can be suppressed. However, if the channel length L is made longer, then clock feedthrough and charge injection which appear when the MOS transistors 58, 59, 71 and 72 enter a non-conducting state may possibly increase, resulting in deterioration of a characteristic of the comparator $31_A$.

The clock feedthrough signifies decrease of the voltage drop by a capacitance ratio between a clock controlled node and a floating node. Meanwhile, the charge injection is jumping of charge immediately below the channel of the MOS transistors 58, 59, 71 and 72 into a floating node. The amount of the clock feedthrough and the charge injection increases in proportion to the area of the MOS transistors 58, 59, 71 and 72. Accordingly, if the channel length L of the MOS transistors 58, 59, 71 and 72 increases, then also the clock feedthrough and the charge injection increase inevitably.

From such a reason as described above, the channel length L of the MOS transistors 58, 59, 71 and 72 cannot be increased simply in order to solve the problem of rise or drop of the input potential arising from leak current of the MOS transistors 58, 59, 71 and 72. Thus, a comparator according to a working example 2 described below is made to solve the problem described above without increasing the channel length L.

Working Example 2

Figure 16:
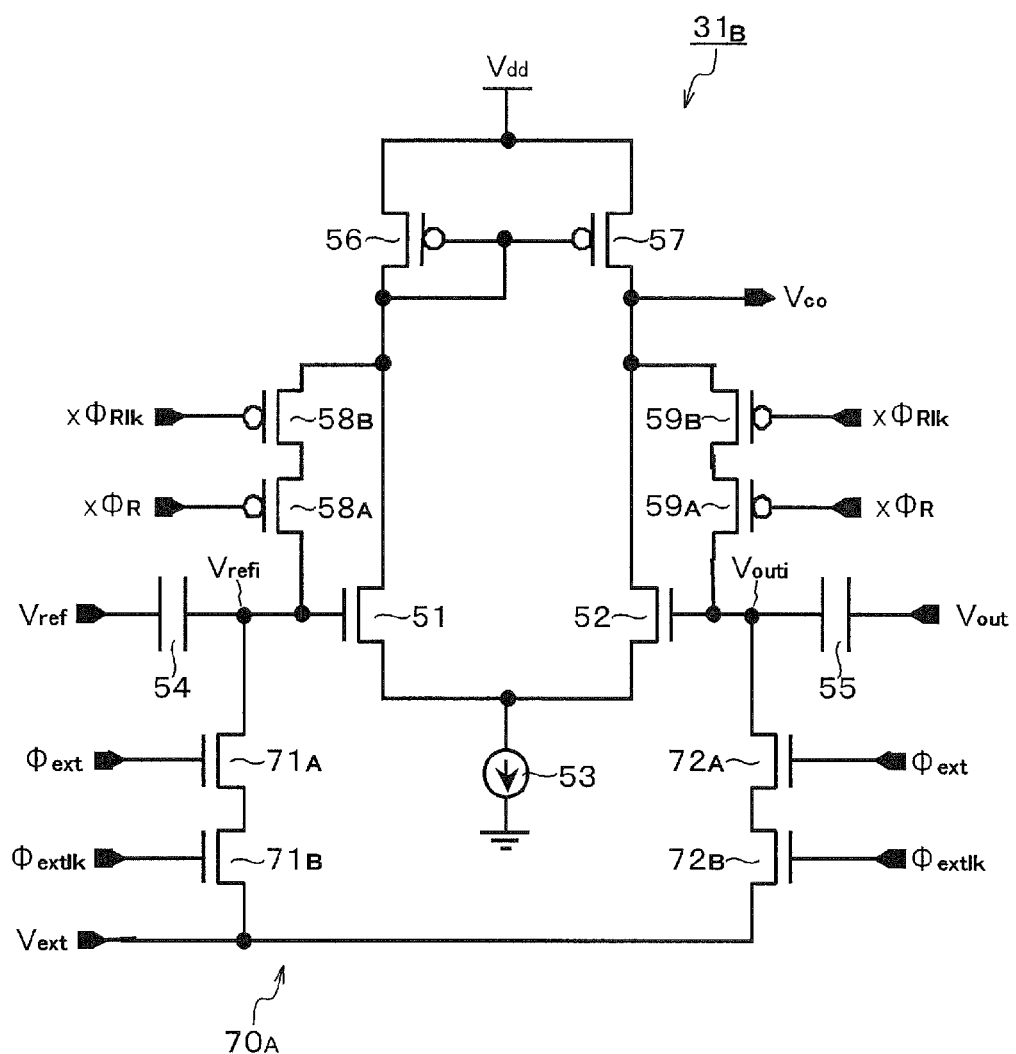
FIG. 16 is a circuit diagram showing an example of a configuration of a comparator according to a working example 2 which includes a function of adjusting internal reference voltages of an AD conversion circuit.

FIG. 16 is a circuit diagram showing an example of a configuration of a comparator according to a working example 2 which includes a function for adjusting the internal reference voltages $V_{outi}$ and $V_{refi}$ of the AD conversion circuit 23.

As apparent from comparison between FIGS. 11 and 16, the comparator $31_B$ according to the working example 2 is different in configuration from the comparator $31_A$ according to the working example 1 in a switch element for carrying out initialization. In particular, in the comparator $31_A$ according to the working example 1, each switch element for carrying out initialization is configured from a single MOS transistor, that is, from the MOS transistor 58, 59, 71 or 72.

In contrast, in the comparator $31_B$ according to the working example 2, two MOS transistors $58_A$ and $58_B$ connected in series are used in place of the PMOS transistor 58, and two MOS transistors $59_A$ and $59_B$ connected in series are used in place of the PMOS transistor 59. Similarly, two MOS transistors $71_A$ and $71_B$ connected in series are used in place of the MOS transistor 71, and two MOS transistors $72_A$ and $72_B$ connected in series are used in place of the MOS transistor 72.

The two MOS transistors $58_A$ and $58_B$ have a channel length L equal to one half that of the PMOS transistor 58, and the two MOS transistors $59_A$ and $59_B$ have a channel length L equal to one half that of the PMOS transistor 59. Similarly, the MOS transistors $71_A$ and $71_B$ have a channel length L equal to one half that of the MOS transistor 71, and the two MOS transistors $72_A$ and $72_B$ have a channel length L equal to one half the MOS transistor 72.

It is to be noted here that, while the number of MOS transistors connected in series in the foregoing description is two, the number is not limited to two, but three or more MOS transistors may be connected in series.

A control signal $\times\Phi_R$ is applied to the gate electrode of the MOS transistors $58_A$ and $59_A$ while another control signal $\times\Phi_{Rlk}$ having a later timing and more inactive (in the present example, of a higher level) than the control signal $\times\Phi_R$ is applied to the gate electrode of the MOS transistors $58_B$ and $59_B$. Further, a further control signal $\Phi_{ext}$ is applied to the gate electrode of the MOS transistors $71_A$ and $72_A$ while a still further control signal $\Phi_{extlk}$ having a later timing and more inactive (in the present example, of a lower level) than the control signal $\Phi_{ext}$ is applied to the gate electrode of the MOS transistors $71_B$ and $72_B$.

Figure 17:
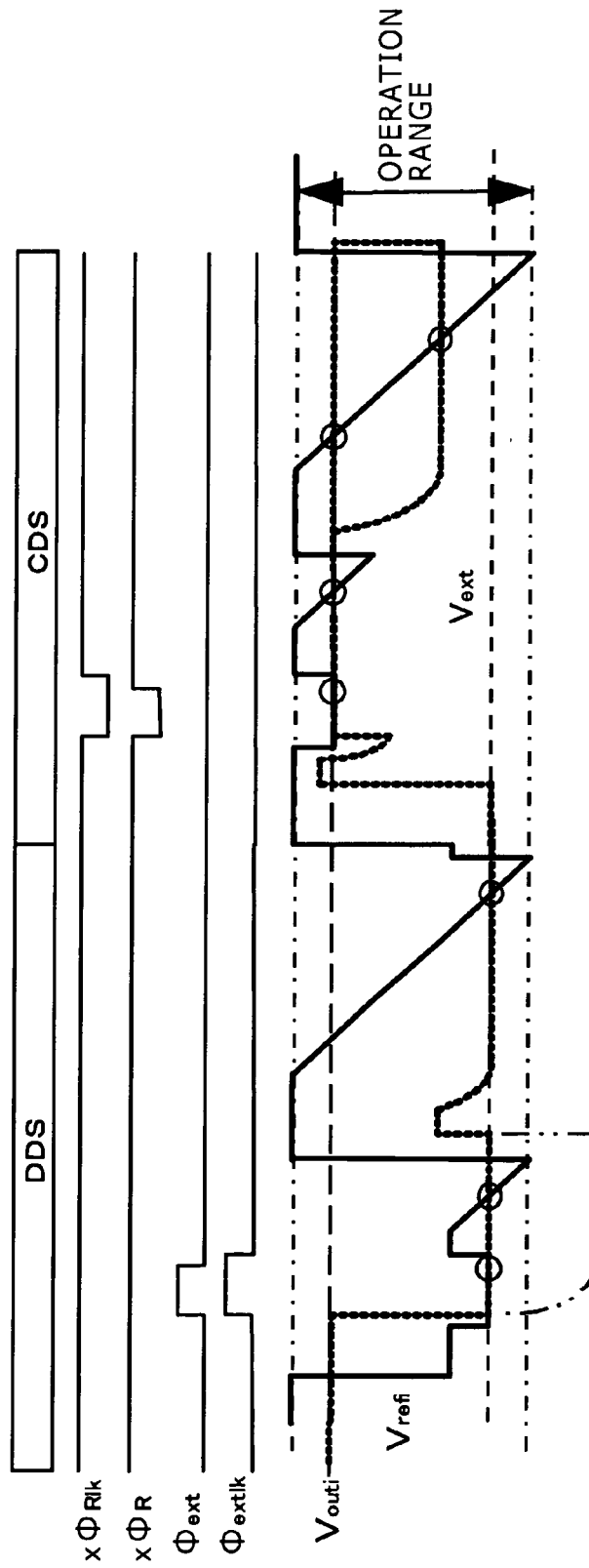
FIG. 17 is a timing waveform diagram illustrating waveforms of control signals, a reference signal of a ramp waveform and a signal voltage in the comparator according to the working example 2.

FIG. 17 illustrates timing waveforms of the control signals $\times\Phi_R$, $\times\Phi_{Rlk}$, $\Phi_{ext}$ and $\Phi_{extlk}$ of the comparator $31_B$ according to the working example 2, a reference voltages $V_{refi}$, $V_{outi}$.

When the control signal $\times\Phi_R$ is placed into an inactive state and then the control signal $\times\Phi_{Rlk}$ is placed into an inactive state, the MOS transistors $58_A$ and $59_A$ on the input side of the comparator $31_B$ are placed into a non-conducting state first, and then the MOS transistors $58_B$ and $59_B$ are placed into a non-conducting state. Similarly, when the control signal $\Phi_{ext}$ is placed into an inactive state and then the control signal $\Phi_{extlk}$ placed into an inactive state, the MOS transistors $71_A$ and $72_A$ are placed into a non-conducting state first and then the MOS transistors $71_B$ and $71_B$ are placed into a non-conducting state.

Working effects provided by the use of a plurality of, for example, two, MOS transistors connected in series as a switch element for carrying out initialization, that is, working effects of the comparator $31_B$ according to the working example 2, are described here.

Figure 18B:
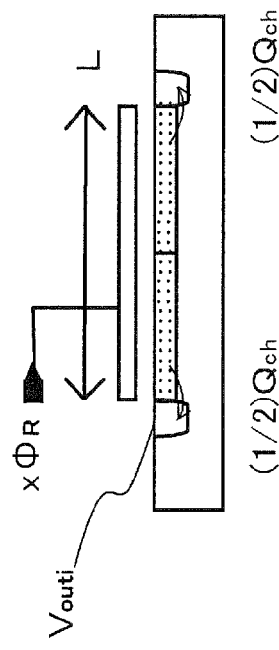
FIGS. 18A to 18D are schematic views illustrating a channel length and an injection amount and illustrating working effects of the comparator according to the working example 2.
Figure 18D:
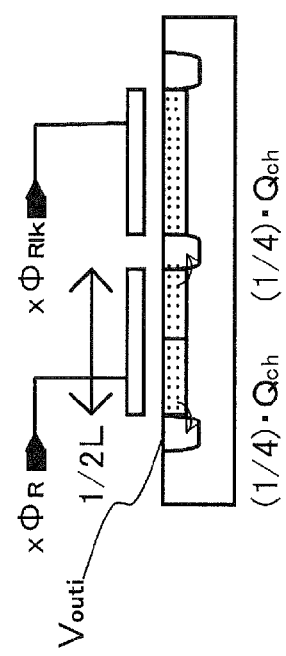
Figure 18A:
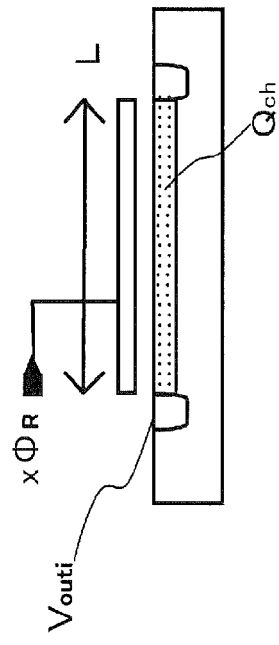

First, working examples in the case where a single MOS transistor is used as a switch element for carrying out initialization, that is, in the case of the working example 1, are described with reference to FIGS. 18A and 18B. It is assumed that a MOS transistor has a channel length L and is in a conducting state (FIG. 18A) and consequently charge $Q_{ch}$ exists in the channel of the MOS transistor. If the MOS transistor is placed into a non-conducting state (FIG. 18B) from this state, then the charge $Q_{ch}$ in the channel is divided substantially into two and distributed to the source and drain regions on the opposite sides of the channel. Consequently, the injection amount in one of the source and drain regions decreases to $(\frac{1}{2}) \cdot Q_{ch}$.

Figure 18C:
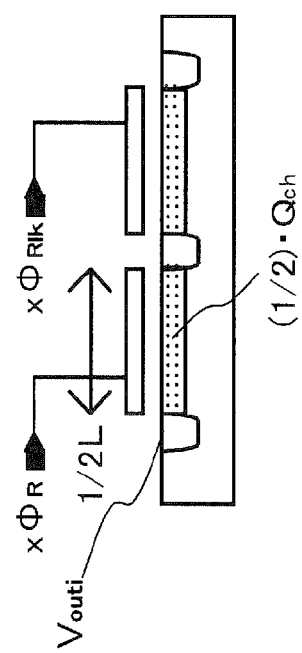

In contrast, in the case where two MOS transistors having a channel length equal to $\frac{1}{2}$ that in the case of the working example 1 are connected in series, when the two MOS transistors are in a conducting state (FIG. 18C), an amount of charge equal to $\frac{1}{2}$ in the case where a single MOS transistor is used, that is, charge of $(\frac{1}{2}) \cdot Q_{ch}$, exists in the channel of each of the two MOS transistors.

Then, if the two MOS transistors are successively placed into a non-conducting state (FIG. 18D), then the charge $(\frac{1}{2}) \cdot Q_{ch}$ in the channel of one of the two MOS transistors which is placed into a non-conducting state first is divided substantially into two and distributed to the source and drain regions on the opposite sides of the channel. Consequently, in the one MOS transistor, the injection amount to one of the source and drain regions becomes $(\frac{1}{4}) \cdot Q_{ch}$. This similarly applies also to the other MOS transistors which are placed into a conducting state later.

In this manner, for example, if the channel length is reduced to $\frac{1}{2}$, then the injection amount decreases to $\frac{1}{2}$ that $((\frac{1}{2}) \cdot Q_{ch})$ when the channel length is L, that is, becomes $(\frac{1}{4}) \cdot Q_{ch}$. Accordingly, in the case where the configuration wherein two MOS transistors having a channel length equal to $\frac{1}{2}$ that in the case of the working example 1 are connected in series is adopted, the injection amount to one of the source/drain regions of the MOS transistors 58, 59, 71 and 72 connected to the two input terminals of the comparator $31_B$ can be reduced to $\frac{1}{2}$. As a result, the fluctuation of the value of initialization arising from the injection amount can be suppressed in comparison with that in the working example 1.

It is to be noted here that, while two MOS transistors having a channel length equal to $\frac{1}{2}$ that in the case of the working example 1 are connected in series, if there is no problem in the case where the injection amount is substantially equal to that in the working example 1, then also it is possible to adopt a different configuration. In particular, the configuration wherein, for example, two MOS transistors having a channel length equal to that in the case of the working example 1 are connected in series may be adopted. With this configuration, since the total channel length of the MOS transistors which configure the switching element for carrying out initialization can be increased to twice, although the total transistor size increases, the leak current can be suppressed in comparison with that in the case of the working example 1.

Working Example 3

Figure 19:
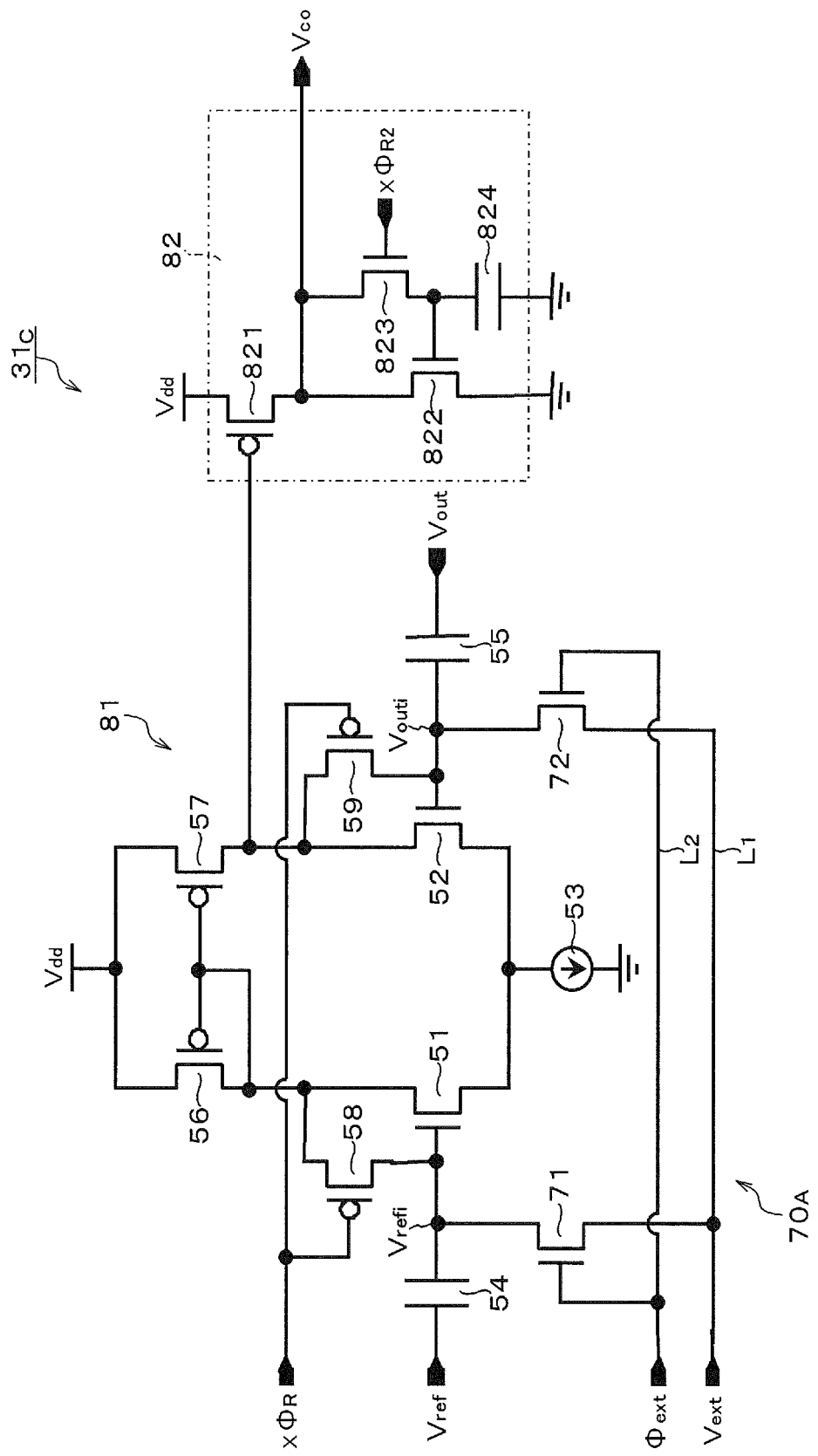
FIG. 19 is a circuit diagram showing an example of a configuration of a comparator according to a working example 3 which includes a storage circuit section on a succeeding stage to a comparison circuit section.

FIG. 19 is a circuit diagram showing an example of a configuration of a comparator according to a working example 3 which includes a function for adjusting the internal reference voltages $V_{outi}$ and $V_{refi}$ of the AD conversion circuit 23.

Referring to FIG. 19, the comparator $31_C$ according to the working example 3 has a two-stage circuit structure including a preceding stage circuit section and a succeeding stage circuit section. The preceding stage circuit section has a circuit configuration same as that of the comparator $31_A$ according to the working example 1, that is, has a circuit configuration of a comparison circuit section 81. It is to be noted that the preceding stage circuit section is not limited to that of a circuit configuration same as that of the comparator $31_A$ according to the working example 1, but may have a circuit configuration same as that of the comparator $31_B$ according to the working example 2.

On the other hand, the succeeding stage circuit section is a storage circuit section 82 which stores an output voltage of the comparison circuit section 81 on the preceding stage, that is, a voltage value, that is, a bias voltage, based on or corresponding to the value of current which depends upon a voltage corresponding to current flowing to the PMOS transistor 57. The storage circuit section 82 is configured, for example, from a PMOS transistor 821, NMOS transistors 822 and 823, and a capacitor 824.

The PMOS transistor 821 is connected at the gate electrode thereof to an output terminal of the comparison circuit section 81, that is, the drain-common connection node of the MOS transistors 52 and 57 and at the source electrode thereof to the pixel power supply $V_{dd}$. The NMOS transistor 822 is connected at the drain electrode thereof to the drain electrode of the PMOS transistor 821 and grounded at the source electrode thereof.

The NMOS transistor 823 is connected at the drain electrode thereof to the drain electrode of the PMOS transistor 821 and at the source electrode thereof to the gate electrode of the NMOS transistor 822. The capacitor 824 is connected at one terminal thereof to the gate electrode of the NMOS transistor 822 and grounded at the other terminal thereof. Further, the drain-common connection node of the MOS transistors 821 and 822 serves as the output terminal of the comparator $31_C$, and the comparison output $V_{co}$ is outputted from the drain-common connection node.

A control signal $x\Phi_{R2}$ is applied to the gate electrode of the NMOS transistor 823. This control signal $x\Phi_{R2}$ is supplied, for example, from the timing controlling section 18 shown in FIG. 1. In other words, the timing controlling section 18 has a function as a control section for controlling the succeeding stage circuit section of the comparator $31_C$ according to the working example 3, that is, the storage circuit section 82.

First Driving Example

Figure 20:
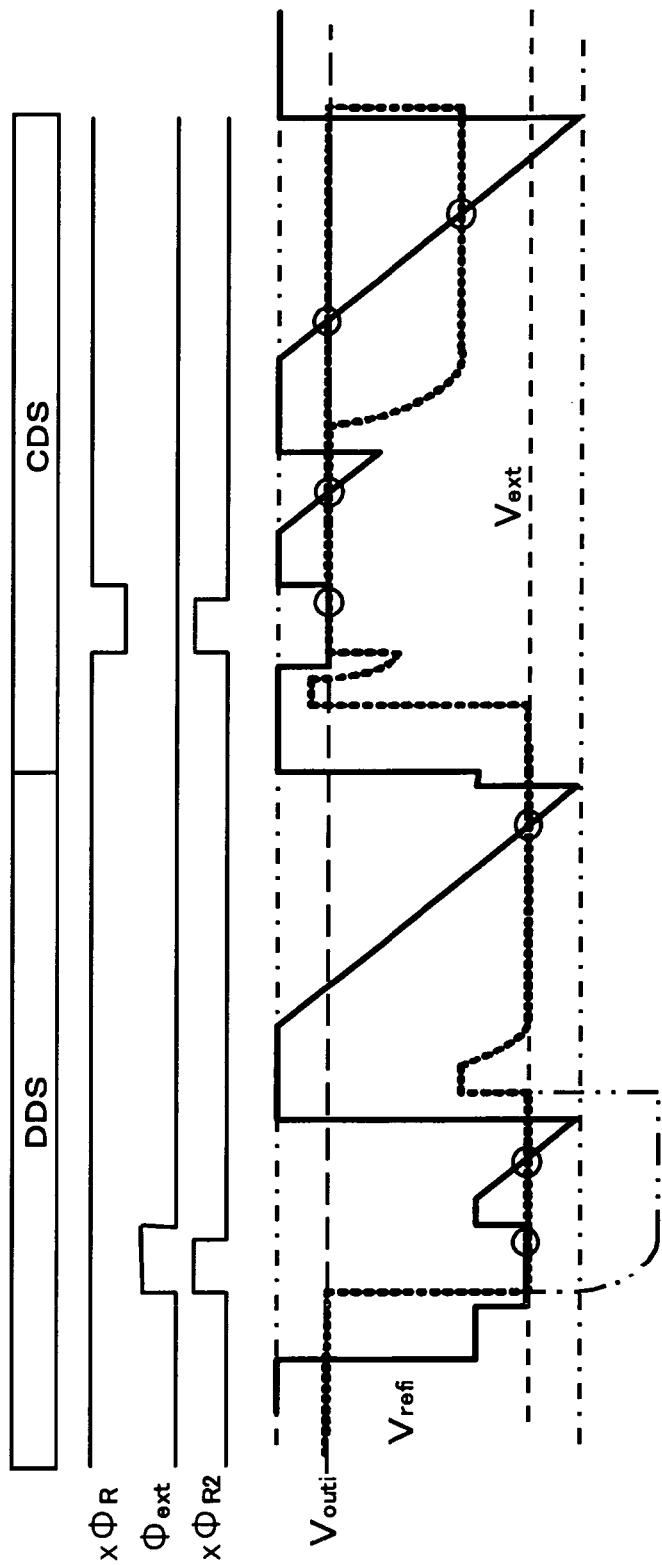
FIG. 20 is a timing waveform diagram illustrating operation of a first driving example of the comparator according to the working example 3.

Now, a first driving example of the comparator $31_C$ according to the working example 3 which includes the storage circuit section 82 on the succeeding stage of the comparison circuit section 81 is described with reference to a timing waveform diagram of FIG. 20. In FIG. 20, timing waveforms of the control signals $x\Phi_R$, $x\Phi_{ext}$ and $x\Phi_{R2}$, reference voltages $V_{refi}$, $V_{outi}$ are illustrated.

First, upon CDS driving, in the comparison circuit section 81, an initial voltage set by placement of the PMOS transistors 58 and 59 into a conducting state is retained as the internal reference voltages $V_{outi}$ and $V_{refi}$ into the gate side of the NMOS transistors 51 and 52 under the control of the control signal $x\Phi_R$. In the initialization state, NMOS transistor 823 of the storage circuit section 82 on the succeeding stage is placed into a conducting state under the control of the control signal $x\Phi_{R2}$.

When the NMOS transistor 823 in the storage circuit section 82 on the succeeding stage is placed into a conducting state, current corresponding to the output voltage which depends upon the initialization value of the comparison circuit section 81 at the preceding stage flows to the capacitor 824 through the MOS transistors 821 and 823. Then, within the initialization period, a voltage value based on the current value which depends upon the initial value of the output voltage of the comparison circuit section 81 is stored or retained into the capacitor 824 at a timing at which the NMOS transistor 823 is placed into a non-conducting state under the control of the control signal $x\Phi_{R2}$.

A characteristic of the storage circuit section 82 on the succeeding stage is determined by the current value stored in the capacitor 824. The output of the storage circuit section 82 at the succeeding stage is reversed when the output current of the comparison circuit section 81, that is, the current flowing to the PMOS transistor 821, becomes higher than the current value generated by the retained voltage of the capacitor 824.

On the other hand, upon DDS driving, when the NMOS transistors 71 and 72 in the comparison circuit section 81 on the preceding stage are placed into a conducting state under the control of the control signal $\Phi_{ext}$, the externally set initial voltage $V_{ext}$ is applied to the gate electrode of the NMOS transistors 51 and 52. Further, the NMOS transistor 823 in the storage circuit section 82 on the succeeding stage is placed into a conducting state under the control of the control signal $x\Phi_{R2}$.

When the NMOS transistor 823 in the storage circuit section 82 on the succeeding stage is placed into a conducting state, current corresponding to the output voltage when the input is determined by the externally set initial voltage $V_{ext}$ flows to the capacitor 824 through the MOS transistors 821 and 823. Then, a voltage value based on the current value which depends upon the externally set initial voltage $V_{ext}$ is stored or retained into the capacitor 824 at a timing at which the NMOS transistor 823 is placed into a non-conducting state under the control of the control signal $x\Phi_{R2}$.

As described hereinabove, in the case of the first driving example, both upon CDS driving and upon DDS driving, a voltage value based on the current value which depends upon the output voltage of the comparison circuit section 81 upon initialization is stored into the storage circuit section 82. However, as apparent from the description of operation given above, a difference appears between the output voltage for initialization upon CDS driving of the comparison circuit section 81 and an output voltage for initialization upon DDS driving of the comparison circuit section 81.

If a difference appears between the output voltages for initialization upon CDS driving and upon DDS driving in this manner, then since the voltage value which is stored by the storage circuit section 82, that is, the voltage value at which the output of the storage circuit section 82 is reversed, becomes different upon CDS driving and upon DDS driving. Therefore, the same operating point is not obtained at the comparator $31_C$. In other words, the operating point for initialization of the comparator $31_C$ becomes different upon CDS driving and DDS driving. A second driving example described below is devised taking this into consideration.

Second Driving Example

Figure 21:
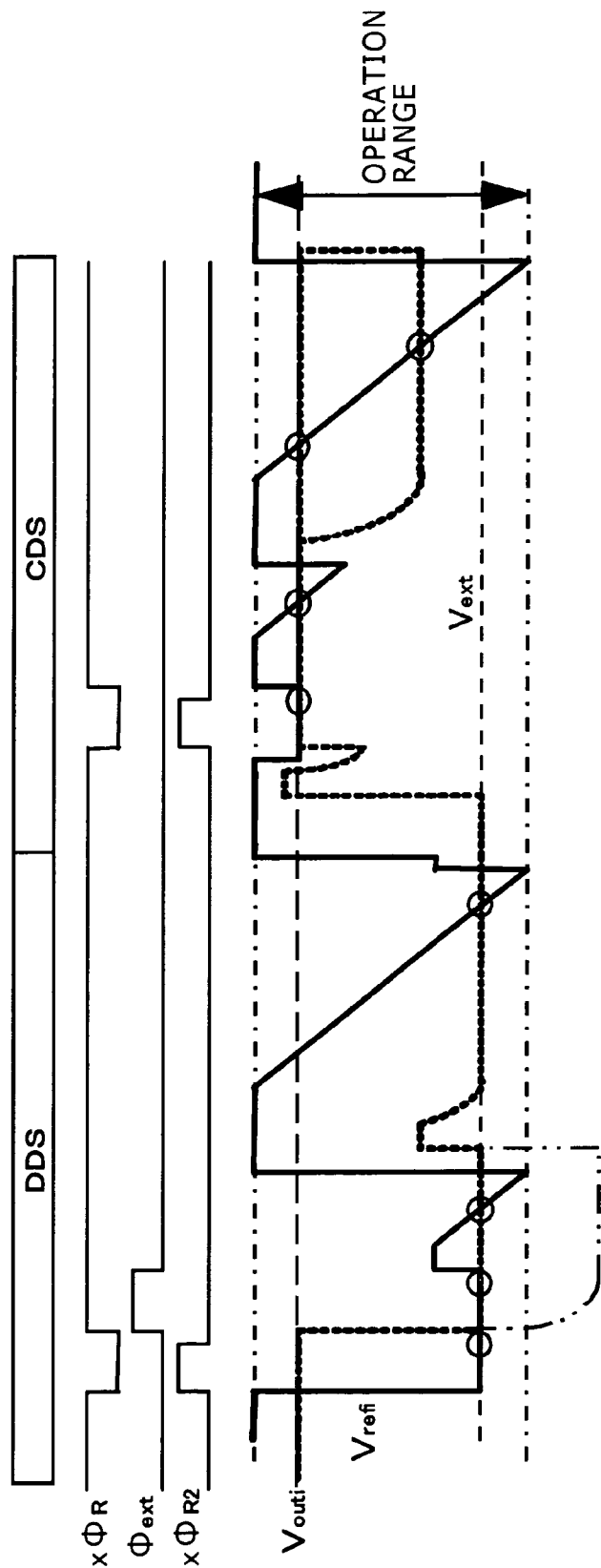
FIG. 21 is a timing waveform diagram illustrating operation of a second driving example of the comparator according to the working example 3.

Subsequently, the second driving example of the comparator $31_C$ according to the working example 3 is described with reference to a timing waveform diagram of FIG. 21. Also in FIG. 21, the timing waveforms of control signals $x\Phi_R$, $x\Phi_{ext}$ and $x\Phi_{R2}$, reference voltages $V_{refi}$, $V_{outi}$ are illustrated similarly as in FIG. 20.

The second driving example is same as the first driving example in operation upon CDS driving but is characterized in operation upon DDS driving. In particular, as apparent from comparison between the timing waveform diagram of FIG. 20 and the timing waveform diagram of FIG. 21, upon DDS driving, an operation for initialization same as that upon the CDS driving is carried out before initialization with the externally set initial voltage $V_{ext}$ is carried out under the control of the control signal $\Phi_{ext}$.

In particular, prior to initialization with the externally set initial voltage $V_{ext}$, the comparison circuit section 81 on the preceding stage sets an initial voltage set by placement of the PMOS transistors 58 and 59 into a conducting state as the internal reference voltages $V_{outi}$ and $V_{refi}$ under the control of the control signal $x\Phi_R$.

In this initialization state, a voltage value corresponding to a current value which depends upon the initial value of the output voltage of the comparison circuit section 81 is stored or retained into the capacitor 824 at a timing at which the NMOS transistor 823 is placed into a non-conducting state under the control of the control signal $x\Phi_{R2}$ by the storage circuit section 82. The voltage value or current value stored at this time is equal to the voltage value or current value stored upon initialization upon CDS driving. Consequently, the initial operating points of the comparator $31_C$ upon CDS driving and upon DDS driving, that is, characteristics upon CDS driving and upon DDS driving, become same as each other.

Upon the DDS driving, initialization with the externally set initial voltage $V_{ext}$ again after initialization same that upon the CDS driving is carried out to adjust the internal reference voltages $V_{outi}$ and $V_{refi}$ so that the signal level $V_{sig}$ and the reset level $V_{rst}$ may be included in the input voltage range of the AD conversion circuit 23.

As described hereinabove, by carrying out, upon DDS driving, initialization same as that upon CDS driving out prior to initialization with the externally set initial voltage $V_{ext}$ and then carrying out primary initialization, that is, initialization with the externally set initial voltage $V_{ext}$, the problem of the first driving example can be solved. In other words, by carrying out the same initialization both upon DDS driving and upon CDS driving, characteristics of the operating points of outputs upon DDS driving and upon CDS driving can be made same as each other. As a result, in addition to the working effects achieved by action of the initial voltage setting circuit $70_A$, the working effect that CDS driving the DDS driving can be carried out compatibly with a higher degree of certainty can be achieved.

Speeding Up of Driving

Incidentally, in the CMOS image sensor $10_A$ according to the present embodiment, CDS driving and DDS driving are carried out simply alternately to acquire signals. However, naturally a period of time corresponding to a period of time for CDS driving and DDS driving is required for acquisition of signals. In particular, if the driving time period of DDS driving is represented by $T_{dds}$ and the driving time period of CDS driving is represented by $T_{cds}$ as seen in a timing waveform of FIG. 22, then the time period $T_{total}$ required to acquire a signal by CDS driving and DDS driving is $T_{total}=T_{dds}+T_{cds}$. In the case of the present driving example, the slope or inclination of the reference signal $V_{ref}$ of a ramp waveform used upon AD conversion has the same gradient both upon CDS driving and DDS driving.

In contrast, if the slope of the reference signal $V_{ref}$ of a ramp waveform for one of the CDS driving and the DDS driving is made steeper than that for the other one of the CDS driving and the DDS driving, then the time required for AD conversion and hence the time before signals are acquired can be reduced. Data obtained by the driving with regard to which the slope is made steeper may be multiplied, in the signal processing section on the succeeding stage, by a coefficient hereinafter described determined taking a reduction amount of the time, that is, an increasing amount of the gradient of the slope of the reference signal $V_{ref}$ into consideration. By the calculation, same data by input conversion can be acquired.

Generally, a signal obtained by DDS driving by an image sensor is in most cases a signal on the high luminance side. Therefore, the slope of the reference signal $V_{ref}$ on the DDS driving side is preferably set to a steeper gradient than that on the CDS driving side.

Figure 23:
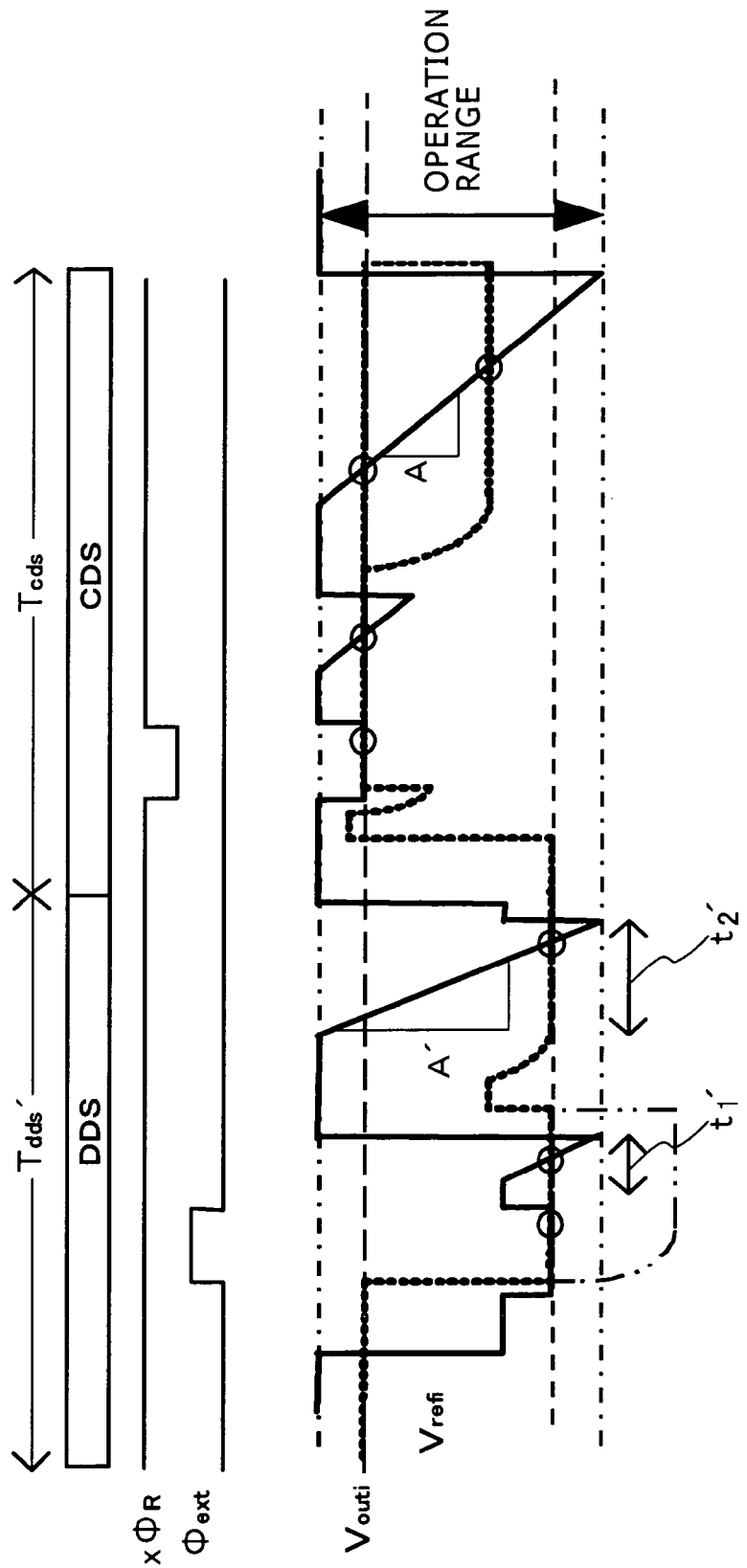
FIG. 23 is a similar view but illustrating driving in the case where a slope of a reference signal on the DDS driving side is set to a gradient steeper than that on the CDS driving side.

FIG. 23 illustrates timing waveforms in the case where the slope of the reference signal $V_{ref}$ on the DDS driving side has a steeper gradient A' than that on the CDS driving side which has the gradient A. By setting the slope of the reference signal $V_{ref}$ to the steeper gradient A', the time period required for AD conversion becomes $T_{dds}'+T_{cds}$. Here, reduction of the time period of $T_{dds}'=T_{dds}-(t_1-t_1')-(t_2-t_2')$ is expected. Thus, the time required to acquire a signal can be reduced by the reduction time period to achieve speeding up of the driving.

Figure 22:
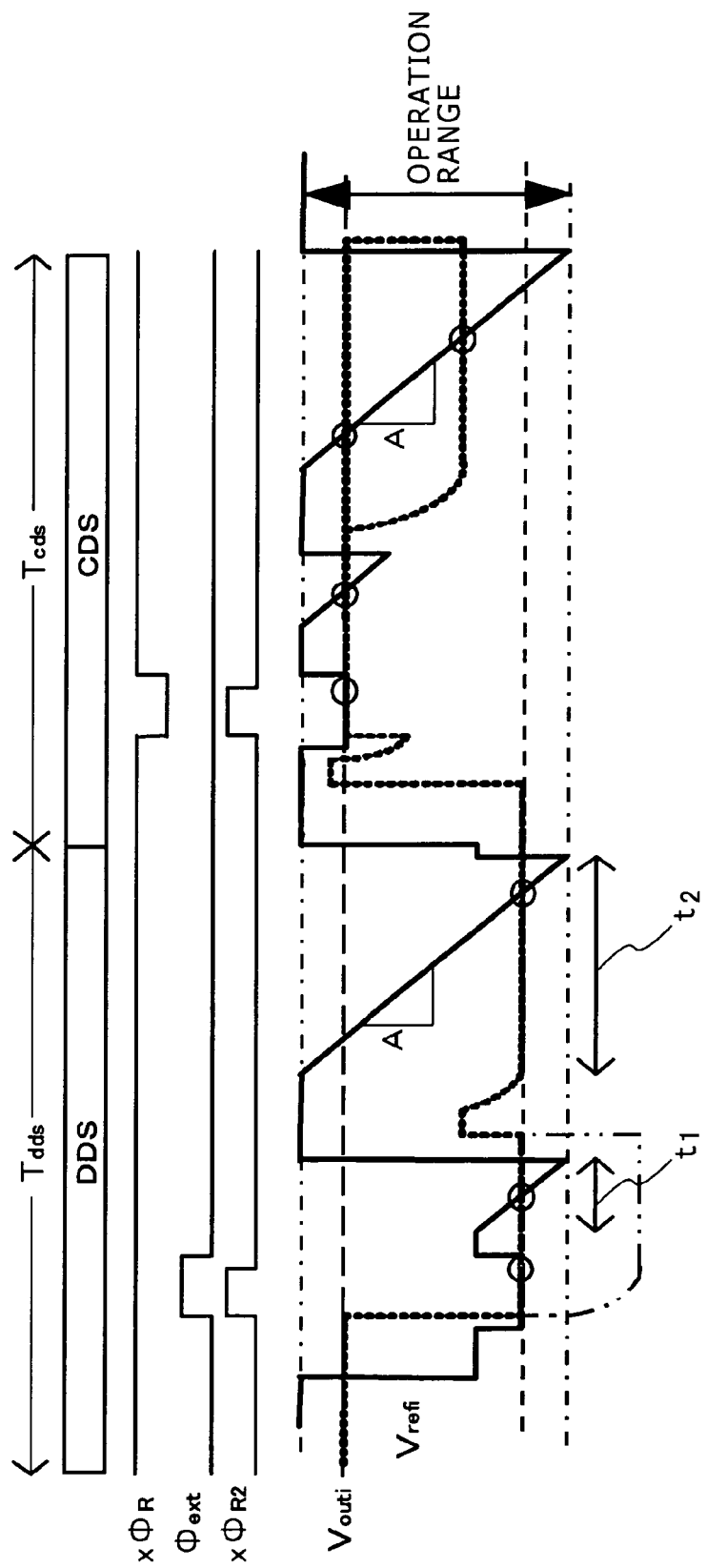
FIG. 22 is a similar view but illustrating driving in the case where slopes of reference signals in CDS driving and DDS driving have a same gradient.

In the case where the inclination or gradient of the slope upon DDS driving in the case of the driving of FIG. 22 which achieves speedup of the driving is represented by A and the inclination of the slope upon DDS driving when speedup is achieved is represented by A', the coefficient mentioned hereinabove which is used by the signal processing section on the succeeding stage is A'/A. In other words, by multiplying data obtained by DDS driving where speedup is achieved by the coefficient of A'/A, output data same as those where speedup is not achieved can be obtained. It is to be noted that the signal process of the multiplication by the coefficient may be carried out in a chip or the semiconductor substrate 19 same as that of the pixel array section 12 or outside the chip, and there is no particular restriction in this regard.

Further, in the case where the all pixels 11 of the pixel array section 12 have no signal to be acquired by DDS driving and the signal level does not require the DDS operation itself, for example, in the case of image pickup under a very dark environment, it is possible to enhance the operation speed also by stopping the DDS driving while only the CDS driving is carried out. In this instance, as an example, such control may be imaginable that, if it is detected that an output result with which output data upon DDS driving can be determined as a zero output successively appears for a fixed period of time, then only the CDS driving is carried out in response to the detection result.

Driving Method for the Counter

As can be recognized from the foregoing description, the AD conversion circuit 23 of the slope type which uses the reference signal $V_{ref}$ of a ramp waveform compares the reference signal $V_{ref}$ of a ramp waveform which exhibits monotonous decrease or monotonous increase and the signal voltage $V_{out}$ of a pixel with each other. Then, the period of time until the output of the comparator 31 is reversed is counted with the clock CK, and the count value at the reversal timing of the output of the comparator 31 is stored as conversion data to implement AD conversion.

Figure 24:
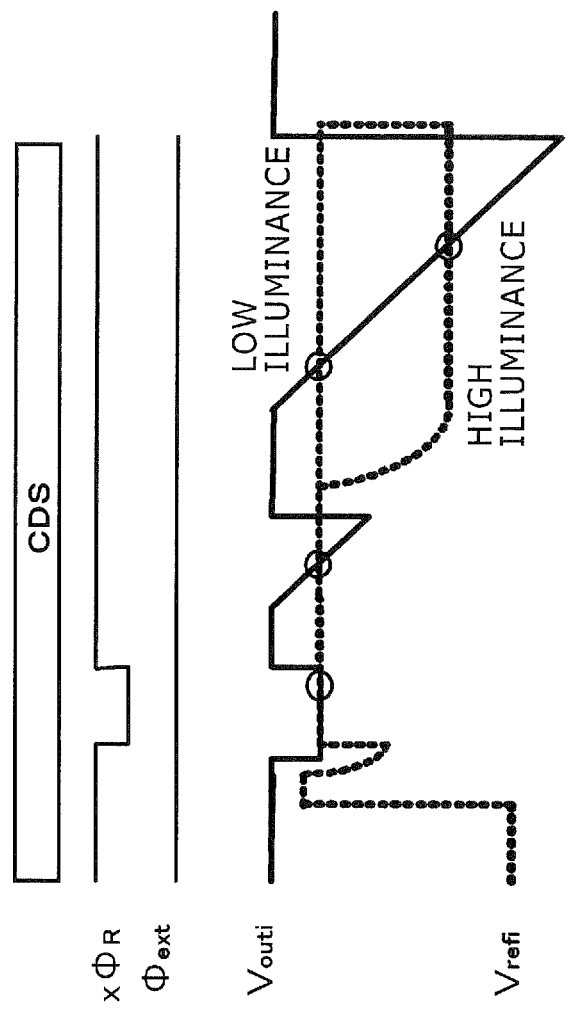
FIG. 24 is a timing waveform diagram illustrating operation of a counter section upon CDS driving.

While, in the foregoing description of the embodiment, the up/down counter 32 is used as the counting section of the column AD conversion circuit, for example, in the case where the counting section can count with 12 bits in the positive and negative, a counter which down counts upon CDS driving is incorporated. FIG. 24 illustrates timing waveforms illustrating operation of the counting section upon CDS driving. In the CDS driving, a reversal timing t is down counted till the reset level $V_{rst}$, and after the counting comes to an end, a complement of the count value to 1 is calculated to obtain a value whose positive or negative polarity is set to the reverse −1 with respect to zero.

Figure 25:
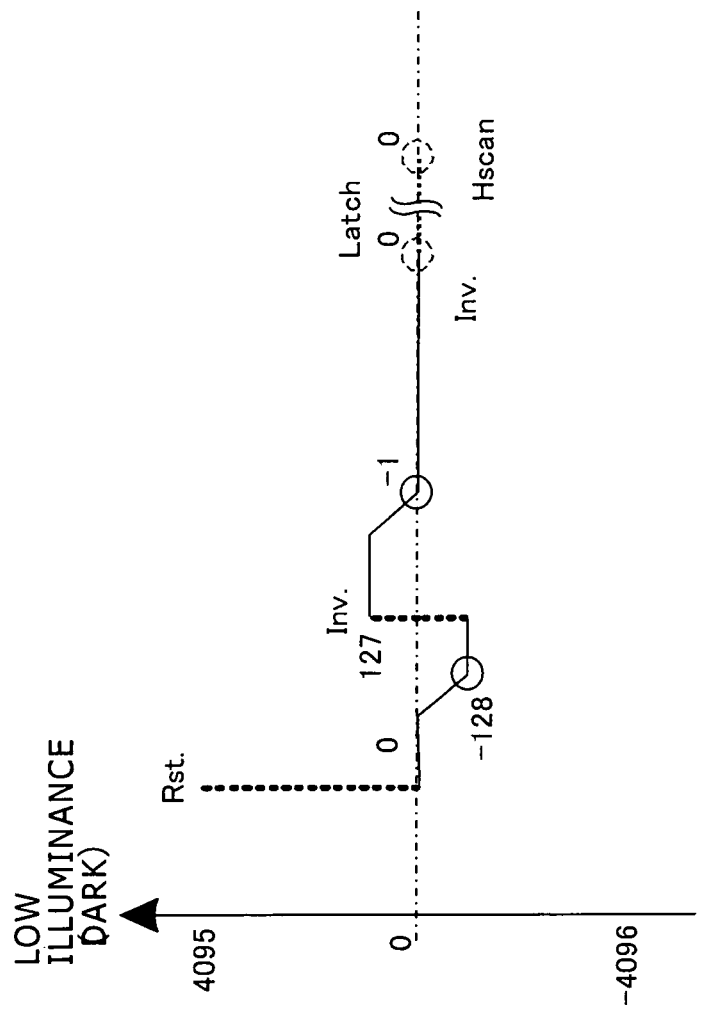
FIG. 25 is a diagrammatic view illustrating a counting operation in a low illuminance state upon CDS driving.
Figure 26:
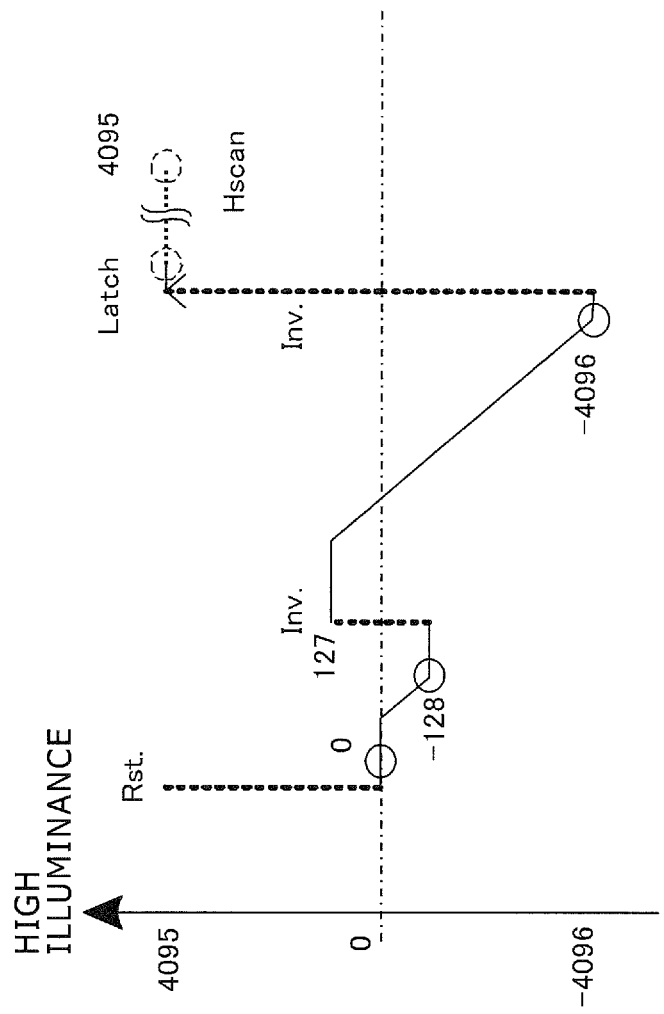
FIG. 26 is a view but illustrating a counting operation in a high illuminance state upon CDS driving.

Then, also with regard to the signal level $V_{sig}$, down counting is carried out with reference to this value. If it is assumed that the signal of the pixel 11 has only an equal potential level at a low illuminance (DARK) and is inputted to the comparator 31, then the counting ends at the count value −1 as seen in FIG. 25. If the signal of the pixel 11 is that of a high illuminance, then counting is carried out down to −4096 as seen in FIG. 26. Finally, a complement of this data to 1 is calculated. Consequently, data of 0 is obtained at the low illuminance and data of 4095 is obtained at the high illuminance.

However, if it is tried to use the same circuit, that is, the same counter, to acquire data upon DDS driving, then since, on the high illuminance side, the output of the comparator 31 is reversed after counting of a low value, a signal of a level same as that at the low illuminance upon CDS driving is outputted. In particular, since, at the high illuminance upon DDS driving, the output of the comparator 31 reverses at a timing proximate to that at the low illuminance upon CDS driving, but at the low illuminance upon DDS driving, the output of the comparator 31 reverses at a timing proximate to that at the high illuminance upon CDS driving. Therefore, the compatibility between the input signal and the data using the same circuit or counter cannot be achieved.

Figure 27:
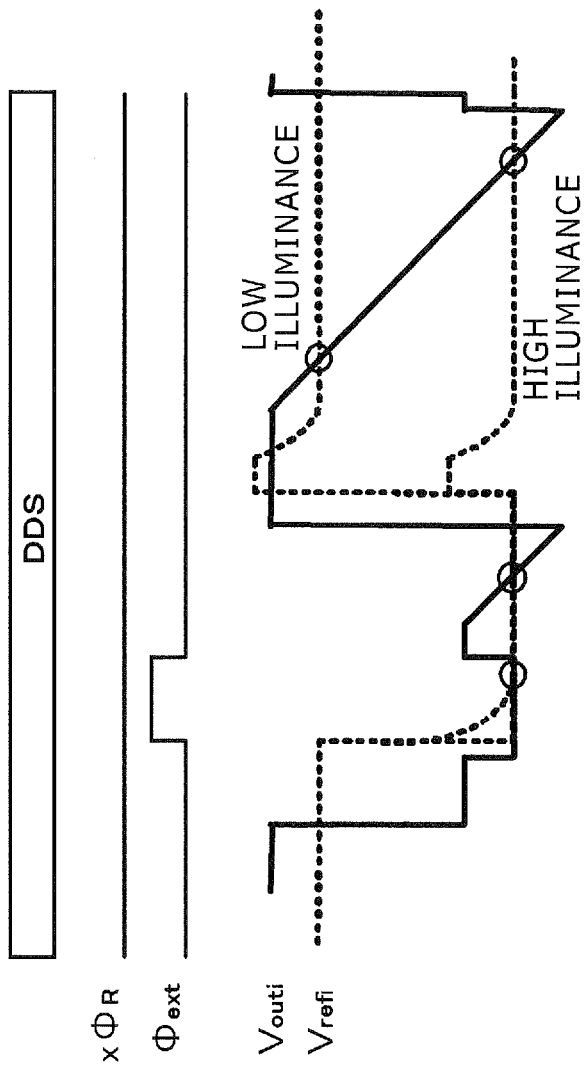
FIG. 27 is a timing waveform diagram illustrating operation of a counter section upon DDS driving.
Figure 28:
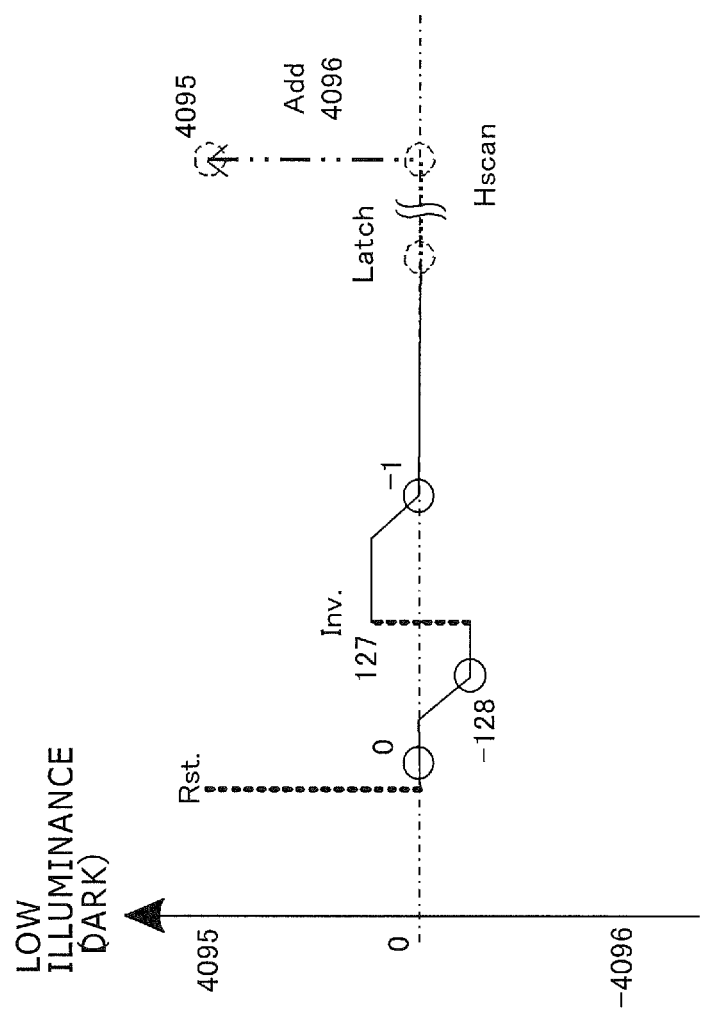
FIG. 28 is a diagrammatic view illustrating a counting operation in a low illuminance state upon DDS driving.
Figure 29:
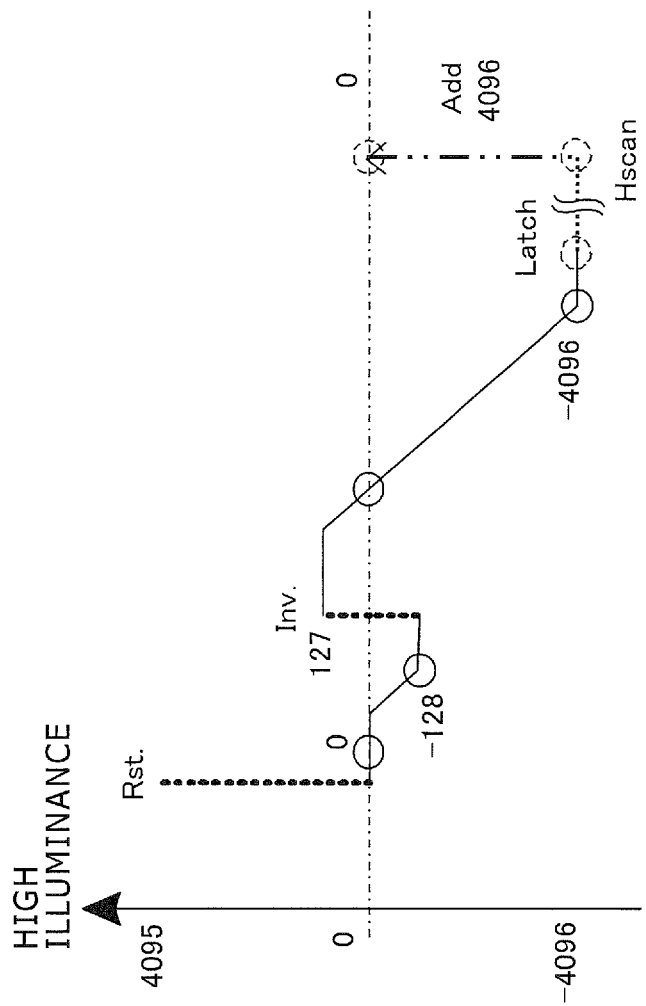
FIG. 29 is a view but illustrating a counting operation in a high illuminance state upon DDS driving.

FIG. 27 is a timing waveform diagram illustrating an operation of the counter section upon DDS driving. Meanwhile, FIG. 28 is a diagrammatic view illustrating a counting operation at the low illuminance upon DDS driving, and FIG. 29 is a similar view but illustrating a counting operation at the high illuminance upon DDS driving.

In order to achieve compatibility between an input signal and data using the same circuit or counter, in the DDS driving, the counting section of the column AD conversion circuit carries out such driving as described below. In particular, signals acquired by the DDS driving are selected, for example, by scanning by the column scanning section 16, and then the 4096 data are added and then outputted.

The addition process of the 4096 data may be carried out in the same chip or semiconductor substrate 19 as that of the pixel array section 12 or may be carried out as part of a calculation process outside the chip. This addition processing circuit can be implemented by a circuit section for deciding whether or not each signal is a signal acquired by DDS driving and an adder for receiving results of such decision of the circuit section and carrying out an addition process upon DDS driving.

In this manner, in the DDS driving, by adding data corresponding to the number of bits of the counter, for example, 4096 data in the case of 12 bits, to signals acquired by the DDS driving, the compatibility between the input signal and the data using the same circuit or counter can be achieved. In other words, upon acquisition of data by CDS driving and DDS driving, the same circuit or counter can be used as the counting section of the column. AD conversion circuit.

2. Second Embodiment

2-1. System Configuration

Figure 30:
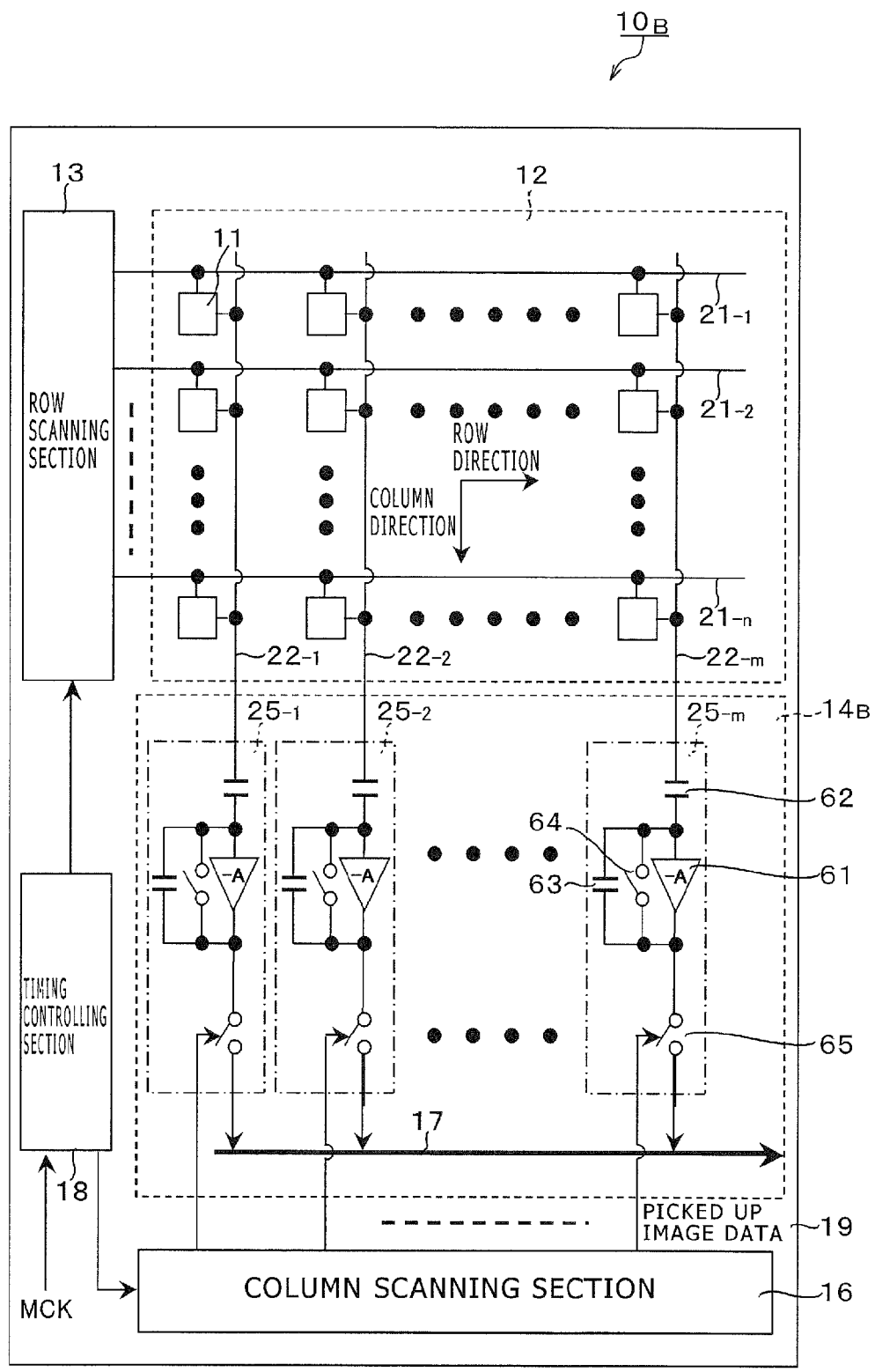
FIG. 30 is a system block diagram showing a general configuration of a CMOS image sensor according to a second embodiment of the present disclosure.

FIG. 30 is a system block diagram showing a general configuration of a CMOS image sensor according to a second embodiment of the present disclosure.

Referring to FIG. 30, the CMOS image sensor $10_B$ according to the present embodiment includes, in addition to a pixel array section 12, for example, a row scanning section 13, a column processing section $14_B$, a reference signal generation section 15, a column scanning section 16, a horizontal outputting line 17 and a timing controlling section 18 as peripheral circuits to the pixel array section 12.

In the CMOS image sensor $10_B$, only the column processing section $14_B$ is different in configuration from the column processing section $14_A$ in the first embodiment, but the other components, that is, the row scanning section 13, reference signal generation section 15, column scanning section 16, horizontal outputting line 17 and timing controlling section 18 are basically same as those in the first embodiment.

The column processing section $14_B$ has column amplification circuits 25, that is, $25_{-1}$ to $25_{-m}$, provided, for example, in a one-by-one corresponding relationship to pixel columns of the pixel array section 12, that is, to column signal lines 22, that is, $22_{-1}$ to $22_{-m}$. The column amplification circuits 25, that is, $25_{-1}$ to $25_{-m}$, carry out an amplification process for analog signals outputted for the individual columns from the unit pixels 11 of the pixel array section 12 and carry out a correlation double sampling process for calculating a difference between a signal level and a reset level for the analog signals.

All of the column amplification circuits $25_{-1}$ to $25_{-m}$ have the same configuration. Here, description is given of the column amplification circuit $25_{-m}$ for the mth column as an example. The column amplification circuit $25_{-m}$ includes an inverting amplifier 61, an input capacitor 62, a feedback capacitor 63, a control switch 64 and a horizontal selection switch 65. The column amplification circuit $25_{-m}$ amplifies a signal voltage $V_{out}$ supplied thereto from a unit pixel 11 through the column signal line $22_{-m}$ and outputs the amplified signal voltage $V_{out}$ as an analog signal $V_{amp}$.

It is to be noted that, while the column processing section $14_B$ in the present example is configured such that the column amplification circuits 25 are provided in a one-by-one corresponding relationship to the column signal lines 22, the column amplification circuits 25 and the column signal lines 22 need not necessarily be provided in a one-by-one corresponding relationship. For example, one column amplification circuit 25 may be provided commonly to a plurality of pixel columns such that it is used time-divisionally by the pixel columns.

Existing Configuration of the Column Amplification Circuit

An existing CMOS image sensor which uses the column amplification circuits 25 disposed in parallel in the column direction as a signal processing section uses CDS driving as a basic driving method thereof. In particular, the existing CMOS image sensor is based on CDS driving wherein the reset level $V_{rst}$ is read from a unit pixel 11 first and then the signal level $V_{sig}$ is read out. Here, an example of a configuration of a column amplification circuit used for the CMOS image sensor according to the existing example is described.

Figure 31:
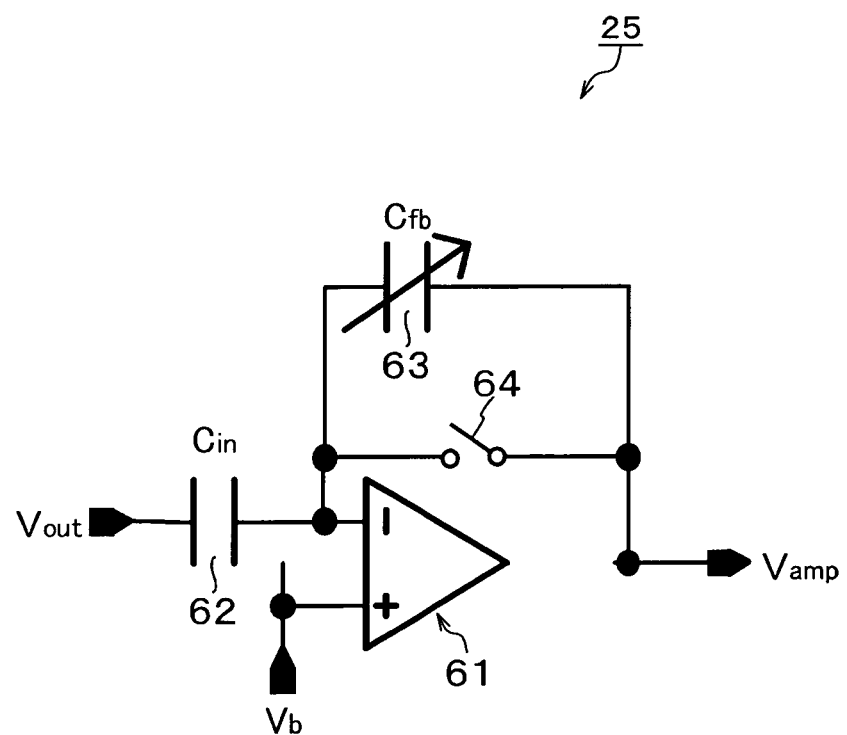
FIG. 31 is a circuit diagram showing an existing configuration of a column amplification circuit.
Figure 32:
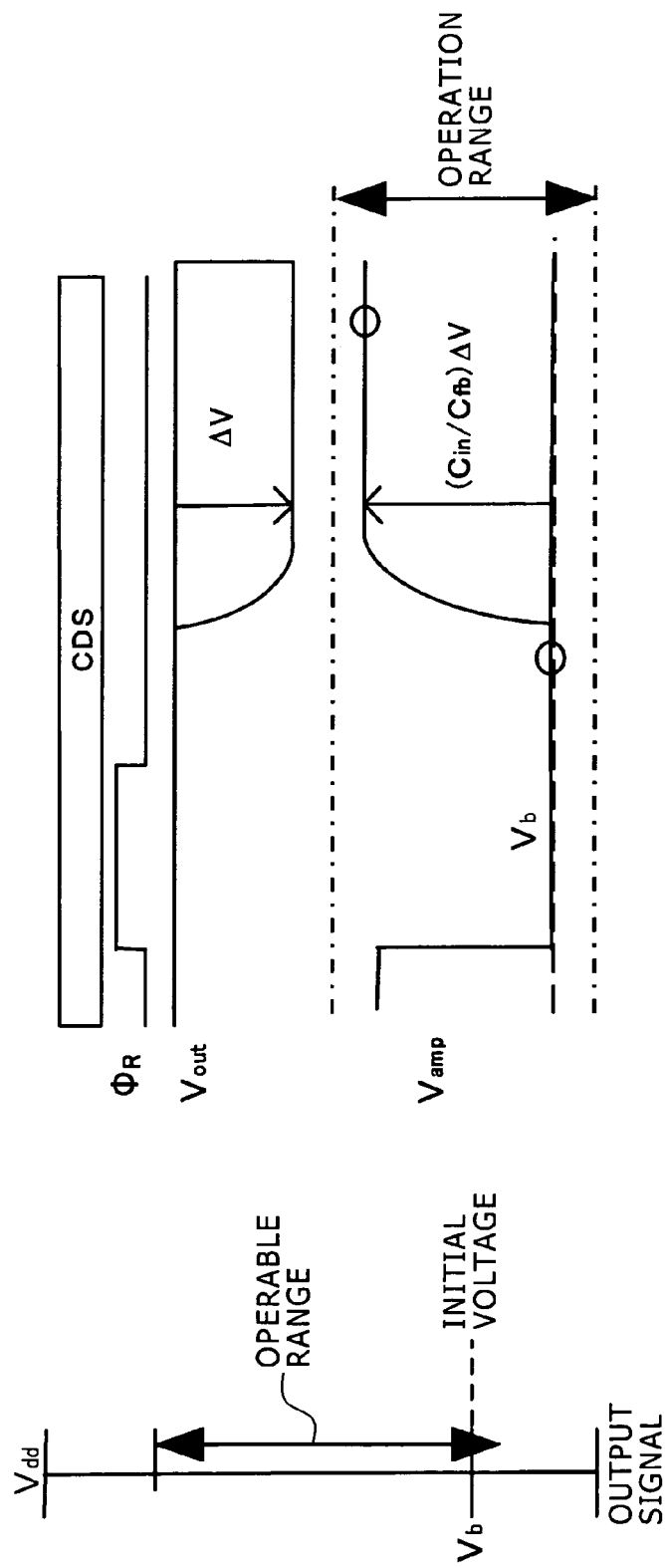
FIG. 32 is a diagrammatic view illustrating an operation range of an output signal of the column amplification circuit of FIG. 31.

FIG. 31 is a circuit diagram showing an existing configuration of the column amplification circuit 25. FIG. 32 illustrates an operation range of an output signal of the column amplification circuit 25 according to the existing configuration.

Referring first to FIG. 31, the column amplification circuit 25 according to the existing configuration includes an inverting amplifier 61, an input capacitor 62, a feedback capacitor 63 and a control switch 64. Also in this column amplification circuit 25, the input and output terminals of the inverting amplifier 61 are short-circuited by the control switch 64 under the control of the control signal $\Phi_R$ to acquire a reference voltage for the column amplification circuit 25.

In the CDS operation, the reset level $V_{rst}$ and the signal level $V_{sig}$ are read out in this order. However, from the point of view of the potential, a high potential and a low potential are read out in this order. In the column amplification circuit 25, the output voltage is set low as an initial value, and in the case where the input signal becomes low, that is, in the case where the signal level from a unit pixel 11 is high, the low initial output voltage is amplified by a capacitance ratio between the input capacitor 62 and the feedback capacitor 63. In particular, if the capacitance value of the input capacitor 62 is represented by $C_{in}$ and the capacitance value of the feedback capacitor 63 is represented by $C_{fb}$, the low initial output voltage is amplified by the capacitance ratio $C_{in}/C_{fb}$.

If the initial voltage or reference voltage when the input and output terminals of the inverting amplifier 61 are short-circuited by the control switch 64 under the control of the control signal $\Phi_R$, then the analog signal $V_{amp}$ of the column amplification circuit 25 is represented by $$V_{amp}=V_b+(C_{in}/C_{fb})\Delta V$$

where $\Delta V$ is the potential difference between the reset level $V_{rst}$ and the signal level $V_{sig}$. The output operation range of the column amplification circuit 25 is a range from a voltage lower approximately by a threshold voltage of the inverting amplifier 61 than the initial voltage $V_b$ when the input and output terminals of the inverting amplifier 61 are short-circuited to an upper operation range which depends upon the circuit configuration of the column amplification circuit 25.

Figure 33:
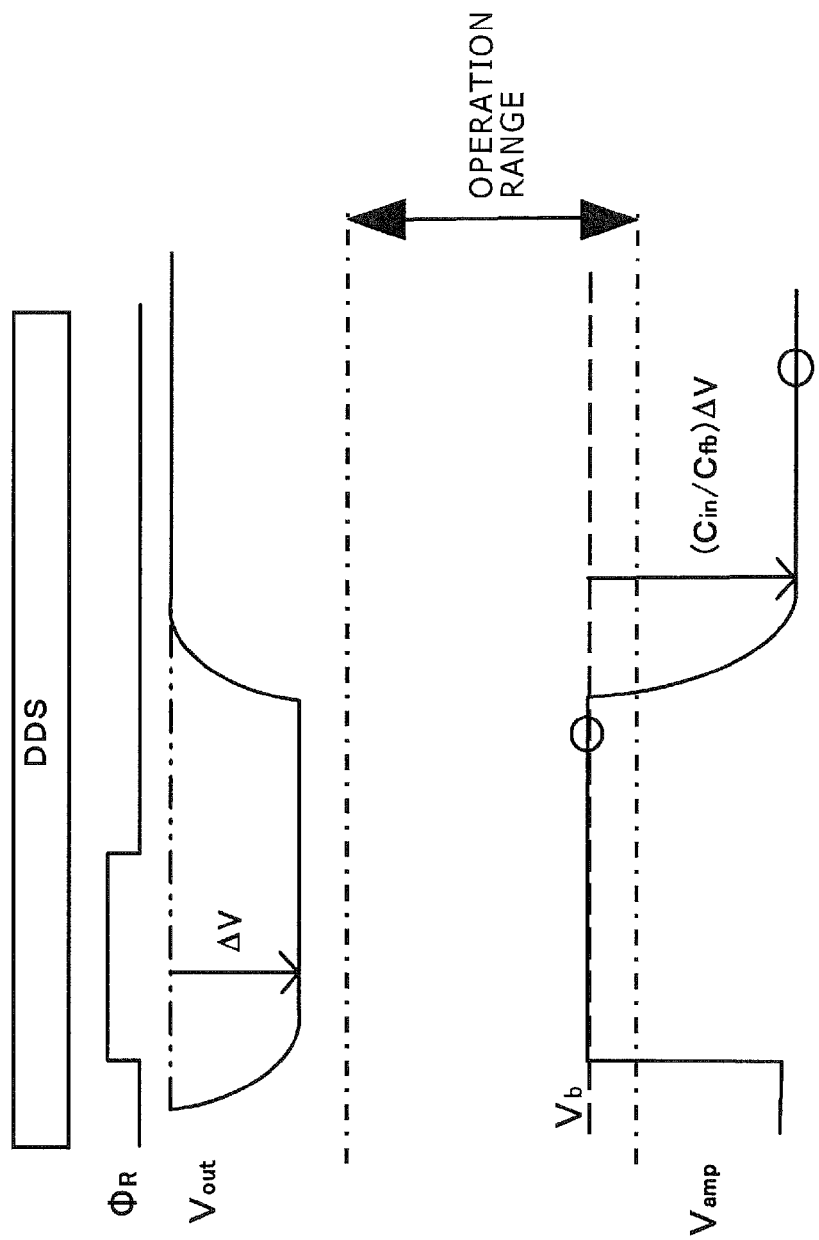
FIG. 33 is a waveform diagram illustrating an output waveform where the column amplification circuit of FIG. 31 is used to carry out DDS driving.

An output waveform of the column amplification circuit 25 in the case where DDS driving is carried out with the CMOS image sensor which uses the column amplification circuit 25 having the existing configuration is illustrated in FIG. 33.

In the DDS driving, the signal outputting order is reverse to that in the case of the CDS driving. In other words, the signal level $V_{sig}$ and the reset level $V_{rst}$ are outputted in this order. Accordingly, since the output signal of the column amplification circuit 25 becomes further lower than the voltage value of the low initial voltage, the output signal goes out of the operation range of the circuit. In order to solve this, the following configuration is adopted in the second embodiment.

2-2. Characteristics of the Second Embodiment

In particular, in the second embodiment, the CMOS image sensor $10_B$ which uses the column amplification circuit 25 which carries out an amplification process for an analog signal from a unit pixel 11 and carries out a correlation double sampling process of detecting a difference between the signal level $V_{sig}$ and the reset level $V_{rst}$ is characterized in that it adopts the following configuration.

In particular, when a signal of a unit pixel 11 is read out divisionally by two times as a first signal and a second signal, the first signal read out first is used as a reference voltage for an input voltage range which can be processed by a signal processing section for processing the first and second signals. In the case of the present embodiment, the column amplification circuit 25 corresponds to the signal processing section for processing the first and second signals. Further, the reference voltage is a voltage which is used as a reference to the input voltage range within which the column amplification circuit 25 can amplify the voltage.

At this time, in the case where the first signal is a signal based on signal charge accumulated or retained in the FD section 42, that is, the signal level $V_{sig}$, then the signal level is used as the reference voltage. On the other hand, if the first signal is a signal based on the reset potential $V_r$ when the FD section 42 is reset, that is, the reset level $V_{rst}$, then the reset level is used as the reference voltage. Then, while the first signal read out first is used as the reference voltage for the column amplification circuit 25, an amplification process is carried out for the first and second signals in a state in which the reference voltage is adjusted so that the first and second signals may be included in the input voltage range of the column amplification circuit 25.

By adjusting the reference voltage so that the first and second signals may be included in the input voltage range of the column amplification circuit 25 in this manner, the column amplification circuit 25 can carry out an amplification process for the first and second signals in the state in which the first and second signals are included in the input voltage range. Accordingly, in both of the case in which the first signal read out first is the signal level $V_{sig}$ and the case in which the first signal is the reset level $V_{rst}$, after a reference voltage is set using a signal of a pixel of a processing object, a signal amplification process can be carried out with certainty to the first and second signals.

Consequently, such a great difference in fluctuation of a characteristic within a plane or an offset component which relies upon the magnitude of parasitic capacitance as in the case of the existing technique disclosed in Patent Document 5, that is, as in the case where a predetermined voltage separately generated externally is used to set a reference voltage can be removed effectively. As a result, it is possible to reduce a margin necessary for an input voltage range amplifiable by the column amplification circuit 25 with respect to an output amplitude of a pixel. Since a margin necessary for the input voltage range can be reduced, reduction of the power supply voltage to and of the power consumption by the column amplification circuit 25 can be anticipated.

Working Example 1

In the following, particular working examples are described. As described hereinabove, in the DDS driving, driving of reading out signal charge retained or accumulated in the FD section 42 as a signal level $V_{sig}$ is carried out. Then, driving of resetting the FD section 42 to the reset potential $V_r$ and reading out the reset potential $V_r$ as a reset level $V_{rst}$ is carried out. Then, the signal level $V_{sig}$ read out first from the unit pixel 11 is used as a reference voltage for a convertible input voltage range of the column amplification circuit 25. In other words, the signal level $V_{sig}$ read out first is used to set the reference voltage for the column amplification circuit 25.

Figure 34A:
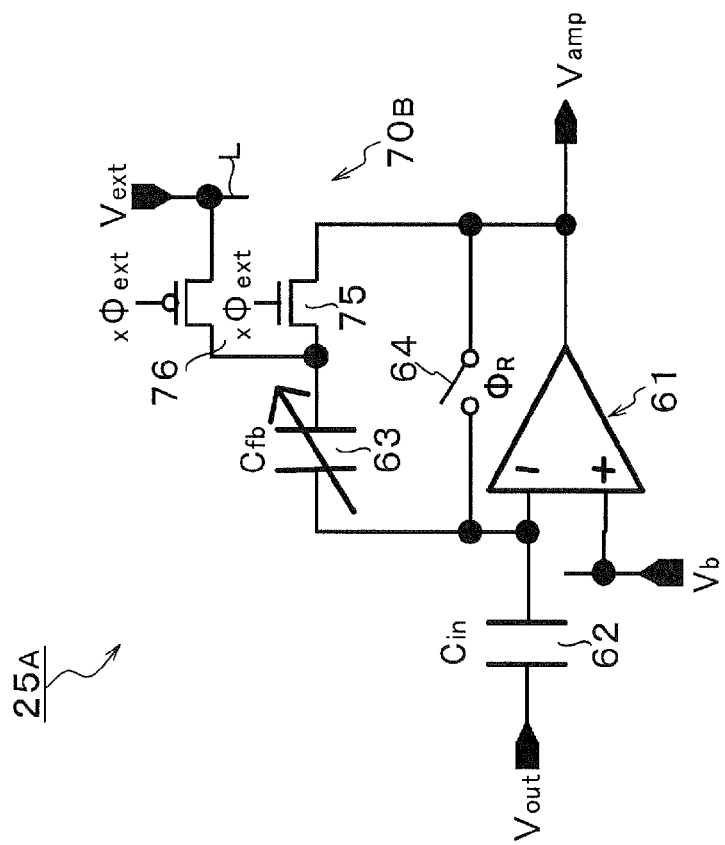
FIG. 34A is a circuit diagram showing an example of a configuration of a column amplification circuit according to a working example 1 of the second embodiment and FIG. 34B is a diagrammatic view illustrating an operation range of the column amplification circuit of FIG. 31.
Figure 34B:
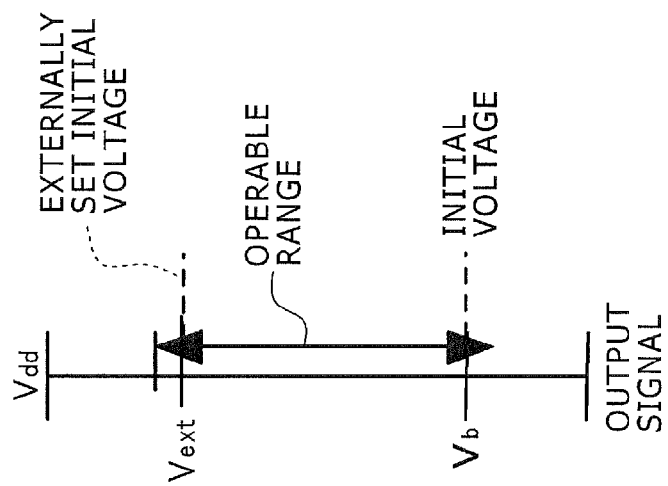

FIGS. 34A and 34B show a column amplification circuit according to a working example 1 which has a function for adjusting a reference voltage, and particularly FIG. 34A shows an example of a configuration of the column amplification circuit and FIG. 34B illustrates an operation range of the column amplification circuit.

Referring first to FIG. 34A, the column amplification circuit $25_A$ according to the working example 1 includes, in addition to an inverting amplifier 61, an input capacitor 62, a feedback capacitor 63 and a control switch 64, an initial voltage setting circuit $70_B$ for setting or adjusting the reference voltage of the column amplification circuit $25_A$.

The initial voltage setting circuit $70_B$ includes an NMOS transistor 75 connected in series to the feedback capacitor 63, and a PMOS transistor 76 connected between the connecting node between the feedback capacitor 63 and the NMOS transistor 75 and a line L to which an externally set initial voltage $V_{ext}$ is applied. To the gate electrode of the NMOS transistor 75 and the PMOS transistor 76, an inverted signal $x\Phi_{ext}$ of the control signal $\Phi_{ext}$ is applied. The inverted signal $x\Phi_{ext}$ of the control signal $\Phi_{ext}$ is provided, for example, from the timing controlling section 18 shown in FIG. 1. In other words, the timing controlling section 18 has a function as a control section for controlling the initial voltage setting circuit $70_B$.

Figure 35:
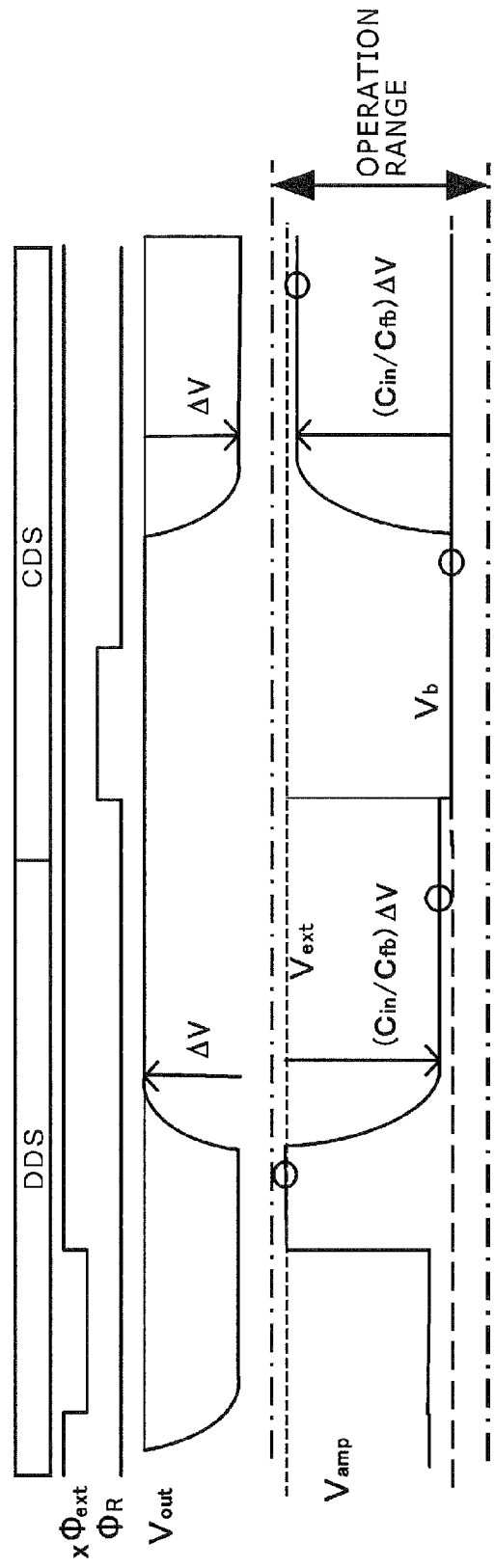
FIG. 35 is a diagrammatic view illustrating signal waveforms at several portions of the column amplification circuit of FIG. 34A.

FIG. 35 is a waveform diagram illustrating signal waveforms at different portions of the column amplification circuit $25_A$ according to the working example 1. FIG. 35 illustrates the inverted signal $x\Phi_{ext}$ of the control signal $\Phi_{ext}$, control signal $\Phi_R$, signal voltage $V_{out}$ of the column signal line 22 which is an input voltage to the column amplification circuit $25_A$, and analog signal $V_{amp}$ of the column amplification circuit $25_A$.

In the case of the CDS driving, the inverted signal $x\Phi_{ext}$ of the control signal $\Phi_{ext}$ is in a high potential state, and consequently, the NMOS transistor 75 exhibits a conducting state and electrically connects the feedback capacitor 63 to the output terminal of the column amplification circuit $25_A$. The circuit configuration at this time is the same as that of the column amplification circuit 25 shown in FIG. 31, that is, the same as that upon ordinary CDS driving.

Upon the DDS driving, the input and output terminals of the column amplification circuit $25_A$ itself are short-circuited, and consequently, the input signal of the column amplification circuit $25_A$ becomes equal to the initial voltage or reference voltage $V_b$. Consequently, an input signal with which an output amplitude can be assured and the circuit operates is obtained.

On the other hand, when the inverted signal $x\Phi_{ext}$ of the control signal $\Phi_{ext}$ is placed into a low potential state, the NMOS transistor 75 is placed into a non-conducting state and the electric connection of the feedback capacitor 63 to the output terminal of the column amplification circuit $25_A$ is opened. In other words, the feedback loop of the inverting amplifier 61 is placed into an open state. At this time, the PMOS transistor 76 is placed into a conducting state and applies the externally set initial voltage $V_{ext}$ to the open end of the feedback capacitor 63. Consequently, the initial value of the output voltage of the inverting amplifier 61 becomes equal to the externally set initial voltage $V_{ext}$. Then, in the case of the DDS driving, since the input signal varies from a low signal level to a high reset level, adjustment of the reference voltage of the column amplification circuit $25_A$ is carried out so that the operation range is obtained.

Since the reference voltage upon DDS driving is adjusted by an action of the initial voltage setting circuit $70_B$ so that the signal level $V_{sig}$ and the reset level $V_{rst}$ may be included in the operation range of the column amplification circuit $25_A$ in this manner, use of both of the CDS driving and the DDS driving can be achieved.

Further, the initial voltage setting circuit $70_B$ for adjusting the reference voltage can be implemented by a very simple circuit configuration which includes only the two additional MOS transistors 75 and 76. Accordingly, each column amplification circuit $25_A$ exhibits an increase of a very small area. In other words, use of both of the CDS driving the DDS driving can be implemented only by an increase by a very small area of the column amplification circuit $25_A$.

Working Example 2

Figure 36:
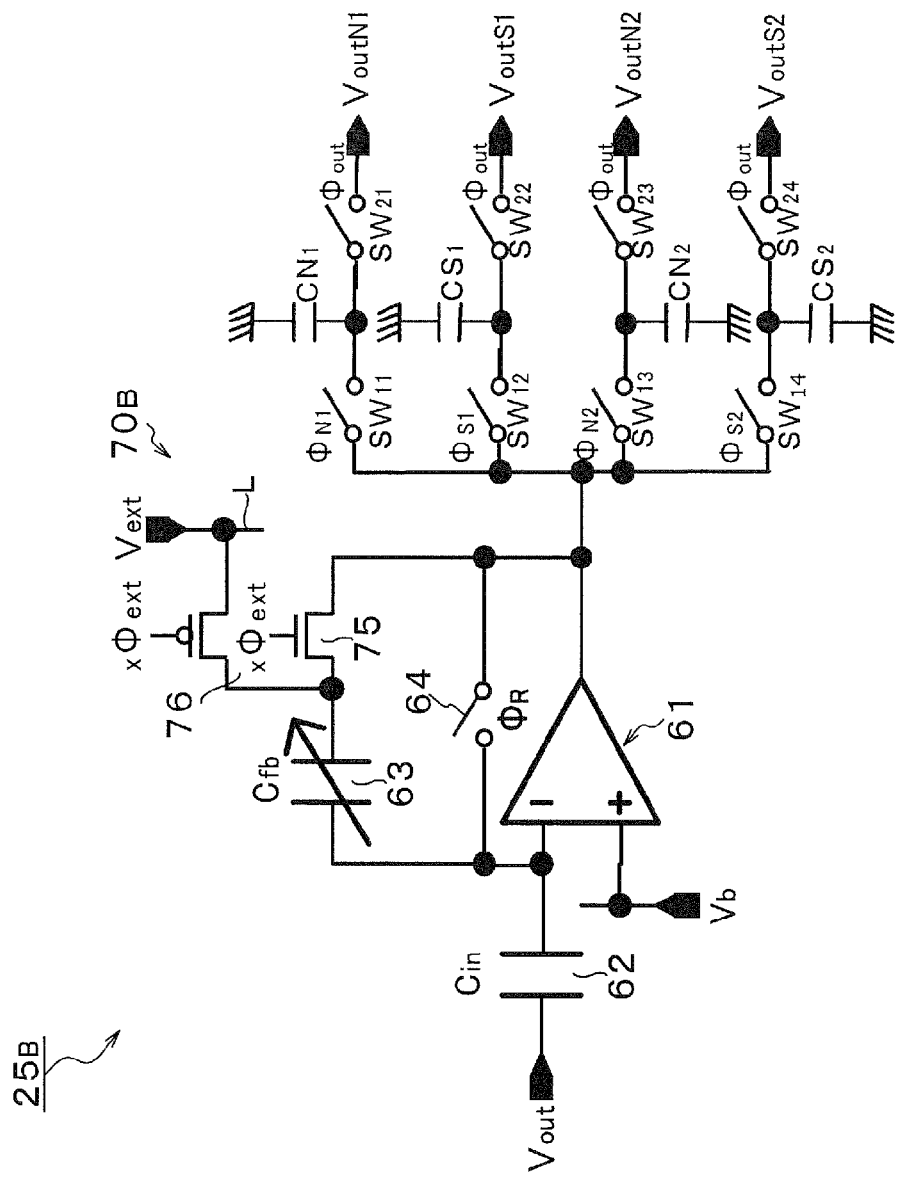
FIG. 36 is a circuit diagram showing an example of a configuration of a column amplification circuit according to a working example 2 of the second embodiment.

FIG. 36 is a circuit diagram showing an example of a configuration of a column amplification circuit according to a working example 2 having a function for adjusting a reference voltage.

The column amplification circuit $25_B$ according to the working example 2 is configured such that it amplifies a signal at a capacitance ratio between the capacitance on the input side and the capacitance on the output side. In particular, four output capacitors $CN_1$, $CS_1$, $CN_2$ and $CS_2$ are connected to the output terminal of an inverting amplifier 61 through switches $SW_{11}$ to $SW_{14}$, and held charge of the output capacitors $CN_1$, $CS_1$, $CN_2$ and $CS_2$ is selectively outputted by switches $SW_{21}$ to $SW_{24}$, respectively. The configuration and operation of the other part than the circuit portion of the capacitance on the output side are same as those in the case of the column amplification circuit $25_A$ according to the working example 1.

At the place of the feedback capacitor 63 of a column amplification circuit $25_B$, an initial voltage setting circuit $70_B$ for setting or adjusting a reference voltage for the column amplification circuit $25_B$ is provided similarly as in the case of the column amplification circuit $25_A$ according to the working example 1. The initial voltage setting circuit $70_B$ has a configuration similar to that of the working example 1. In particular, the initial voltage setting circuit $70_B$ includes an NMOS transistor 75 connected in series to the feedback capacitor 63 and a PMOS transistor 76 for selectively applying an externally set initial voltage $V_{ext}$ to the connecting node between the feedback capacitor 63 and the NMOS transistor 75.

Figure 37:
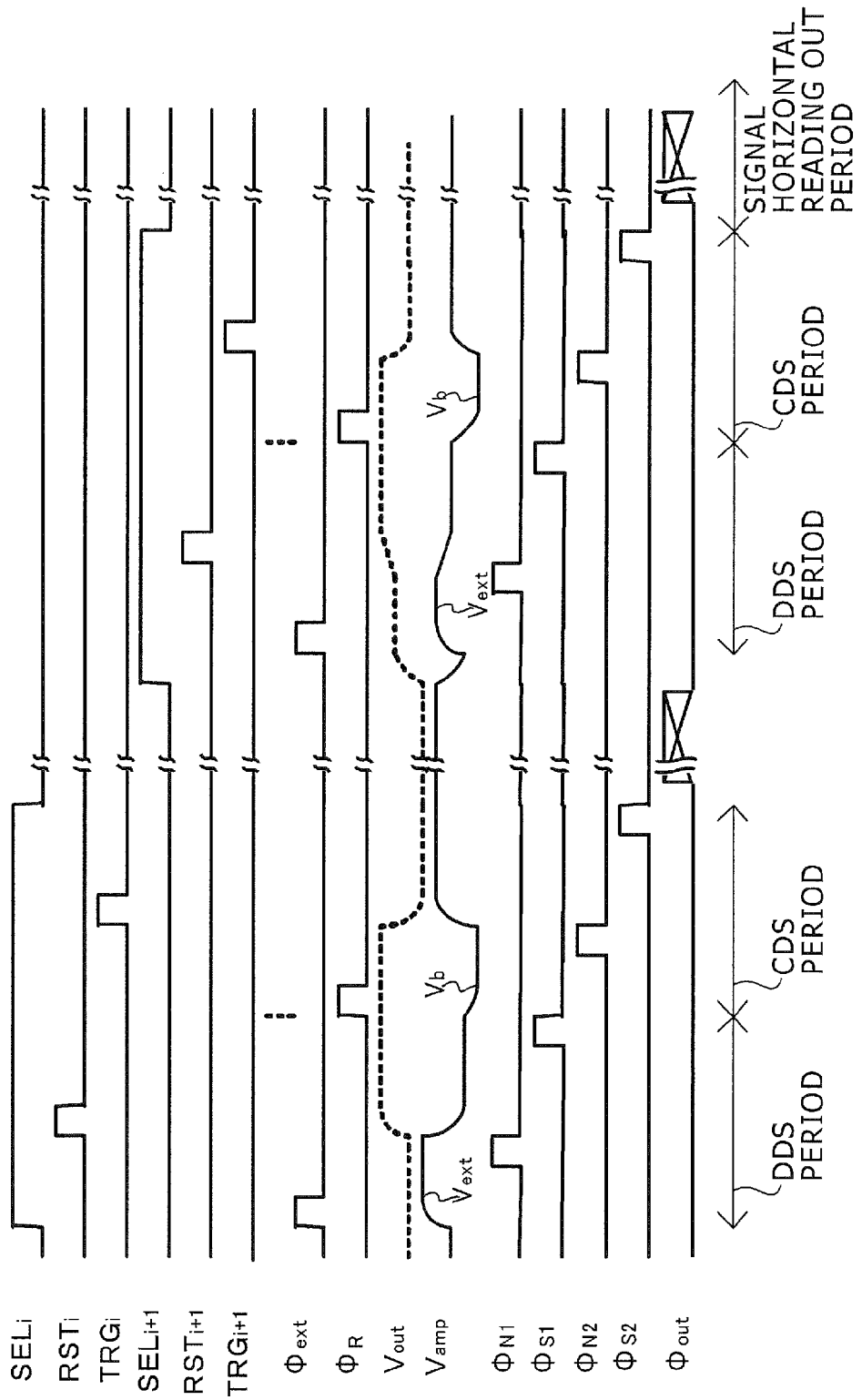
FIG. 37 is a timing waveform diagram illustrating operation of a CMOS image sensor which includes the column amplification circuit of FIG. 36.

Now, circuit operation of the column amplification circuit $25_B$ according to the working example 2 of the configuration described above is described with reference to a timing waveform diagram of FIG. 37.

Similarly as in the case of the first embodiment, the externally set initial voltage $V_{ext}$ as an initial voltage is set so that the output of the column amplification circuit $25_B$ upon DDS driving may not be saturated on the lower side. After the setting, an output signal of the column amplification circuit $25_B$ in a state in which feedback is applied is sampled into the output capacitor $CS_1$ with a control signal $\Phi_{S1}$. Then, the reset signal RST for a pixel 11 is placed into an active state to sample the signal level into the output capacitor $CN_1$ with a control signal $\Phi_{N1}$.

A control signal or reset signal $\Phi_R$ is inputted to the column amplification circuit $25_B$ to reset the FD section 42 of the pixels 11 at the same time. Consequently, the input side of the column amplification circuit $25_B$ is set to the initial voltage $V_b$. The state when the application of the control signal $\Phi_R$ is stopped is sampled as an initial value into the output capacitor $CN_2$ with the control signal $\Phi_{R2}$ and then sampled into the output capacitor $CS_2$ with the control signal $\Phi_{S2}$ after the signal is transferred from the photodiode 41 to the FD section 42 with the transfer signal TRG. A signal level difference upon DDS driving is accumulated in the output capacitors $CN_1$ and $CS_1$, and a signal level difference upon CDS driving is accumulated in the output capacitors $CN_2$ and $CS_2$. The signals are read out to the output side by horizontal transfer control.

Also in the column amplification circuit $25_B$ of the configuration wherein a signal is amplified at a capacitance ratio between the capacitance on the input side and the capacitance on the output side in this manner, an appropriate initial state can be established by an action of the initial voltage setting circuit $70_B$. Consequently, it is made possible to use the same circuit such that an output is included in the operation range upon both of CDS driving and DDS driving.

Further, the initial voltage setting circuit $70_B$ for adjusting the reference voltage can be implemented by a very simple circuit configuration which includes only the two additional MOS transistors 75 and 76. Accordingly, each column amplification circuit $25_A$ exhibits an increase of a very small area. In other words, use of both of the CDS driving and the DDS driving can be implemented only by an increase by a very small area of the column amplification circuit $25_B$.

Further, by changing the capacitance ratio between the input side and the feedback side of the column amplification circuit $25_B$ between DDS driving and CDS driving, the signal gain can be set separately for the DDS driving and the CDS driving. In addition, also it is possible to connect an AD conversion circuit of the single slope type according to the first embodiment to the output side of the column amplification circuit $25_B$ such that AD conversion is carried out within a period represented by the control signals $\Phi_{N1}$, $\Phi_{N2}$, $\Phi_{S1}$ and $\Phi_{S2}$ to acquire signals.

3. Other Pixel Configurations

In the first and second embodiments, the CMOS image sensors $10_A$ and $10_B$ having the global exposure function are described as examples of the solid-state image pickup apparatus from which a reset level cannot be read out prior to a signal level. The CMOS image sensors $10_A$ and $10_B$ having this global exposure function execute a successive reading out operation in a state in which signal charge is held in the FD section 42 as a result of simultaneous transfer of charge generated in the photodiode 41 to the FD section 42 with regard to the all pixels in order to implement simultaneous exposure for all pixels.

However, the solid-state image pickup apparatus from which a reset level cannot be read out prior to a signal level because signal charge to be read out before resetting exists in the signal detection section is not limited to the CMOS image sensors $10_A$ and $10_B$ having the global exposure function. In the following, some other examples of pixels are described.

Different Pixel Example 1

Figure 38:
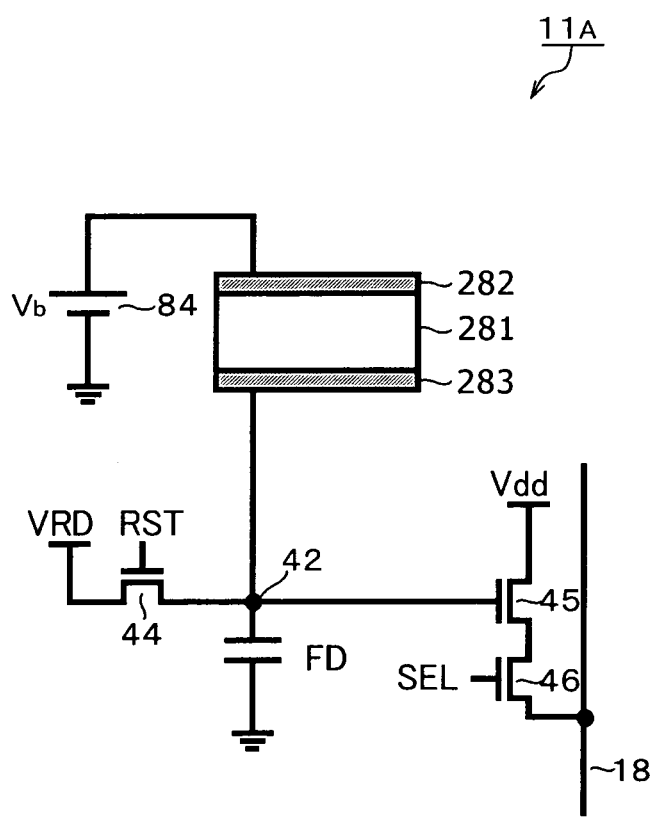
FIG. 38 is a circuit diagram showing an example of a unit pixel according to a different pixel example 1.

FIG. 38 is a circuit diagram showing an example of a unit pixel according to a different pixel example 1 which uses an organic photoelectric conversion film.

Referring to FIG. 38, in the unit pixel $11_A$ according to the different pixel example 1, an organic photoelectric conversion film 281 is sandwiched by an upper electrode 282 and a lower electrode 283. At least the lower electrode 283 is divided into pixels and is frequently formed from an electrode of a high transparency. A bias voltage $V_b$ is applied to the upper electrode 282 from a bias power supply 284.

Charge generated, by photoelectric conversion by the organic photoelectric conversion film 281 is accumulated into the FD section 42. The charge of the FD section 42 is read out as a voltage from the column signal line 22 through a reading out circuit including the amplification transistor 45. The FD section 42 is set to a drain voltage $V_r$ by the reset transistor 44. Then, the drain voltage $V_r$ of the reset transistor 44 can be changed from a voltage $V_{r1}$ which is lower than the depleted potential of the FD section 42 on the reset transistor 44 to another voltage $V_{r2}$ which is higher than the potential.

In the case of the unit pixel $11_A$ according to the different pixel example 1 which uses the organic photoelectric conversion film 281 in this manner, a signal of the pixel is read out by DDS driving. From another pixel which is configured from four transistors and so forth and can carry out CDS operation and wherein no organic photoelectric conversion film is provided or the function of the organic photoelectric conversion film is disabled, a signal is read out by different driving. For example, in the case where the other pixel which does not use the organic photoelectric conversion film 281 has, for example, the pixel configuration described hereinabove with reference to FIG. 2, reading out by a combination of DDS driving and CDS driving or by only CDS driving is carried out.

Also to a solid-state image pickup apparatus which uses the unit pixel $11_A$ according to this different pixel example 1, the technique regarding the signal processing section according to the first and second embodiments described hereinabove can be applied similarly. in other words, both of the DDS driving and the CDS driving can be applied by the same signal processing section.

Different Pixel Example 2

Now, a unit pixel having a charge accumulation section in addition to the FD section 42 therein is described as a different pixel example 2. Here, two examples having a pixel configuration which includes a charge accumulation section in addition to the FD section 42 are shown in FIGS. 39A and 39B.

Figure 39A:
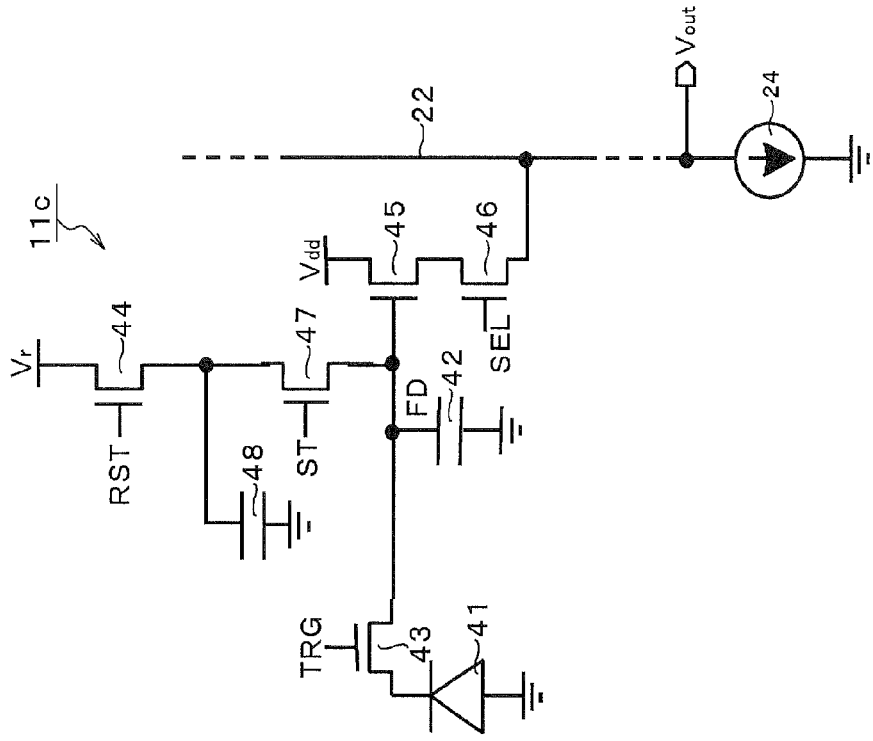
FIGS. 39A and 39B are circuit diagrams showing different examples of a unit pixel according to a different pixel example 2.
Figure 39B:
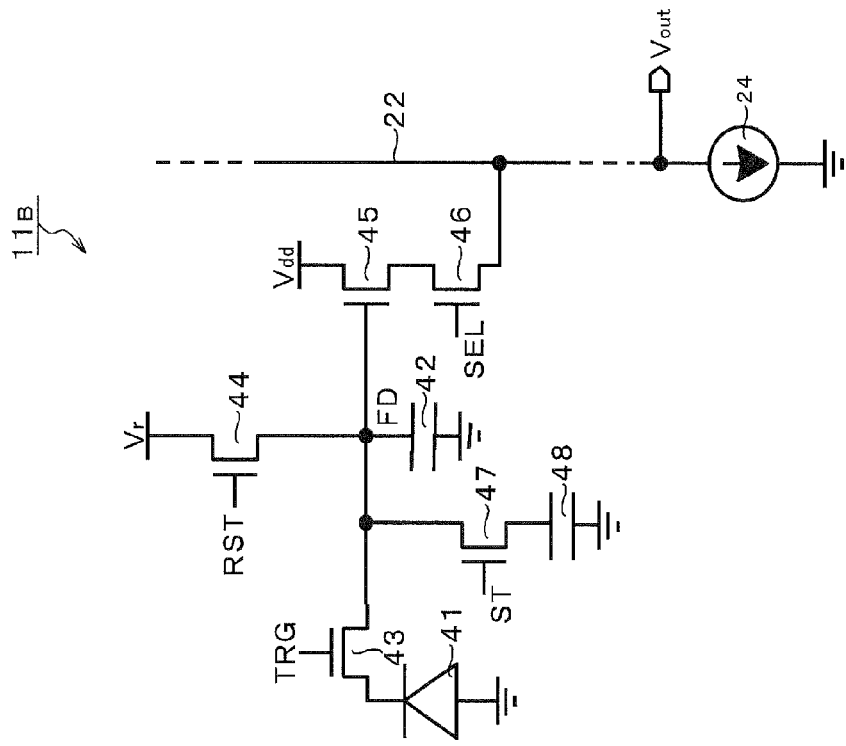

The unit pixel $11_B$ according to the pixel configuration shown in FIG. 39A has a pixel configuration wherein an accumulation capacitor 48 is connected as a charge accumulation section to the gate electrode of an amplification transistor 45 through a capacitor selection transistor 47. Meanwhile, the unit pixel $11_C$ according to the pixel configuration shown in FIG. 39B has another pixel configuration wherein a capacitor selection transistor 47 is connected between an amplification transistor 45 and a reset transistor 44 and an accumulation capacitor 48 is connected and the ground.

Also to the solid-state image pickup apparatus which uses the unit pixel $11_B$ or $11_C$ according to the different pixel example 2 of the configuration described above, the technique regarding the signal processing section according to the first and second embodiments described hereinabove can be applied similarly. In other words, both of the DDS driving and the CDS driving can be carried out by the same signal processing section.

Figure 40:
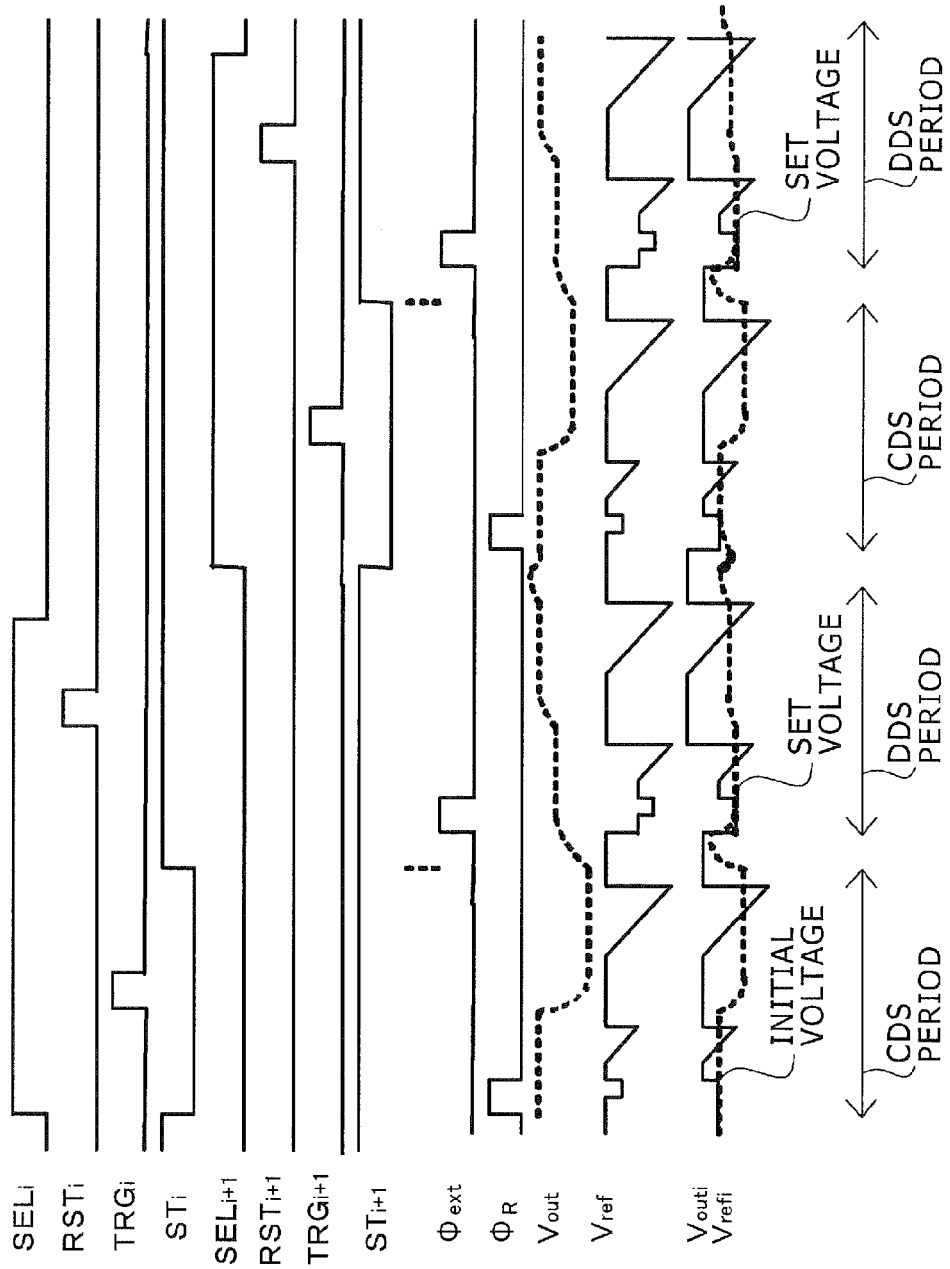
FIG. 40 is a timing waveform diagram illustrating operation of a solid-state image pickup apparatus having the unit pixel according to the different pixel example 2 and has a global shutter function.

Here, as an example, an operation in the case where signals are read out from a pixel in the order of CDS driving→DDS driving is described as an example with reference to a timing waveform diagram of FIG. 40.

After the selection transistor 46 is placed into a conducting state with a selection signal SEL, the reset transistor 44 is placed into a conducting state with a reset signal RST to reset the FD section 42. At this time, the capacitor selection transistor 47 is kept in a non-conducting state. Then, the potential of the FD section 42 when it is reset is read out as a reset level, and then a transfer signal TRG is placed into an active state to read out signal charge from the photodiode 41 to the FD section 42. The series of operations is CDS driving.

Thereafter, the capacitor selection transistor 47 is placed into a conducting state to read out the signal charge accumulated in the FD section 42 and the accumulation capacitor 48. Then, the FD section 42 and the accumulation capacitor 48 are reset by the reset transistor 44 and the reset level is read out. The series of operations is DDS driving.

Here, while a case in which a reading out operation is carried out in the order of CDS driving→DDS driving is described as an example, also in the case where a reading out operation is carried out in the order of DDS driving→CDS driving, the techniques regarding the signal processing sections according to the first and second embodiments described hereinabove can be applied similarly.

Different Pixel Example 3

Now, a unit pixel which has an analog memory for signal accumulation therein and has an intermediate overflow structure is described as a different pixel example 3.

Figure 41:
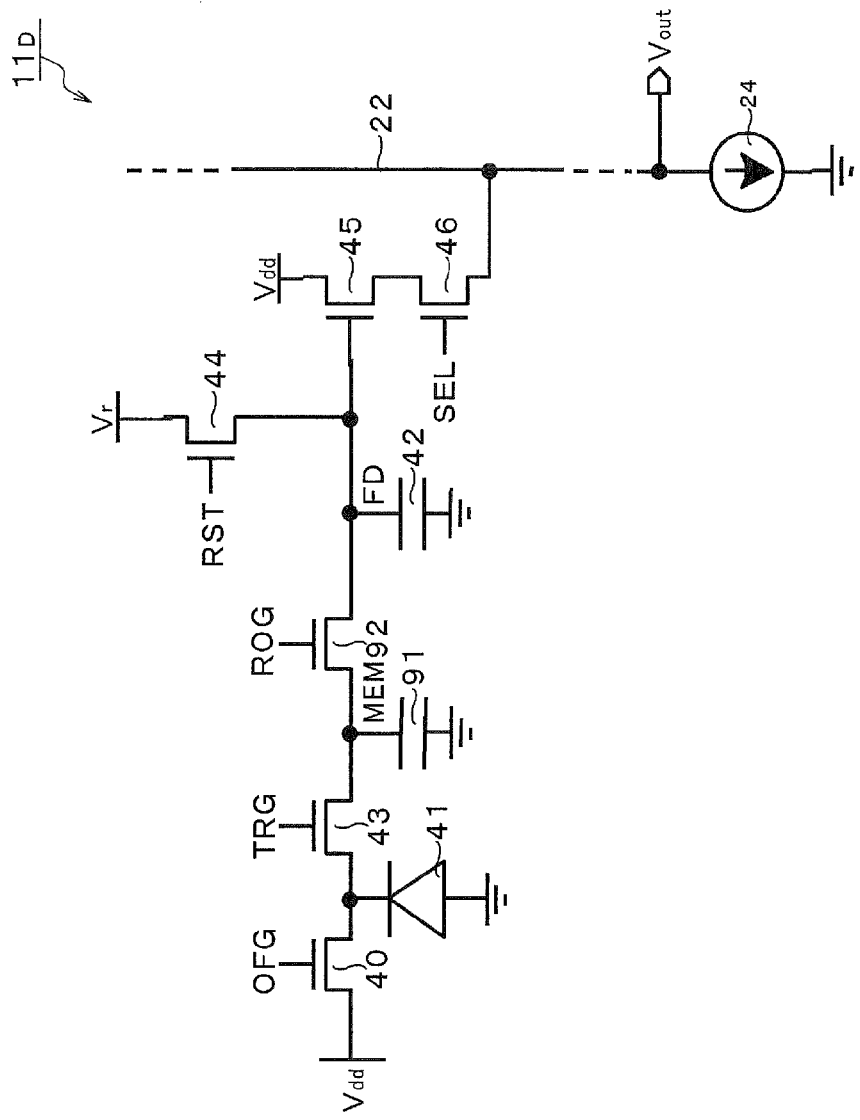
FIG. 41 is a circuit diagram showing an example of a unit pixel according to a different pixel example 3.

FIG. 41 is a circuit diagram showing an example of a unit pixel according to the different pixel example 3 which has an analog memory for signal accumulation and has an intermediate overflow structure.

The unit pixel $11_D$ according to the different pixel example 3 is configured such that it has an in-pixel accumulation capacitor (MEM) 91 which is an analog memory for signal accumulation provided at a succeeding stage of the transfer transistor 43 and includes a transfer gate section 92 disposed between the in-pixel accumulation capacitor 91 and the FD section 42. The unit pixel $11_D$ further includes a charge discharging gate section 40 connected between the photodiode 41 and a charge discharging section (for example, the pixel power supply $V_{dd}$). If a control signal OFG applied to the gate electrode of the charge discharging gate section 40 is placed into an active state, then the charge discharging gate section 40 is placed into a conducting state in response to this. Then, the unit pixel $11_D$ selectively discharges a predetermined amount of photocharge or all photocharge accumulated in the photodiode 41 from the photodiode 41 to the charge discharging section.

In the unit pixel $11_C$ according to the different pixel example 3, the voltage of the transfer signal TRG to be applied to the transfer transistor 43 is set to an intermediate potential between the high potential and the low potential. Consequently, if a high illuminance signal is inputted to the pixel, then charge which becomes equal to or higher than the potential of the gate of the transfer transistor 43 overflows to the capacitor side. Consequently, the charge amount to be handled can be increased.

Operation of a solid-state image pickup apparatus which has the unit pixel $11_D$ according to the different pixel example 3 and has the global shutter function is described with reference to a timing waveform diagram of FIG. 42.

First, starting of accumulation time is carried out by global resetting to initialize all pixels at a time. After the accumulation time passes, charge accumulated in the in-pixel accumulation capacitor 91 by an overflow is transferred to the FD section 42 at a time with regard to all pixels under the control of the transfer gate section 92. Thereafter, the transfer transistor 43 is placed into a conducting state at a time with regard to all pixels to transfer a signal on the low illuminance side accumulated in the photodiode 41 to the in-pixel accumulation capacitor 91. Before and after the transfer, signals originally existing in the photodiode 41 and the in-pixel accumulation capacitor 91 move to the in-pixel accumulation capacitor 91 and the FD section 42 at a time with regard to all pixels.

Figure 42:
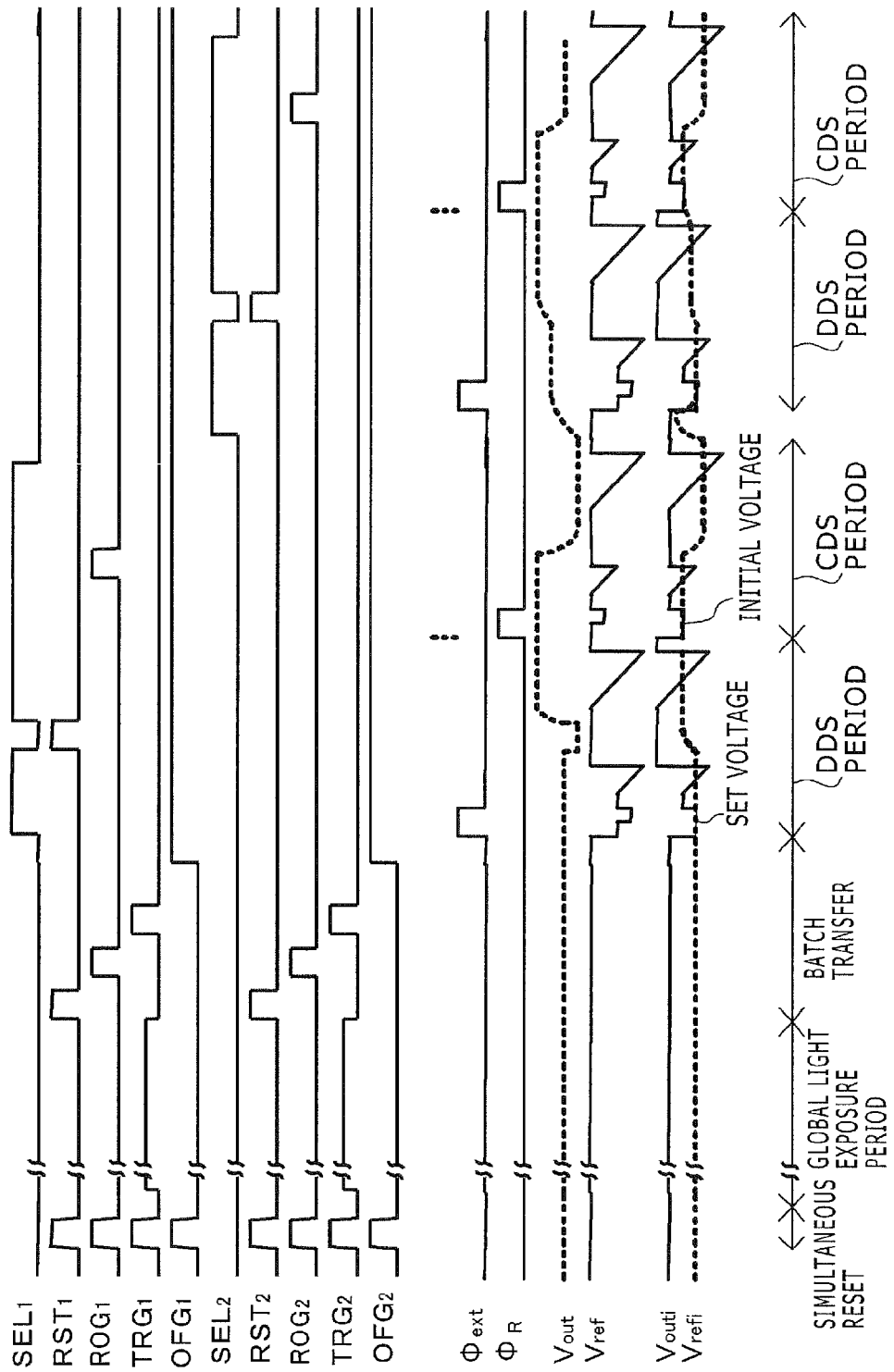
FIG. 42 is a timing waveform diagram illustrating operation of a solid-state image pickup apparatus having the unit pixel according to the different pixel example 3 and has a global shutter function.

As seen in FIG. 42, the signal of the FD section 42 is read out by DDS driving and the signal of the in-pixel accumulation capacitor 91 is read out by CDS driving. It is to be noted that, since it is assumed that the selection signal SEL upon global exposure is in an inactive state, when the reset signal RST upon reading out is inputted, preferably the selection signal SEL is in an inactive state in order that it may have a correlation to the state of the pixel. Also the control signal $\Phi_{ext}$ and the control signal $\Phi_R$ at this time are inputted at appropriate timings upon CDS driving and DDS driving described above.

4. Modifications

In the embodiments described hereinabove, the DDS driving and the CDS driving are carried out basically in the order of the DDS driving→CDS driving. However, the number of times of reading out in the CDS driving is not limited to one time. While a switch is sometimes represented by a symbol in order to simplify illustration of the drawings, also it is possible to use an NMOS or PMOS transistor alternatively. Further, the operations described hereinabove are possible if the NMOS or PMOS transistor is used such that the High level of the NMOS transistor corresponds to the active state of the switch and the Low level of the PMOS transistor corresponds to the active state of the switch.

Further, although it is described hereinabove that DDS driving and CDS driving are executed alternately for each one row within a reading out period of one row, the driving method is not limited to this specific driving method. For example, also it is possible to adopt a different driving method wherein DDS driving and CDS driving are executed alternately for each one frame. According to this driving method, since changeover between the DDS driving and the CDS driving may be carried out in a period of one frame, there is an advantage that higher speed operation can be anticipated in comparison with an alternative case in which such changeover is carried out in a period of one line or one row. On the other hand, changeover in a period of one frame requires a frame memory in the signal processing section on the succeeding stage. Therefore, from a point of view of the memory capacity, changeover in a period of one line is superior.

Further, while, in the embodiments described hereinabove, the present invention is applied to a CMOS image sensor wherein unit pixels are disposed in rows and columns, the application of the disclosure is not limited to a CMOS image sensor. In particular, the present disclosure can be applied to general solid-state image pickup apparatus of the X-Y address type wherein unit pixels are disposed two-dimensionally in rows and columns.

Further, the present disclosure can be applied not only to solid-state image pickup apparatus which detect and pick up a distribution of the incident light amount of visible rays as an image but can be applied also to general solid-state image pickup apparatus which pick up a distribution of an incident amount of infrared rays, X rays, particles or the like as an image.

It is to be noted that a solid-state image pickup apparatus may have a form in which it is formed as a one-chip device or may have a form of a module having an image pickup function in which an image pickup section and a signal processing section or an optical system are packaged collectively.

5. Electronic Apparatus

The present disclosure is not limited to applications to a solid-state image pickup apparatus but can be applied to general electronic apparatus which use a solid-state image pickup apparatus as an image capturing section or a photoelectric conversion section thereof such as an image pickup apparatus of a digital still camera or a video camera, a portable terminal apparatus having an image pickup apparatus such as a portable telephone set and so forth. Electronic apparatus which uses a solid-state image pickup apparatus as an image capturing section thereof includes a copying machine which uses a solid-state image pickup apparatus as an image reading station thereof. It is to be noted that the image pickup apparatus may have a form of a module described hereinabove which is incorporated in an electronic apparatus, that is, the image pickup apparatus may have a form of a camera module.

Image Pickup Apparatus

Figure 43:
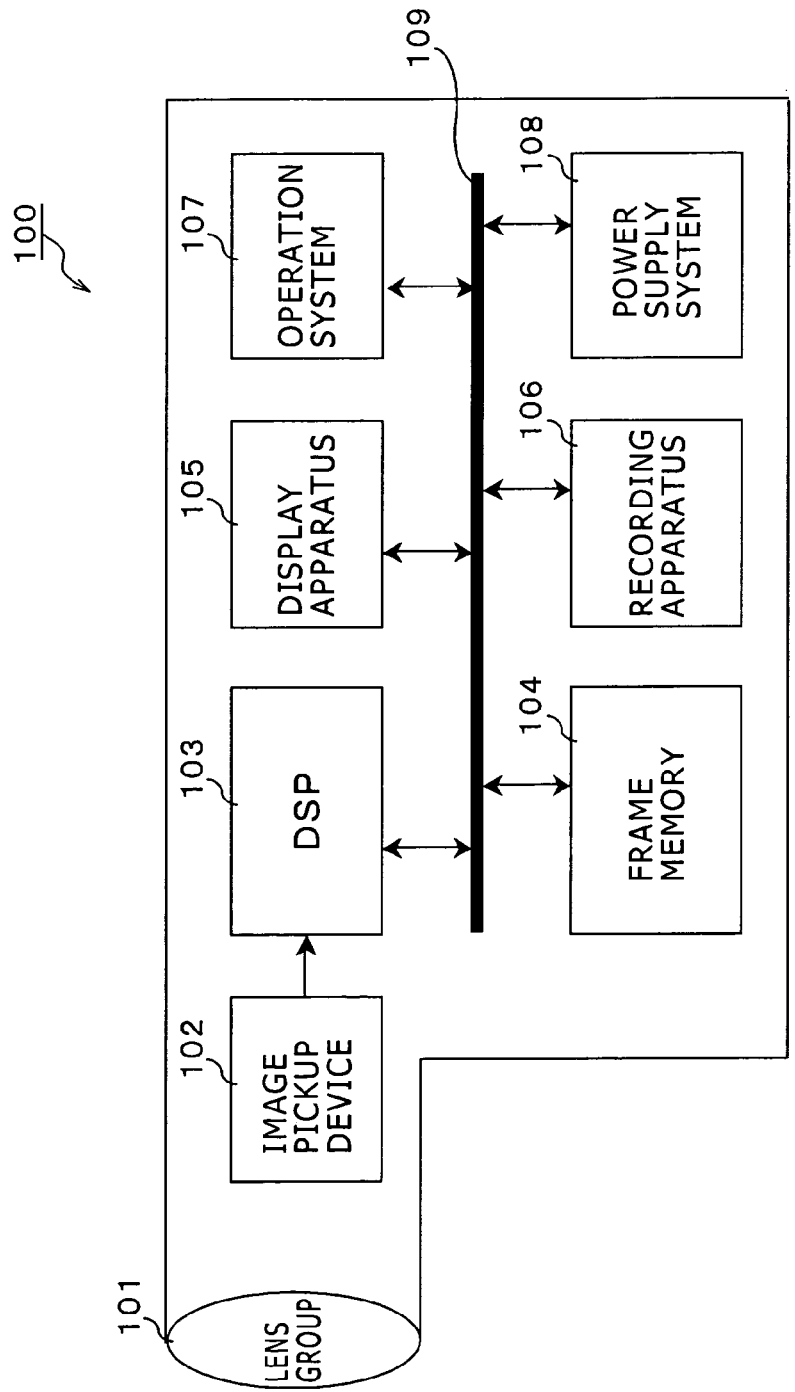
FIG. 43 is a block diagram showing an example of a configuration of an image pickup apparatus as an electronic apparatus according to the present disclosure.
Figure 44:
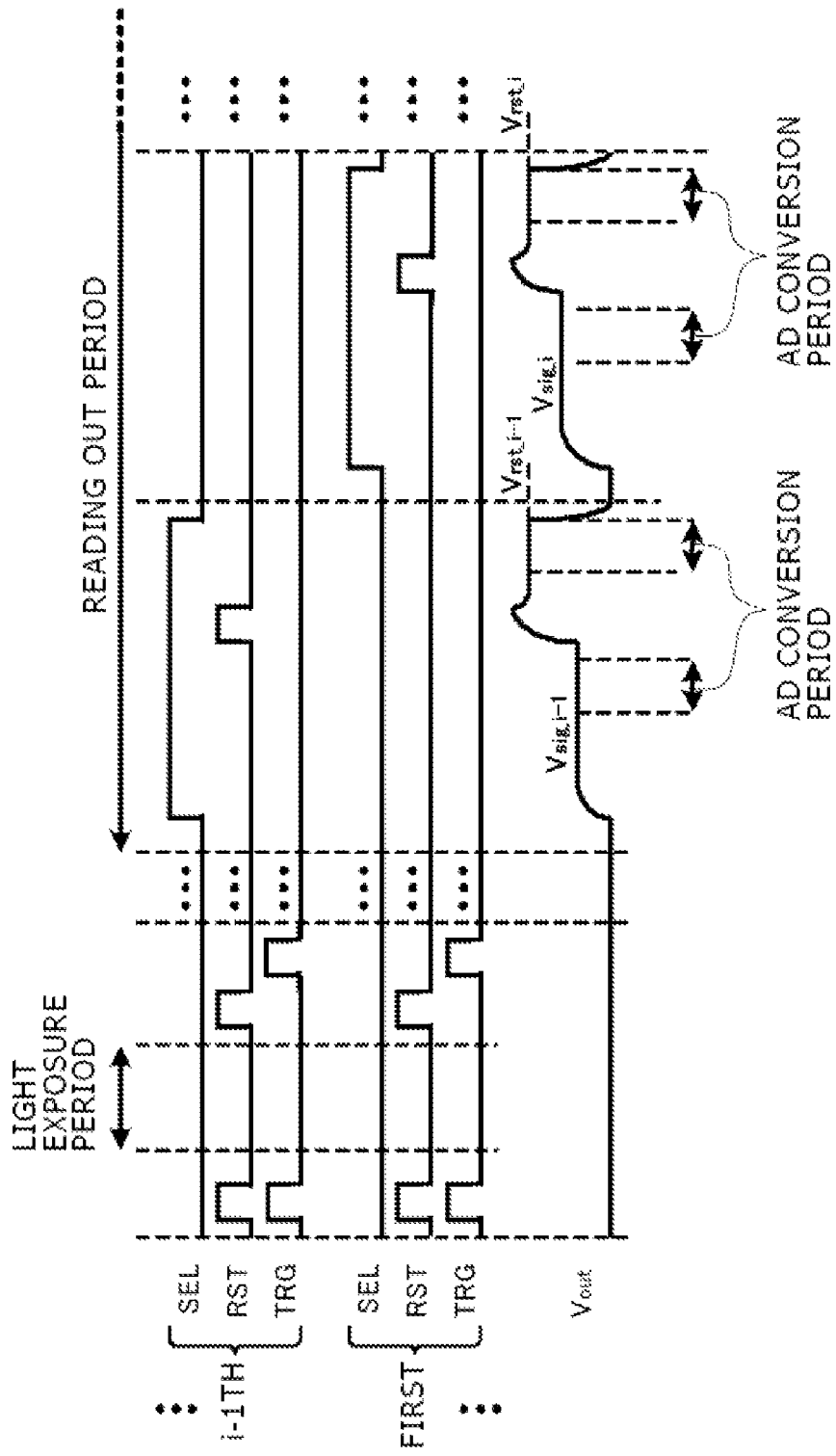
FIG. 44 is a timing waveform diagram illustrating that, in order to remove fixed pattern noise, it is necessary to read out a reset level after a signal level is read out.
Figure 45:
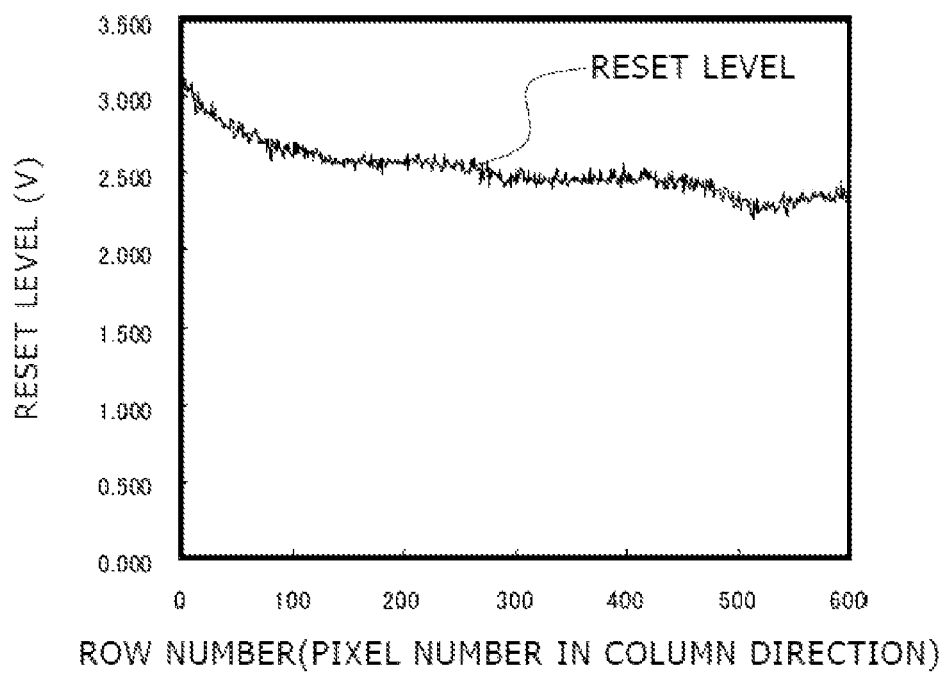
FIG. 45 is a diagrammatic view illustrating an example of an in-plane distribution of a reset level in a vertical direction.
Figure 46:
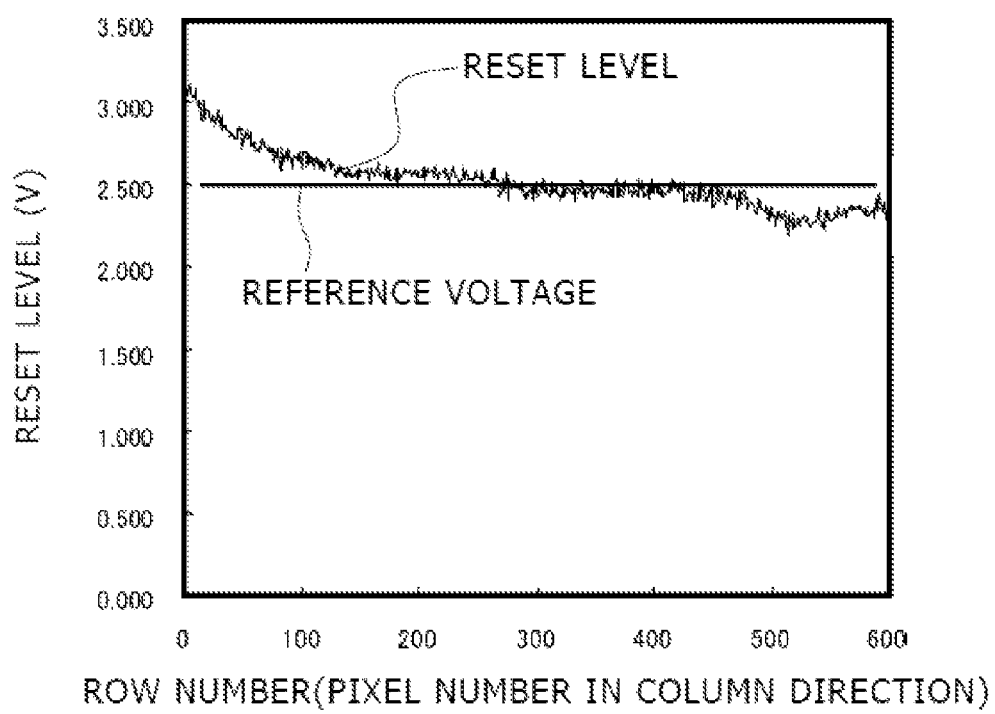
FIG. 46 is a diagrammatic view illustrating that, in the case where a fixed voltage is applied as a reference voltage, it is necessary to expand an input voltage range of an AD conversion circuit.
Figure 47:
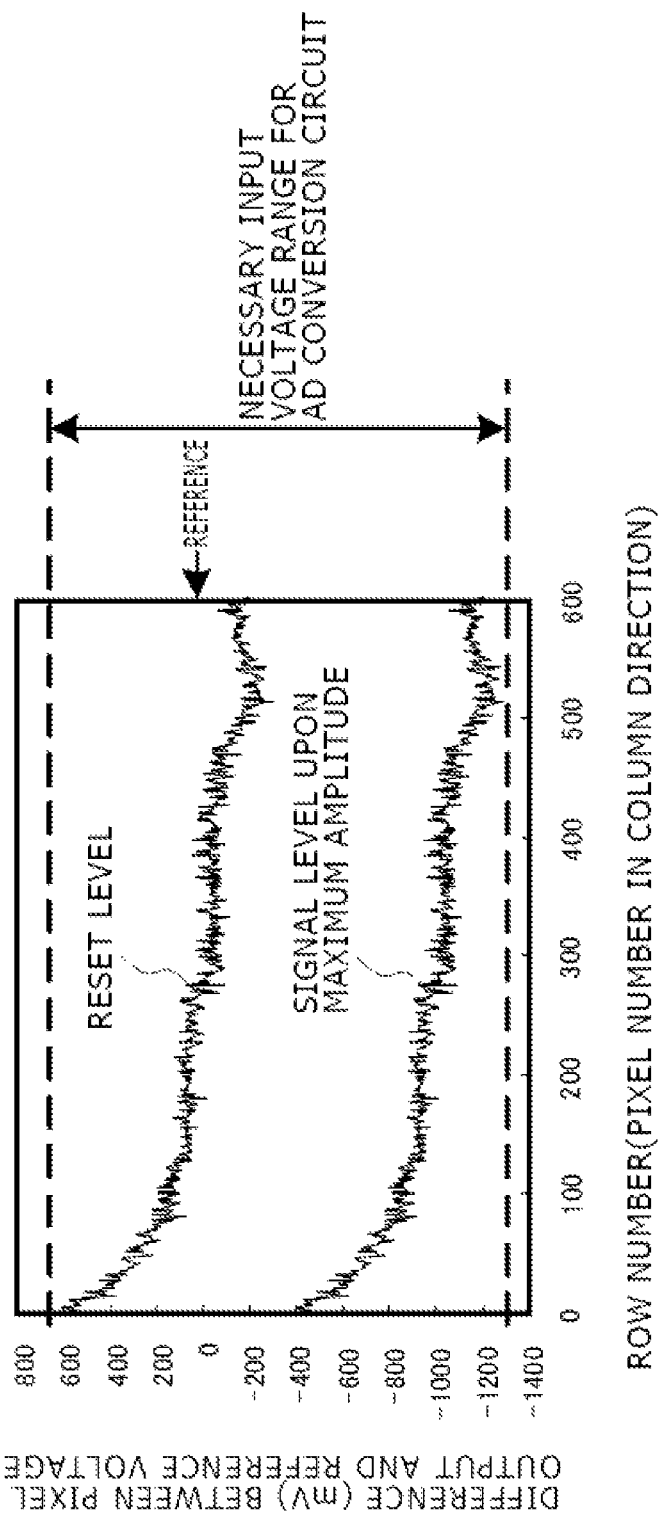
FIG. 47 is a diagrammatic view illustrating a reset level with respect to a reference voltage and a signal level in a maximum amplitude state in the case where the signal amplitude is −1 V in the maximum.
Figure 48:
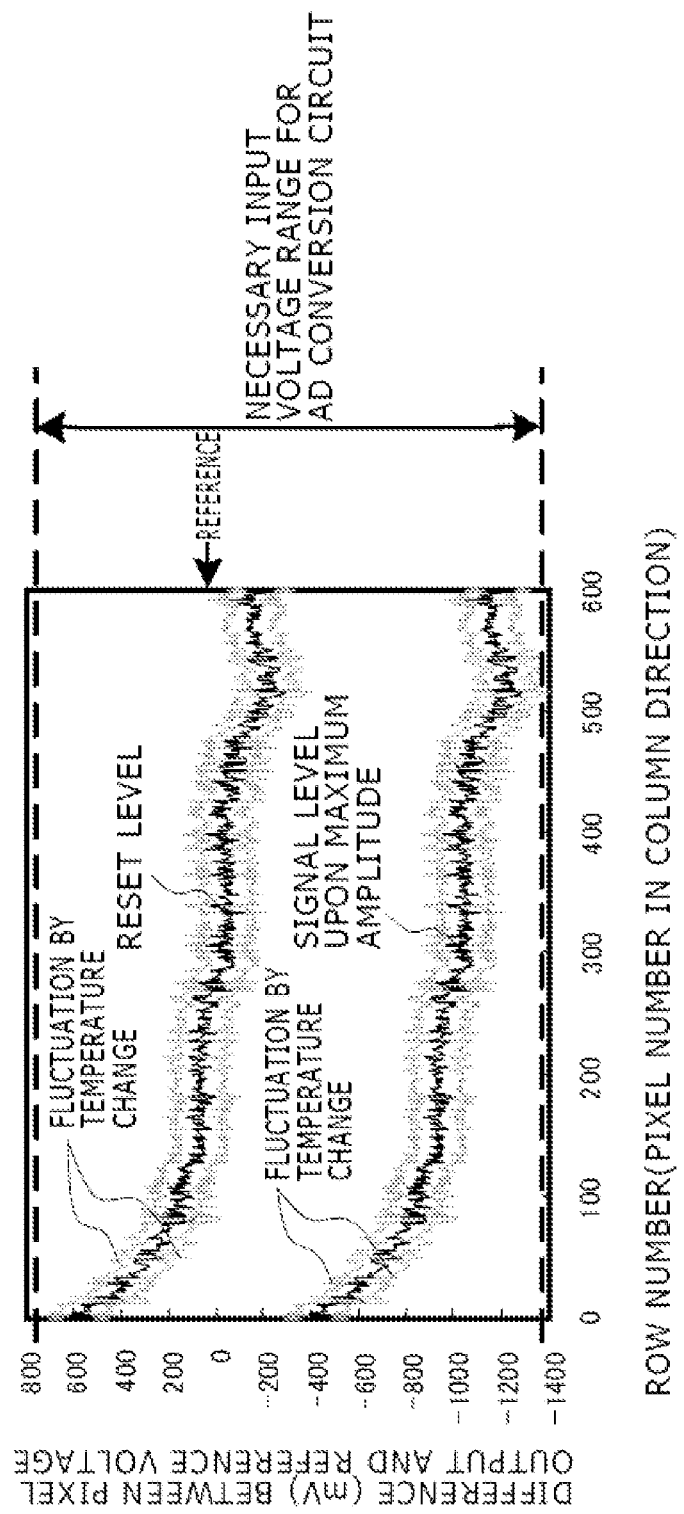
FIG. 48 is a diagrammatic view illustrating that, in the case where the reset level is varied upwardly and downwardly by a temperature variation, it is necessary to expand the input voltage range.

FIG. 43 is a block diagram showing an example of a configuration of an electronic apparatus according to the present disclosure, for example, of an image pickup apparatus.

Referring to FIG. 43, an image pickup apparatus 100 according to the present disclosure includes an optical system including a lens group 101 and so forth, an image pickup device 102, a DSP circuit 103, a frame memory 104, a display apparatus 105, a recording apparatus 106, an operation system 107, a power supply system 108 and so forth. The DSP circuit 103, frame memory 104, display apparatus 105, recording apparatus 106, operation system 107 and power supply system 108 are connected to each other by a bus line 109.

The lens group 101 fetches incident light or image light from an image pickup object and forms an image on an image pickup face of the image pickup device 102. The image pickup device 102 converts the amount of the incident light of the image formed on the image pickup face thereof by the lens group 101 into electric signals and outputs the electric signals as pixel signals.

The display apparatus 105 is formed from a panel type display unit such as a liquid crystal display unit, an organic EL (electroluminescence) display unit or the like and displays a moving picture or a still picture picked up by the image pickup device 102. The recording apparatus 106 records the moving picture or the still picture picked up by the image pickup device 102 on a recording medium such as a video tape or a DVD (Digital Versatile Disk).

The operation system 107 issues operation instructions regarding various functions which the image pickup apparatus has in response to an operation thereof by a user. The power supply system 108 suitably supplies various powers serving as operation power supplies to the DSP circuit 103, frame memory 104, display apparatus 105, recording apparatus 106 and operation system 107 to the power supply objects.

The image pickup apparatus of the configuration described above can be used as an image pickup apparatus for a video camera, a digital still camera, a camera module for a mobile apparatus such as a portable telephone set and so forth. Then, if, in the image pickup apparatus, a solid-state image pickup apparatus such as the CMOS image sensor $10_A$, $10_B$ or the like according to the embodiments described hereinabove is used as the image pickup device 102, then such working effects as described below can be achieved.

In particular, the CMOS image sensors 10$_A$ and 10$_B$ according to the embodiments described hereinabove can implement pickup of an image free from distortion by global exposure. Accordingly, the CMOS image sensors 10$_A$ and 10$_B$ can be implemented as an image pickup apparatus which can be applied suitably for pickup of an image of an image pickup object which moves at a high speed and which cannot allow image distortion or for sensing applications which require simultaneity of picked up images.

Further, the CMOS image sensors 10$_A$ and 10$_B$ according to the embodiments described hereinabove can effectively remove a difference of a great fluctuation of a characteristic in a plane (in-plane distribution) or an offset component which depends upon the magnitude of parasitic capacitance. Consequently, since it is possible to reduce a margin necessary for an input voltage range amplifiable by the signal processing section with respect to an output amplitude of a pixel, reduction in power supply voltage and power consumption of the signal processing section can be anticipated. Accordingly, the present invention can contribute to reduction in voltage and power consumption of various electronic apparatus.

The present application contains subject matter related to that disclosed in Japanese Priority Patent Application JP 2011-015994 filed in the Japan Patent Office on Jan. 28, 2011, the entire content of which is hereby incorporated by reference.

While preferred embodiments of the present invention have been described using specific terms, such description is for illustrative purpose only, and it is to be understood that changes and variations may be made without departing from the spirit or scope of the following claims.

What is claimed is:

1. A solid-state image pickup apparatus, comprising:
a pixel array section in which a unit pixel including a photoelectric conversion section and a charge detection section for detecting charge generated by photoelectric conversion by said photoelectric conversion section is disposed;
a driving section adapted to carry out driving of reading out a signal of said unit pixel as a first signal and a second signal, the first signal being read out from said unit pixel before the second signal; and
a signal processing section including an analog-digital conversion circuit configured to convert an analog signal obtained from said unit pixel into a digital signal based on a comparison of the analog signal with a reference voltage, the reference voltage being used as a reference for an input voltage range within which an input voltage can be converted by said analog-digital conversion circuit, wherein,
the signal processing section adapted to set the first signal as a range reference voltage for a processable input voltage range of said signal processing section, and
the signal processing section further is adapted to adjust the reference voltage to an adjusted reference voltage so that the first and second signals may be included in the input voltage range and carry out signal processing for the first and second signals using the adjusted reference voltage
wherein said driving section can selectively execute;
first driving of reading out a signal based on a signal charge accumulated or retained in said charge detection section first and then resetting said charge detection section and reading out a signal based on a reset potential in order to set the reference voltage, and
second driving of reading out the signal based on the reset potential when said charge detection section is reset first and then reading out the signal based on the reset potential and the signal based on the signal charge accumulated or retained in said charge detection section in this order in order to set the reference voltage, and
wherein said analog-digital conversion circuit includes:
a comparator for comparing the analog signal obtained from said unit pixel and a reference signal of a ramp waveform; and
a setting circuit for applying, upon the first driving, predetermined initial voltages to two input terminals of said comparator to carry out initialization of the reference voltage so that the first and second signals may be included in the input voltage range.

2. The solid-state image pickup apparatus according to claim 1, wherein said analog-digital conversion circuit carries out, upon the first driving, initialization same as initialization carried out upon the second driving so that a circuit section at a succeeding stage of said comparator operates at a same operation point upon the first driving and the second driving, whereafter the initialization by said setting circuit is carried out.

3. The solid-state image pickup apparatus according to claim 2, wherein the circuit section on the succeeding stage stores a voltage value based on a current value corresponding to an output voltage of said comparator.

4. The solid-state image pickup apparatus according to claim 1, wherein a reference signal generation section for generating the reference signal of the ramp waveform sets an initial value of the ramp waveform corresponding to the reference voltage set by said setting circuit.

5. The solid-state image pickup apparatus according to claim 1, wherein
the first signal is based on signal charge accumulated or retained in said charge detection section, and
the second signal is based on a reset potential when said charge detection section is reset.

6. The solid-state image pickup apparatus according to claim 5, wherein said driving section is configured to
first read out the first signal in order to set the reference voltage, and
then reset said charge detection section and read out the second signal.

7. The solid-state image pickup apparatus according to claim 5, wherein said signal processing section calculates a difference between the first and second signals.

8. The solid-state image pickup apparatus according to claim 1, wherein
the first signal is based on a reset potential when said charge detection section is reset, and
the second signal is based on signal charge accumulated or retained in said charge detection section.

9. The solid-state image pickup apparatus according to claim 8, wherein said driving section is configured to
first read out the first signal in order to set the reference voltage, and
then read out the first and second signals in this order.

10. The solid-state image pickup apparatus according to claim 9, wherein said signal processing section calculates a difference between the first and second signals.

11. The solid-state image pickup apparatus according to claim 1, wherein said signal processing section is configured to calculate a difference between the signal based on the signal charge accumulated or retained in said charge detection section and the signal based on the reset potential of said charge detection section.

12. A signal processing method for a solid-state image pickup apparatus in which a unit pixel including a photoelectric conversion section and a charge detection section for detecting charge generated by photoelectric conversion by the photoelectric conversion section is disposed, the signal processing method comprising the steps, carried out by a signal processing section, of:

reading out a signal of the unit pixel as a first signal and a second signal, the first signal being read out from said unit pixel before the second signal;

setting the first signal as a range reference voltage for a processable input voltage range of the signal processing section including an analog-digital conversion circuit configured to convert an analog signal obtained from said unit pixel into a digital signal based on a comparison of the analog signal with a reference voltage, the reference voltage being used as a reference for an input voltage range within which an input voltage can be converted by said analog-digital conversion circuit, the analog-digital conversion circuit including a comparator for comparing the analog signal obtained from said unit pixel and a reference signal of a ramp waveform;

adjusting the reference voltage to an adjusted reference voltage so that the first and second signals may be included in the input voltage range; and carrying out signal processing for the first and second signals using the adjusted reference voltage;

executing selectively first driving of reading out a signal based on a signal charge accumulated or retained in said charge detection section first and then resetting said charge detection section and reading out a signal based on a reset potential in order to set the reference voltage, and second driving of reading out the signal based on the reset potential when said charge detection section is reset first and then reading out the signal based on the reset potential and the signal based on the signal charge accumulated or retained in said charge detection section in this order in order to set the reference voltage, and applying, upon the first driving, predetermined initial voltages to two input terminals of said comparator to carry out initialization of the reference voltage so that the first and second signals may be included in the input voltage range.

13. An electronic apparatus, comprising:

a pixel array section in which a unit pixel including a photoelectric conversion section and a charge detection section for detecting charge generated by photoelectric conversion by said photoelectric conversion section is disposed;

a driving section adapted to carry out driving of reading out a signal of said unit pixel as a first signal and a second signal, the first signal being read out from said unit pixel before the second signal; and a signal processing section including an analog-digital conversion circuit configured to convert an analog signal obtained from said unit pixel into a digital signal based on a comparison of the analog signal with a reference voltage, the reference voltage being used as a reference for an input voltage range within which an input voltage can be converted by said analog-digital conversion circuit, wherein, the signal processing section adapted to set the first signal as a range reference voltage for a processable input voltage range of said signal processing section, and the signal processing section further is adapted to adjust the reference voltage to an adjusted reference voltage so that the first and second signals may be included in the input voltage range and carry out signal processing for the first and second signals using the adjusted reference voltage wherein said driving section can selectively execute;

first driving of reading out a signal based on a signal charge accumulated or retained in said charge detection section first and then resetting said charge detection section and reading out a signal based on a reset potential in order to set the reference voltage, and second driving of reading out the signal based on the reset potential when said charge detection section is reset first and then reading out the signal based on the reset potential and the signal based on the signal charge accumulated or retained in said charge detection section in this order in order to set the reference voltage, and wherein said analog-digital conversion circuit includes:

a comparator for comparing the analog signal obtained from said unit pixel and a reference signal of a ramp waveform; and a setting circuit for applying, upon the first driving, predetermined initial voltages to two input terminals of said comparator to carry out initialization of the reference voltage so that the first and second signals may be included in the input voltage range.

14. The electronic apparatus according to claim 13, wherein said analog-digital conversion circuit carries out, upon the first driving, initialization same as initialization carried out upon the second driving so that a circuit section at a succeeding stage of said comparator operates at a same operation point upon the first driving and the second driving, whereafter the initialization by said setting circuit is carried out.

15. The electronic apparatus according to claim 14, wherein the circuit section on the succeeding stage stores a voltage value based on a current value corresponding to an output voltage of said comparator.

16. The electronic apparatus according to claim 13, wherein a reference signal generation section for generating the reference signal of the ramp waveform sets an initial value of the ramp waveform corresponding to the reference voltage set by said setting circuit.

* * * * *